US 10,816,783 B2

(12) United States Patent
Yamashita et al.

(10) Patent No.: US 10,816,783 B2
(45) Date of Patent: Oct. 27, 2020

(54) MAGNIFYING OBSERVATION APPARATUS

(71) Applicant: Keyence Corporation, Osaka (JP)

(72) Inventors: Jumpei Yamashita, Osaka (JP); Takashi Nakatsukasa, Osaka (JP)

(73) Assignee: KEYENCE CORPORATION, Osaka (JP)

( * ) Notice: Subject to any disclaimer, the term of this patent is extended or adjusted under 35 U.S.C. 154(b) by 0 days.

(21) Appl. No.: 16/116,960

(22) Filed: Aug. 30, 2018

(65) Prior Publication Data
US 2019/0113728 A1 Apr. 18, 2019

(30) Foreign Application Priority Data

Oct. 17, 2017 (JP) ................................. 2017-201376

(51) Int. Cl.
G02B 21/00 (2006.01)
G02B 21/02 (2006.01)
G02B 21/26 (2006.01)
G02B 21/24 (2006.01)
G02B 21/36 (2006.01)
(Continued)

(52) U.S. Cl.
CPC ....... G02B 21/0032 (2013.01); G02B 21/006 (2013.01); G02B 21/008 (2013.01); G02B 21/02 (2013.01); G02B 21/084 (2013.01); G02B 21/244 (2013.01); G02B 21/26 (2013.01); G02B 21/367 (2013.01); G06T 7/571 (2017.01); G06T 2200/24 (2013.01); G06T 2207/10024 (2013.01); G06T 2207/10056 (2013.01); G06T 2207/20221 (2013.01)

(58) Field of Classification Search
CPC .......................... G02B 21/0032; G02B 21/006; G02B 21/008; G02B 21/02; G02B 21/084; G02B 21/244; G02B 21/26; G02B 21/367; G06T 2207/10024; G06T 2207/10056; G06T 7/571
See application file for complete search history.

(56) References Cited

U.S. PATENT DOCUMENTS 6,337,474 B1 * 1/2002 Morizono ............ G02B 21/002
250/208.1
7,283,299 B2 10/2007 Inomata
8,994,808 B2 3/2015 Okamoto et al.
9,140,887 B2 9/2015 Karube
(Continued)

FOREIGN PATENT DOCUMENTS

JP H09-097332 A 4/1997
JP H11-014907 A 1/1999
(Continued)

Primary Examiner — Jamie J Atala
Assistant Examiner — Joon Kwon
(74) Attorney, Agent, or Firm — Kilyk & Bowersox, P.L.L.C.

(57) ABSTRACT

When an observation target is enabled to be observed by a plurality of types of measuring methods having different principles, to make it possible switch an illuminating method in a plurality of ways to increase types of observation targets that can be observed. An observation target SP is illuminated by at least one of coaxial epi-illumination 24 and non-coaxial epi-illumination 25. A focus search is performed on the basis of an image acquired by a first light receiving element 50. The observation target SP is illuminated by a light source 26. The focus search is performed on the basis of a signal acquired by a second light receiving element 51.

11 Claims, 25 Drawing Sheets

(51) Int. Cl.
  *G02B 21/08* (2006.01)
  *G06T 7/571* (2017.01)

(56) References Cited

U.S. PATENT DOCUMENTS

| | | | |
|---|---|---|---|
| 9,383,569 B2 | 7/2016 | Kang | |
| 9,690,088 B2 | 6/2017 | Karube et al. | |
| 2003/0231494 A1* | 12/2003 | Shimokawa | G01N 21/8806 362/245 |
| 2005/0161592 A1* | 7/2005 | Watanabe | G02B 21/006 250/234 |
| 2006/0024040 A1* | 2/2006 | Gladnick | G01N 21/8806 396/182 |
| 2006/0196858 A1* | 9/2006 | Barron | A44C 17/00 219/121.69 |
| 2007/0152556 A1* | 7/2007 | Bohm | G02B 21/002 313/113 |
| 2008/0297596 A1* | 12/2008 | Inomata | G06T 5/50 348/80 |
| 2013/0147778 A1* | 6/2013 | Ninan | G09G 3/3426 345/207 |
| 2014/0139634 A1* | 5/2014 | Lampert | A61C 9/0066 348/46 |
| 2016/0267668 A1* | 9/2016 | Yamada | G06T 7/13 |
| 2018/0259764 A1* | 9/2018 | Watanabe | G02B 21/36 |

FOREIGN PATENT DOCUMENTS

| | | |
|---|---|---|
| JP | 2000-162504 A | 6/2000 |
| JP | 2001-082935 A | 3/2001 |
| WO | O-2017220943 A1 * 12/2017 | ............ G02B 21/26 |

\* cited by examiner

FIG. 9 POST-STARTUP USER INTERFACE

FIG. 15 DURING ILLUMINATION LIGHT AMOUNT CHANGE

FIG. 17 NAVIGATION IMAGE DISPLAY

FIG. 18 ADDITION OF REGION OF NAVIGATION IMAGE

FIG. 20 BASIC MEASUREMENT REGION DISPLAY

DIVIDED DISPLAY

FOCUS STACKING

PROFILE MEASUREMENT

MAGNIFYING OBSERVATION APPARATUS

CROSS-REFERENCE TO RELATED APPLICATIONS

The present application claims foreign priority based on Japanese Patent Application No. 2017-201376, filed Oct. 17, 2017, the contents of which is incorporated herein by reference.

BACKGROUND OF THE INVENTION

1. Field of the Invention

The present invention relates to a magnifying observation apparatus that magnifies an observation target to enable the observation target to be observed.

2. Description of Related Art

As a magnifying observation apparatus, there have been known a confocal microscope that makes use of the principle of a laser confocus, a three-dimensional measuring apparatus that makes use of the principle of so-called focus stacking, and the like. As disclosed in, for example, JP-11-14907 (Patent Literature 1) and JP-A-2001-82935 (Patent Literature 2), the confocal microscope includes a laser output section configuring a point light source, a confocal observation optical system, and a light receiving element besides an objective lens. In the confocal observation optical system, a pinhole is disposed in a position conjugate with an observation surface between the light receiving element and the observation surface. When the observation surface is focused (at focusing time), reflected light from the observation surface passes through the pinhole and enters the light receiving element. When the observation surface is unfocused (at defocusing time), the reflected light from the observation surface is blocked by the peripheral portion of the pinhole and hardly enters the light receiving element.

In the confocal observation optical system, when the relative distance between the objective lens and the observation surface is changed, a light amount detected by the light receiving element greatly changes according to a degree of the focusing on the observation surface. It can be determined that a position where a light receiving amount by the light receiving element is the largest is height of a certain point of the observation surface. Height information in a predetermined range of the observation surface can be obtained by scanning a laser beam output from the laser output section in an X direction and a Y direction.

On the other hand, as the three-dimensional measuring apparatus that makes use of the principle of the focus stacking, as disclosed in, for example, JP-A-9-97332 (Patent Literature 3) and JP-A-2000-162504 (Patent Literature 4), there is an apparatus configured to be capable of imaging an observation surface with an imaging element while changing the relative distance between an objective lens and the observation surface and setting, as heights of points of the observation surface, relative distances at which best focused images are captured at the points.

As an illumination method of a microscope, there are coaxial epi-illumination for illuminating an observation surface of an observation target such that an illumination light path is located on the optical axis of an objective lens, side illumination for illuminating the observation surface of the observation target from the periphery of the objective lens, and dark field illumination for illuminating the observation surface of the observation target from the periphery of the optical axis of the objective lens.

The confocal microscopes disclosed in Patent Literatures 1 and 2 are capable of performing highly accurate measurement in the height direction. Therefore, the confocal microscope is suitable when highly accurate measurement of an observation target having a fine shape is necessary. However, the confocal microscope has a weak point in principle. Because light is irradiated on the observation surface through the objective lens, an angle of inclination that can be measured is limited by an NA (numerical aperture) of the objective lens. That is, when the objective lens and the observation surface are right opposed to each other, the light irradiated on the observation surface through the objective lens reflects and returns to the objective lens. However, when the observation surface is tilted with respect to the optical axis of the objective lens, the light reflected from the observation surface is irradiated toward the outside of the objective lens and does not return to the objective lens. This phenomenon more conspicuously occurs as the NA of the objective lens is smaller. In general, a high-magnification objective lens has a large NA and a low-magnification objective lens has a small NA. Therefore, on the high magnification side, a measurable inclination angle is large and there are only a few observation targets that cannot be measured. However, on the low magnification side, highly accurate measurement is difficult because, for example, data of an inclined portion is lost and noise (false shapes) severely occurs.

On the other hand, the three-dimensional measuring apparatus that makes use of the principle of the focus stacking disclosed in Patent Literatures 3 and 4 can illuminate the observation surface using ring illumination or the like from the outer side of the observation lens. Therefore, even an inclined surface steeper than a measurement limit determined by the NA of the objective lens can be measured.

However, when the principle of the focus stacking is used, a focused position is regarded as the height of a point of the position. Therefore, it is difficult to measure an observation target of a transparent body or a mirror surface unknown whether being focused. However, such observation targets are observation targets that the confocal microscope can skillfully measure. Therefore, by adopting an apparatus including both of a measuring method by the principle of the laser confocus and a measuring method by the principle of the focus stacking, measurable observation targets can be increased and versatility can be greatly improved.

When the coaxial epi-illumination is adopted as an illumination method of a microscope, the coaxial epi-illumination is suitable for observing a mirror surface or an observation surface similar to the mirror surface. A difference in reflectance of the observation surface can be observed at high contrast. On the other hand, the side illumination and the dark field illumination are suitable for observing a diffuser such as paper and an observation surface having large unevenness. Because light is irradiated from the periphery of the observation lens or the periphery of the optical axis, even an inclined surface from which light does not return can be illuminated brightly by the coaxial epi-illumination.

In the principle of the focus stacking, whether the observation surface is focused is used as means for determining height of a point of the observation surface. Therefore, it is sufficiently assumed that the side illumination and the dark field illumination are sometimes more suitable than the coaxial epi-illumination.

SUMMARY OF THE INVENTION

The present invention has been devised in view of such points, and an object of the present invention is to, when an observation target is made observable by a plurality of types of measuring methods having different principles, make it possible to switch an illuminating method in a plurality of ways to increase types of observable observation targets.

In order to achieve the object, a first invention is a magnifying observation apparatus that magnifies an observation target to enable the observation target to be observed, the magnifying observation apparatus including: a placement table for placing the observation target; a non-confocal observation optical system including an objective lens; a confocal observation optical system including the objective lens; a light source configured to generate light for illuminating the observation target via the objective lens; a scanning section for scanning the light generated by the light source on the observation target; coaxial epi-illumination for illuminating the observation target via the objective lens; non-coaxial epi-illumination for illuminating the observation target from a periphery of an optical axis of the objective lens; a vertical moving mechanism capable of changing a relative distance between the objective lens and the placement table; a height-information detecting section configured to detect height information; a first light receiving element configured to image the observation target via the non-confocal observation optical system in order to acquire an image of the observation target; a second light receiving element for measuring the observation target via the confocal observation optical system; a first focus searching section configured to illuminate the observation target with at least one of the coaxial epi-illumination and the non-coaxial epi-illumination and perform a focus search on the basis of the height information detected by the height-information detecting section according to the relative distance changed by the vertical moving mechanism and an image acquired by the first light receiving element; a second focus searching section configured to cause the scanning section to scan the light generated by the light source on the observation target and perform the focus search on the basis of the height information detected by the height-information detecting section according to the relative distance changed by the vertical moving mechanism and a signal acquired by the second light receiving element; a first three-dimensional-shape measuring section configured to measure a three-dimensional shape of the observation target on the basis of the image acquired by the first light receiving element and a focus position searched by the first focus searching section; and a second three-dimensional-shape measuring section configured to measure a three-dimensional shape of the observation target on the basis of the signal acquired by the second light receiving element and a focus position searched by the second focus searching section.

With this configuration, in a state in which the observation target is illuminated by at least one of the coaxial epi-illumination and the non-coaxial epi-illumination, when the observation target is imaged by the first light receiving element via the non-confocal observation optical system and the first focus searching section performs the focus search on the basis of an image acquired by the first light receiving element, height information is detected by the height-information detecting section and a focus position can be acquired. The first three-dimensional-shape measuring section can measure a three-dimensional shape of the observation target on the basis of the focus position searched by the first focus searching section. Therefore, a measuring method that makes use of the principle of the focus stacking can be realized.

In a state in which the observation target is illuminated by a point light source, when the observation target is measured by the second light receiving element via the confocal observation optical system and the second focus searching section performs the focus search on the basis of a signal acquired by the second light receiving element, height information is detected by the height-information detecting section and a focus position can be acquired. The second three-dimensional-shape measuring section can measure a three-dimensional shape of the observation target on the basis of the focus position searched by the second focus searching section. Therefore, a measuring method that makes use of the principle of the confocus can be realized.

That is, a configuration including both of the measuring method that makes use of the principle of the focus stacking and the measuring method that makes use of the principle of the confocus can be adopted. In the case of the measuring method that makes use of the principle of the focus stacking, a three-dimensional shape of the observation target can be measured in a state in which the observation target is illuminated by one of the coaxial epi-illumination and the non-coaxial epi-illumination or a state in which the observation target is illuminated by both of the coaxial epi-illumination and the non-coaxial epi-illumination. Consequently, a three-dimensional shape can be measured not only in a mirror surface-like observation target but also a diffuser and an observation target having large unevenness.

In a second invention, the first three-dimensional-shape measuring section may be configured to acquire a color image indicating the observation target, the second three-dimensional-shape measuring section may be configured to acquire three-dimensional shape data of the observation target, and the magnifying observation apparatus may further include: a control section configured to generate a combined image obtained by combining the color image acquired by the first three-dimensional-shape measuring section and the three-dimensional shape data acquired by the second three-dimensional-shape measuring section; and a display section capable of displaying the combined image generated by the control section.

With this configuration, the second three-dimensional-shape measuring section acquires three-dimensional shape data of the observation target on the basis of a signal acquired via the confocal observation optical system. Therefore, the acquired three-dimensional shape data is data having accurate height information. By combining the color image indicating the observation target with the three-dimensional shape data having the accurate height information, a three-dimensional color image indicating the observation target is obtained. By displaying the three-dimensional color image on a display section such as a display, a user can observe a three-dimensional shape of the observation target in color.

In a third invention, the first focus searching section may be configured to, when the control section generates the combined image, illuminate the observation target with the coaxial epi-illumination and perform the focus search on the basis of the image acquired by the first light receiving element.

With this configuration, the first three-dimensional-shape measuring section can acquire a color image of the observation target illuminated by the coaxial epi-illumination. On the other hand, the second three-dimensional-shape measuring section can acquire three-dimensional shape data of the observation target illuminated by the point light source via the objective lens. Both of the coaxial epi-illumination and the point light source illuminate the observation target via the objective lens. Therefore, the acquired color image and the acquired three-dimensional shape data are illuminated from the same direction. Therefore, by combining the color image and the three-dimensional shape data, a tint of a combined image becomes a normal tint.

In a fourth invention, the non-coaxial epi-illumination may be ring illumination disposed to surround a periphery of the objective lens.

In a fifth invention, in any one of the first to fourth inventions, the magnifying observation apparatus may be configured to be capable of adjusting a light amount of the coaxial epi-illumination and a light amount of the non-coaxial epi-illumination independently from each other when the coaxial epi-illumination and the non-coaxial epi-illumination simultaneously illuminate the observation target.

In a sixth invention, the magnifying observation apparatus may be configured to calculate a reliability index of a focus search result at a time when lights of the coaxial epi-illumination and the non-coaxial epi-illumination are irradiated on the observation target at a first ratio, determine whether the calculated reliability index satisfies a predetermined reference, and, when determining that the reliability index does not satisfy the predetermined reference, irradiate the lights of the coaxial epi-illumination and the non-coaxial epi-illumination on the observation target at a second ratio different from the first ratio and perform the focus search.

The first ratio and the second ratio can be represented by, for example, percentages. The coaxial epi-illumination and the non-coaxial epi-illumination can be optionally set between 0% and 100%. The coaxial epi-illumination can be set to 0% and the non-coaxial epi-illumination can be set to 100% (illumination of only the non-coaxial epi-illumination). The coaxial epi-illumination can be set to 100% and the non-coaxial epi-illumination can be set to 0% (illumination of only the coaxial epi-illumination).

In a seventh invention, the magnifying observation apparatus may be configured to, when determining that the reliability index of the focus search result at the time when the lights of the coaxial epi-illumination and the non-coaxial epi-illumination are irradiated on the observation target at the first ratio satisfies the predetermined reference, irradiate the observation target at the first ratio and measure a three-dimensional shape of the observation target.

In an eighth invention, the magnifying observation apparatus may be configured to compare a reliability index of a focus search result of the observation target illuminated by the coaxial epi-illumination and a reliability index of a focus search result of the observation target illuminated by the non-coaxial epi-illumination and, when the reliability index of the focus search result of the observation target illuminated by the coaxial epi-illumination is lower than the reliability index of the focus search result of the observation target illuminated by the non-coaxial epi-illumination, illuminate the observation target with the non-coaxial epi-illumination and perform the focus search with the first focus searching section on the basis of the image acquired by the first light receiving element.

In a ninth invention, the magnifying observation apparatus may be configured to calculate a reliability index of a focus search result at a time when lights of the coaxial epi-illumination and the non-coaxial epi-illumination are irradiated on the observation target at a first ratio, determine whether the calculated reliability index satisfies a predetermined reference, and, when determining that the reliability index does not satisfy the predetermined reference, execute HDR processing for expanding a dynamic range of a captured image while maintaining the first ratio.

In a tenth invention, the magnifying observation apparatus may be configured to calculate a reliability index of a focus search result at a time when light of the coaxial epi-illumination is irradiated on the observation target and a reliability index of a focus search result at a time when light of the non-coaxial epi-illumination is irradiated on the observation target, determine whether both the reliability indexes satisfy a predetermined reference, and, when determining that both the reliability indexes do not satisfy the predetermined reference, measure a three-dimensional shape of the observation target with the second three-dimensional-shape measuring section.

In an eleventh invention, the magnifying observation apparatus may be configured to switch illumination for illuminating the observation target to illumination having a high reliability index on the basis of a reliability index of a focus search result of the observation target illuminated by the coaxial epi-illumination and a reliability index of a focus search result of the observation target illuminated by the non-coaxial epi-illumination.

In a twelfth invention, the display section may be configured to be capable of simultaneously displaying the combined image and the color image.

According to the present invention, when the observation target is enabled to be observed by a plurality of types of measurement modes having different principles, the observation target can be illuminated by at least one of the coaxial epi-illumination and the non-coaxial epi-illumination. Therefore, observable observation targets can be increased.

DESCRIPTION OF EMBODIMENT

An embodiment of the present invention is explained below with reference to the drawings. Note that the following explanation of a preferred embodiment is only illustration for embodying the technical idea of the present invention and is not intended to limit the present invention, objects to which the present invention is applied, and uses of the objects.

Overall Configuration of a Magnifying Observation Apparatus 1

Figure 1:
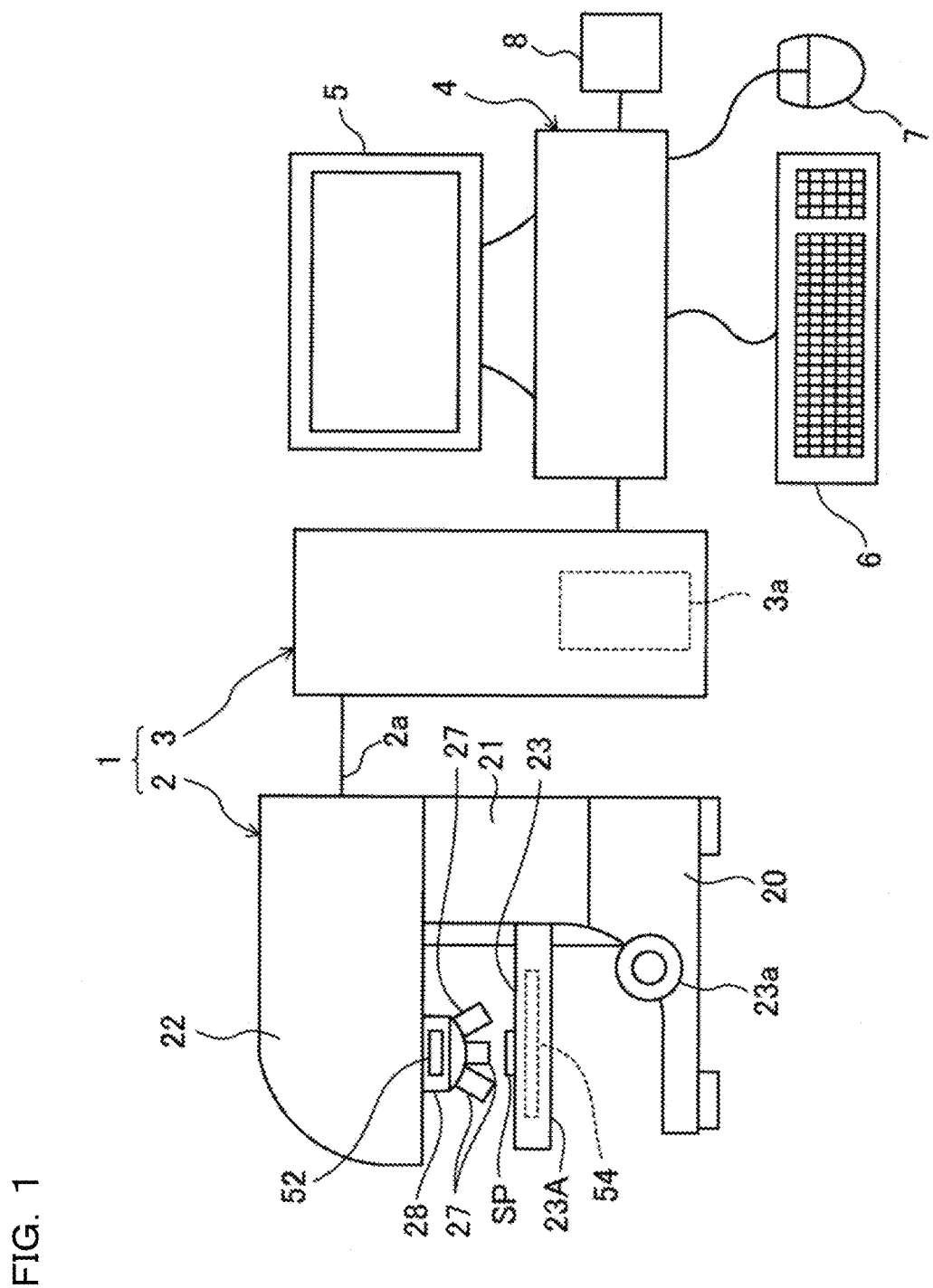
FIG. 1 is a schematic diagram showing a system configuration of a magnifying observation apparatus according to an embodiment of the present invention.

FIG. 1 is a schematic diagram showing a system configuration of a magnifying observation apparatus 1 according to an embodiment of the present invention. The magnifying observation apparatus 1 is an apparatus for magnifying an observation target SP and enabling the observation target SP to be observed. The magnifying observation apparatus 1 can be simply called microscope or can be called digital microscope, a scanning microscope, and the like. As explained below, because the magnifying observation apparatus 1 can acquire a three-dimensional shape of the observation target SP, the magnifying observation apparatus 1 can be called three-dimensional measuring machine as well.

The magnifying observation apparatus 1 can be configured by an observation unit 2 and an external unit 3. However, the external unit 3 can be incorporated in the observation unit 2 to integrate the external unit 3 and the observation unit 2. When the magnifying observation apparatus 1 is configured by the observation unit 2 and the external unit 3, a power supplying device 3a that supplies electric power to the observation unit 2 can be provided in the external unit 3. The observation unit 2 and the external unit 3 are connected by a wire 2a.

A terminal for operation 4 can be connected to the magnifying observation apparatus 1. The connection of the terminal for operation 4 is enabled by a communication section 3b (see FIG. 4) incorporated in the external unit 3. The terminal for operation 4 includes a display section 5, a keyboard 6, a mouse 7, and a storage device 8. The terminal for operation 4 can be incorporated in the observation unit 2 or the external unit 3 and integrated to be formed as a constituent member of the magnifying observation apparatus 1. In this case, the terminal for operation 4 can be called control unit or the like rather than "terminal for operation". However, in this embodiment, the terminal for operation 4 is separate from the observation unit 2 and the external unit 3.

The display section 5, the keyboard 6, the mouse 7, and the storage device 8 can also be respectively incorporated in the observation unit 2 or the external unit 3 to be formed as constituent members of the magnifying observation apparatus 1. That is, the terminal for operation 4, the display section 5, the keyboard 6, the mouse 7, and the storage device 8 can also be formed as a part of the magnifying observation apparatus 1. The magnifying observation apparatus 1 can be configured as, for example, the magnifying observation apparatus 1 attached with the display section 5 or the magnifying observation apparatus 1 attached with the keyboard 6 and the mouse 7 (operation sections).

The keyboard 6 and the mouse 7 are devices for computer operation well known in the past and are operation sections for operating the terminal for operation 4. The magnifying observation apparatus 1 can be operated by the keyboard 6 and the mouse 7. Input of various kinds of information, selection operation, image selection operation, region designation, position designation, and the like can be performed by the operation of the keyboard 6 and the mouse 7. The keyboard 6 and the mouse 7 are examples of the operation sections. For example, devices for computer operation such as various pointing devices, a sound input device, and a touch operation panel can also be used instead of the keyboard 6 and the mouse 7 or in addition to the keyboard 6 and the mouse 7.

The display section 5 is configured by a display device capable of performing color display such as a liquid crystal display panel or an organic EL panel. A touch operation panel functioning as an operation section may be incorporated in the display section 5.

Members, means, elements, units, and the like explained below may be provided in any of the observation unit 2, the external unit 3, and the terminal for operation 4.

Besides the devices and the apparatuses explained above, an apparatus for performing operation and control, a printer, a computer for performing other various kinds of processing, a storage device, peripheral devices, and the like can also be connected to the magnifying observation apparatus 1. Examples of the connection in this case include serial connection such as IEEE1394, RS-232x and RS422, and USB, parallel connection, and a method of electrical, magnetic, or optical connection via a network such as 10BASE-T, 100BASE-TX, or 1000BASE-T. Besides the wired connection, the connection may be, for example, a wireless LAN such as IEEE802.x and wireless connection that makes use of a radio wave, an infrared ray, optical communication, and the like such as a Bluetooth (registered trademark). Further, as a storage medium used in a storage device for performing exchange of data, saving of various kinds of setting, and the like, for example, various memory cards, a magnetic disk, a magneto-optical disk, a semiconductor memory, and a hard disk can be used. Note that the magnifying observation apparatus 1 can be referred to as a magnifying observation system, a digital microscope system, or the like as a whole by combining the observation unit 2 and the external unit 3 and the various units, apparatuses, and devices other than the observation unit 2 and the external unit 3.

Overall Configuration of the Observation Unit 2

Figure 2:
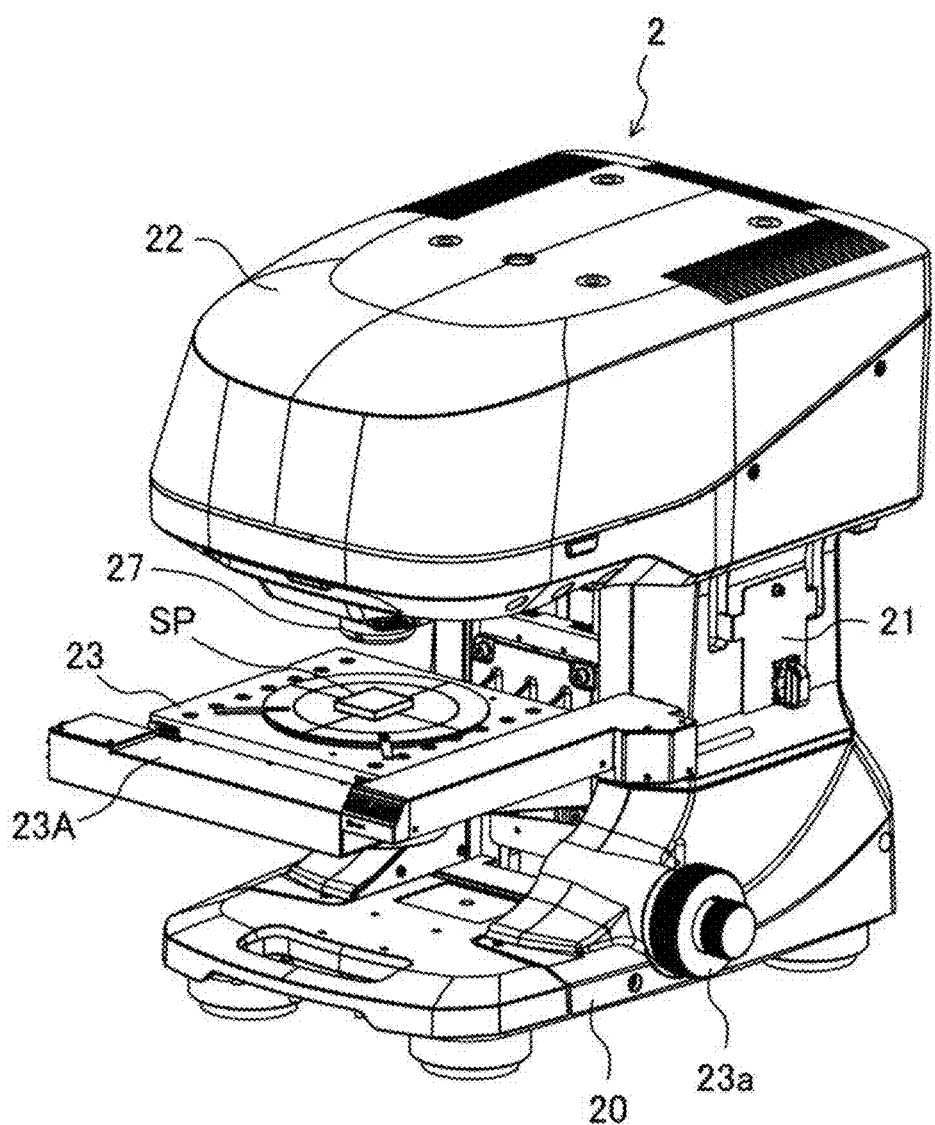
FIG. 2 is a perspective view of an observation unit.

The exterior shape of the observation unit 2 is as shown in FIG. 2 and the like. The observation unit 2 is configured by a base 20 placed on a workbench or the like, a supporting section 21 extending toward the upper side from an inner side portion of the base 20, and a head section 22 provided above the supporting section 21. Note that a near side of the observation unit 2 is a side close to an operator (an observer) when the operator faces the observation unit 2 in a normal operation posture. An inner side of the observation unit 2 is a side far from the operator when the operator faces the observation unit 2 in the normal operation posture. This is only defined for convenience of explanation and does not limit an actual state of use.

Figure 3:
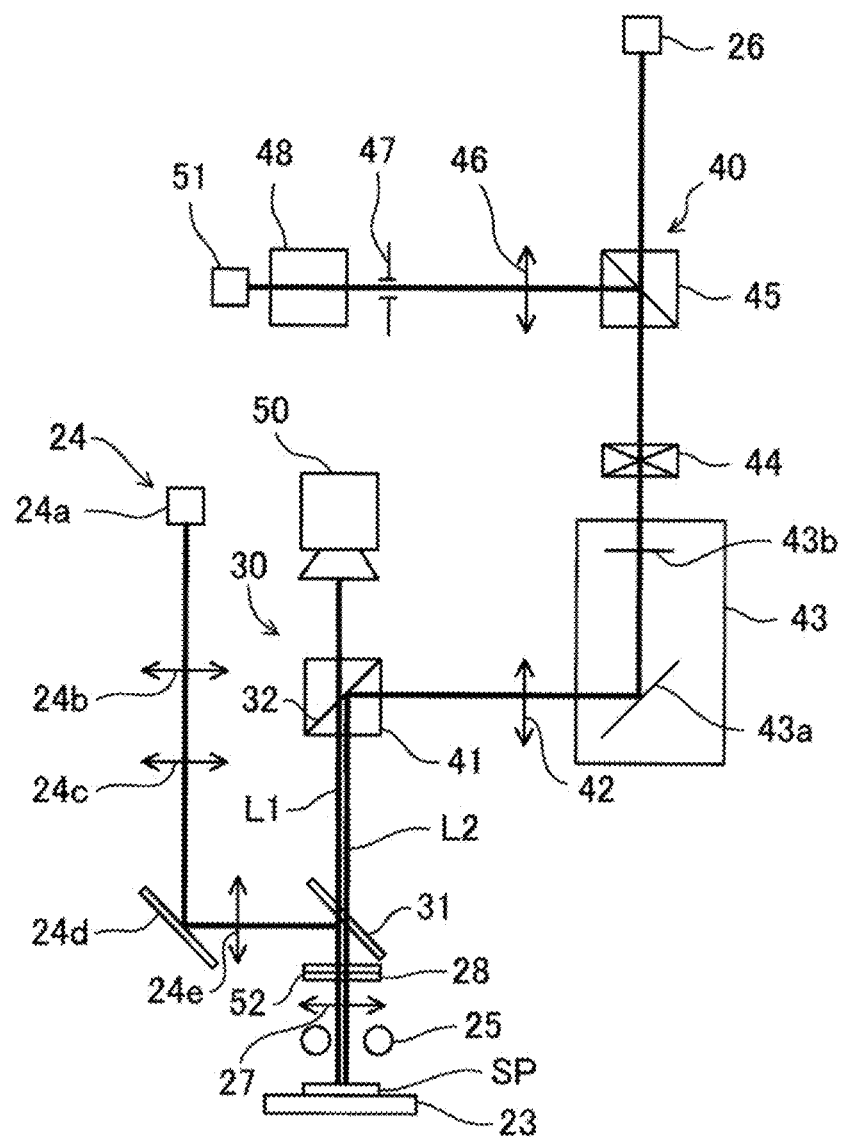
FIG. 3 is a schematic diagram showing an optical system and an illumination system of the observation unit.

The observation unit 2 includes a horizontal electric placement table 23 for placing the observation target SP, coaxial epi-illumination 24 and ring illumination 25 functioning as illumination for observation that irradiates light toward the observation target SP, a laser output section 26 functioning as a point light source, a non-confocal observation optical system 30 and a confocal observation optical system 40 functioning as an observation optical system, an imaging element (a first light receiving element) 50, and a photomultiplier tube (a second light receiving element) 51 shown in FIG. 3 and the like. The observation optical system is a telecentric optical system.

The electric placement table 23 can be moved in the up-down direction by rotational operation of a lifting and lowering dial 23a shown in FIGS. 1 and 2. As in other optical microscopes, the operator rotates the lifting and lowering dial 23a according to the thickness and the height of the observation target SP.

Configuration of the Non-Confocal Observation Optical System 30

The non-confocal observation optical system 30 can be configured the same as a basic structure of an optical system used in an optical microscope in the past. The coaxial epi-illumination 24 and the ring illumination 25 are used as light sources for observation. Light reflected from the observation target SP is received by the imaging element 50. Specifically, the non-confocal observation optical system 30 includes at least an objective lens 27, an electric revolver (an electric magnifying mechanism) 28, a first half mirror 31, and a second half mirror 32 disposed in order from the observation target SP side toward the imaging element 50 side. The first half mirror 31 can be an unpolarized half mirror. The first half mirror 31 and the second half mirror 32 are disposed on an observation optical path of the objective lens 27. When the observation target SP is illuminated, light L1 reflected on the observation target SP is received by the imaging element 50 through the objective lens 27, the first half mirror 31, and the second half mirror 32.

The imaging element 50 images the observation target SP via the non-confocal observation optical system 30 in order to acquire an image of the observation target SP. Specifically, as the imaging element 50, an image sensor including an imaging element such as a CCD (charge-coupled device) or a CMOS (complementary metal oxide semiconductor) that converts the intensity of light obtained through the non-confocal observation optical system 30 into an electric signal can be used. However, the imaging element 50 is not limited to the image sensor. The imaging element 50 is a sensor that can acquire color information as well. An exposure time of the imaging element 50 can be optionally adjusted.

Configuration of the Coaxial Epi-Illumination 24

The coaxial epi-illumination 24 is an illumination unit functioning as a light source for illuminating the observation target SP via the objective lens 27. The coaxial epi-illumination 24 illuminates an observation surface of the observation target SP such that an illumination optical path is located on the optical axis of the objective lens 27. The coaxial epi-illumination 24 includes a light emitting body 24a such as an LED and includes a collector 24b, a relay lens 24c, a mirror 24d, and a lens 24e on which light of the light emitting body 24a is made incident. The light of the light emitting body 24a passes through the collector 24b and the relay lens 24c. Thereafter, the direction of the light is changed by the mirror 24d and the light is made incident on the lens 24e. The direction of the light emitted from the lens 24e is changed to the observation target SP direction by the first half mirror 31. Then, the light is irradiated on an observation optical axis of the objective lens 27. The light passes through the objective lens 27 and illuminates the observation target SP. ON/OFF and a light amount during ON of the coaxial epi-illumination 24 are controlled by an illumination control section 72c explained below.

The coaxial epi-illumination 24 is suitable for observing a mirror surface or an observation surface similar to the mirror surface. The coaxial epi-illumination 24 has an advantage that a difference in reflectance of the observation surface can be observed at high contrast.

Configuration of the Ring Illumination 25

Figure 5:
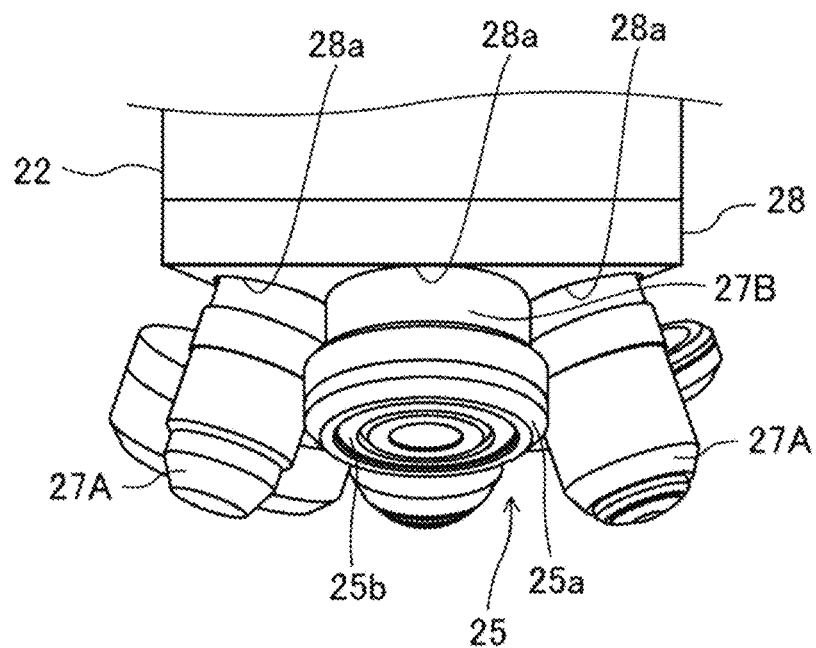
FIG. 5 is a side view of an electric revolver to which a plurality of objective lenses are attached.

As schematically shown in FIG. 3, the ring illumination 25 is non-coaxial epi-illumination disposed to surround the periphery of the objective lens 27. The ring illumination 25 illuminates the observation target SP from the periphery of the optical axis of the objective lens 27. As shown in FIG. 5, in the electric revolver 28, a plurality of attachment holes 28a for attaching the objective lens 27 are formed at intervals around a rotation center line. Objective lenses 27A and 27B having different magnifications are attached to the attachment holes 28a. The objective lens 27A is a lens not including the ring illumination 25. The objective lens 27B is a lens including the ring illumination 25.

Figure 6:
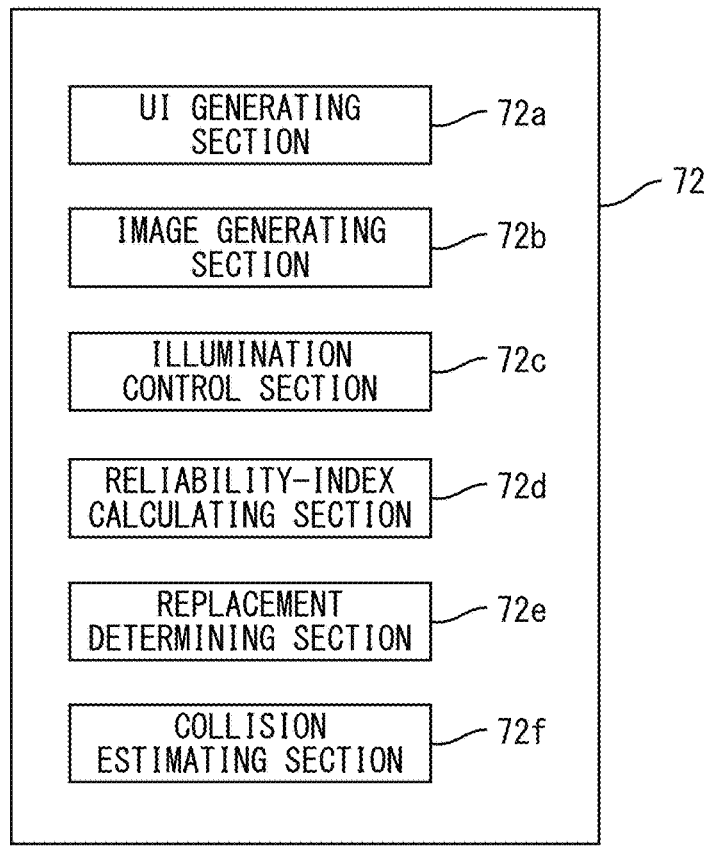
FIG. 6 is a block diagram of a control section.

As shown in FIG. 6, the ring illumination 25 includes a case 25a having a ring shape in which a plurality of light sources such as LEDs (not shown in FIG. 6) are housed and a light transmitting member 25b provided below the case 25a. The case 25a is formed to surround the periphery of a lens included in the objective lens 27B. The plurality of light sources housed on the inside are disposed to surround the periphery of the lens included in the objective lens 27B. Lights emitted from the light sources are condensed by the light transmitting member 25b and irradiated toward the observation target SP disposed on the electric placement table 23. When a turning position of the electric revolver 28 is present in a position for selecting the objective lens 27A as a present objective lens for observation, the ring illumination 25 does not function. However, when the turning position is present in a position for selecting the objective lens 27B as the present objective lens for observation, the electric revolver 28 can cause the ring illumination 25 to function. ON/OFF and a light amount during ON of the ring illumination 25 are controlled by an illumination control section 72c explained below.

Besides the ring illumination 25, side illumination for illuminating the observation surface of the observation target SP from the periphery of the objective lens 27 and dark field illumination for illuminating the observation surface of the observation target SP from the periphery of the optical axis of the objective lens 27 can also be used. These kinds of illumination are illumination used in microscopes in the past. Therefore, detailed explanation of the illumination is omitted.

The ring illumination 25, the side illumination, and the dark field illumination are suitable for observing a diffuser such as paper and an observation surface having large unevenness. Because the ring illumination 25, the side illumination, and the dark field illumination irradiate lights from the periphery of the objective lens 27 or the periphery of the optical axis, the ring illumination 25, the side illumination, and the dark field illumination have an advantage that even an inclined surface from which light does not return in the coaxial epi-illumination 24 can be illuminated brightly. A dark field objective lens can also be used.

In the principle of the focus stacking, whether the observation surface of the observation target SP is focused is used as means for determining the height of a point of the observation surface. Therefore, the ring illumination 25 (the side illumination and the dark field illumination) is sometimes more suitable than the coaxial epi-illumination 24.

Configuration of the Confocal Observation Optical System 40

The confocal observation optical system 40 shown in FIG. 3 can be configured the same as a basic structure of an optical system used in a confocal microscope in the past. The laser output section 26 is used as a light source. The confocal observation optical system 40 is configured to receive light reflected on the observation target SP with the photomultiplier tube 51. The photomultiplier tube 51 is a component for measuring the observation target SP via the confocal observation optical system 40.

The confocal observation optical system 40 includes the objective lens 27 and the electric revolver 28 of the non-confocal observation optical system 30. Therefore, the objective lens 27 and the electric revolver 28 are common to the confocal observation optical system 40 and the non-confocal observation optical system 30.

Further, the confocal observation optical system 40 includes at least a dichroic prism 41, a first lens 42, an XY scanner section 43, a quarter wavelength plate 44, a polarization beam splitter 45, a pinhole lens 46, a pinhole plate 47, and a dimming filter (an ND filter) 48. The dichroic prism 41 is a member well known in the past configured to reflect light having a specific wavelength and allow lights having other wavelengths to pass. The dichroic prism 41 is disposed on the observation optical axis of the objective lens 27. In this embodiment, the dichroic prims 41 is configured to reflect light emitted from the laser output section 26.

The first lens 42 is disposed on a reflection optical axis of the dichroic prism 41. The XY scanner section 43 is disposed between the first lens 42 and the wavelength plate 44. The pinhole lens 46, the pinhole plate 47, and the dimming filter 48 are disposed between the photomultiplier tube 51 and the polarization beam splitter 45. The laser output section 26 is disposed to emit light toward the polarization beam splitter 45. The dimming filter 48 is used to attenuate a laser beam L2 made incident on the photomultiplier tube 51. Therefore, when the laser beam L2 made incident on the photomultiplier tube 51 is sufficiently weak, the dimming filter 48 may not be provided. The dimming filter 48 is controlled by a control unit 60. The dimming filter 48 can change a dimming ratio.

The XY scanner section 43 includes a Galvano mirror 43a and a resonant mirror 43b. The Galvano mirror 43a and the resonant mirror 43b are used in the past when light is scanned. Therefore, detailed explanation of the Galvano mirror 43a and the resonant mirror 43b is omitted. The light emitted from the laser output section 26 passes through the polarization beam splitter 45 and the wavelength plate 44 and is made incident on the XY scanner section 43. The light made incident on the XY scanner 43 is two-dimensionally scanned (in the X direction and the Y direction) on the observation surface of the observation target SP according to the operation of the Galvano mirror 43a and the resonant mirror 43b. The X direction can be set as the left-right direction of the observation unit 2. The Y direction can be set as the depth direction of the observation unit 2. However, the X direction and the Y direction are not limited to these directions and can be optionally set. The Galvano mirror 43a and the resonant mirror 43b are equivalent to the scanning section of the present invention.

The XY scanner section 43 only has to be a unit configured to two-dimensionally scan light on the observation surface of the observation target SP and is not limited to the structure explained above. For example, the XY scanner section 43 may be a Galvano scanner type in which two Galvano mirrors are combined, a photoacoustic element type (a resonant type) for bonding a piezoelectric element to an acoustic optical medium made of glass and inputting an electric signal to the piezoelectric element to generate ultrasound, diffracting a laser beam passing through the acoustic optical medium, and deflecting light or a Nipkow disk type for rotating a disk including pinholes of one column or a large number of columns in a spiral shape and scanning light passed through the pinholes on the observation surface of the observation target SP.

The laser beam L2 reflected on the observation target SP passes through the objective lens 27 and the first half mirror 31 and is thereafter reflected by the second half mirror 32 to pass through the first lens 42, the XY scanner section 43, and the wavelength plate 44 and is reflected by the polarization beam splitter 45 to travel to the pinhole lens 46. The laser beam L2 made incident on the pinhole lens 46 is condensed by the pinhole lens 46 and then travels in the direction of the pinholes formed in the pinhole plate 47. The laser beam L2 passed through the pinholes passes through the dimming filter 48 and is made incident on the photomultiplier tube 51. Note that the imaging element 50 explained above can also be used instead of the photomultiplier tube 51. A light receiving element including a photodiode and an amplifier can also be used. An exposure time of the photomultiplier tube 51 can be optionally adjusted.

In the confocal observation optical system 40, in front of the photomultiplier tube 51, a pinhole is disposed in a position conjugate with the observation surface of the observation target SP. The pinhole is extremely small. Therefore, when the laser beam L2 emitted from the laser output section 26 focuses on the observation surface of the observation target SP, reflected light from the observation surface passes through the pinhole lens 46 and then is condensed in the pinhole formed in the pinhole plate 47. Consequently, because an amount of light received by the photomultiplier tube 51 becomes extremely large, a light intensity value (a luminance value) increases. ON the other hand, when the laser beam L2 does not focus on the observation surface of the observation target SP, reflected light from the observation surface is blocked by the pinhole plate 47 and hardly passes through the pinhole. Therefore, the amount of light received by the photomultiplier tube 51 becomes extremely small. The luminance value decreases.

Therefore, in a two-dimensional scanning region (an imaging region or a measuring region) of the laser beam L2 by the XY scanner section 43, a focused portion on the observation surface of the observation target SP is bright. On the other hand, portions having the other heights are dark. In the confocal observation optical system 40, because the confocal observation optical system 40 is an optical system including a point light source, luminance information excellent in resolution can be acquired.

Configuration of the Laser Output Section 26

The laser output section 26 is a device that generates and emits a laser beam for illuminating the observation target SP via the objective lens 27. The laser output section 26 functions as a light source for the confocal observation optical system 40. As the laser output section 26, for example, a He—Ne gas laser or a semiconductor laser can be used. Various light sources that can generate a point light source can be used instead of the laser output section 26. The laser output section 26 may be, for example, a combination of a high luminance lamp and a slit. The light source may be a point light source or may be a light source that generates a belt-like beam.

Configuration of a Z-Axis Moving Mechanism

The observation unit 2 includes a Z-axis driving section (a vertical moving mechanism) 52 (schematically shown in FIGS. 1 and 3) capable of changing the relative distance between the objective lens 27 and the electric placement table 23 and a height-information detecting section (height-information detecting means) 53 (shown in FIG. 4) that detects height information. The Z-axis driving section 52 includes, for example, a stepping motor and a motion converting mechanism that converts rotation of an output shaft of the stepping motor into a linear motion in the up-down direction. The Z-axis driving section 52 is provided in the head section 22. The stepping motor of the Z-axis driving section 52 is rotated, whereby the electric revolver 28 moves in the up-down direction. Consequently, the relative distance between the objective lens 27 and the electric placement table 23 can be changed. The Z-axis driving section 52 has accuracy that can set a changing pitch of the relative distance between the objective lens 27 and the electric placement table 23 to a minimum of approximately 1 nm.

The height-information detecting section 53 is configured by a linear scale (a linear encoder) or the like that can detect the relative distance between the objective lens 27 and the electric placement table 23. The height-information detecting section 53 is configured to be capable of detecting a change in the relative distance between the objective lens 27 and the electric placement table 23 even when the change is 1 nm. In this embodiment, the electric placement table 23 is movable in a Z-axis direction. The objective lens 27 is also movable in the Z-axis direction. During a focus search, the objective lens 27 is driven in the Z-axis direction in a fixed state of the electric placement table 23. As a result, the relative distance between the objective lens 27 and the electric placement table 23 changes. Height information can be detected by detecting, with the linear scale, a position in the Z-axis direction of the objective lens 27 at that time. Note that the objective lens 27 may be fixed not to move in the Z-axis direction. During the focus search, the electric placement table 23 may be driven in the Z-axis direction. In this case, height information can be detected by detecting, with the linear scale, a position in the Z-axis direction of the electric placement table 23. That is, height information can be detected by the height-information detecting section 53 irrespective of which of the electric placement table 23 and the objective lens 27 is driven in the Z-axis direction during the focus search.

The observation optical system includes an autofocus mechanism for focusing on the observation target SP. The autofocus mechanism can be configured by the Z-axis driving section 52. That is, the relative distance between the objective lens 27 and the observation target SP placed on the electric placement table 23 can be changed by the Z-axis driving section 52. Therefore, the autofocus mechanism can be realized by moving, using an algorithm similar to a well-known contrast AF or the like, the objective lens 27 in the up-down direction with the Z-axis driving section 52 until the observation target SP is focused.

Configuration of a Stage Driving Section 54

A stage driving section 54 is a device for moving the electric placement table 23 in the horizontal direction (the X direction and the Y direction). That is, the electric placement table 23 is separate from a placement-table supporting member 23A shown in FIG. 1 and is supported movably in the horizontal direction with respect to the placement-table supporting member 23A. The electric placement table 23 includes an actuator such as a linear motor. The electric placement table 23 can be moved in the X direction and the Y direction within a predetermined range in the placement-table supporting member 23A by the actuator.

Configuration of the Control Unit 60

The observation unit 2 includes the control unit 60. The control unit 60 may be provided in the external unit 3 or may be provided in the terminal for operation 4. The control unit 60 is a unit for controlling the sections of the magnifying observation apparatus 1 and performing various arithmetic operations, various kinds of processing, and the like. The control unit 60 can be configured by a CPU or a MPU, a system LSI, a DSP, dedicated hardware, and the like. The control unit 60 is implemented with various functions as explained below. The functions may be realized by a logic circuit or may be realized by execution of software. The control unit 60 is explained in detail below.

The laser output section 26, the coaxial epi-illumination 24, the ring illumination 25, the electric revolver 28, the XY scanner section 43, the dimming filter 48, the imaging element 50, the photomultiplier tube 51, the Z-axis driving section 52, the height-information detecting section 53, and the stage driving section 54 are connected to the control unit 60. The laser output section 26, the coaxial epi-illumination 24, the ring illumination 25, the electric revolver 28, the XY scanner section 43, the dimming filter 48, the imaging element 50, the photomultiplier tube 51, the Z-axis driving section 52, and the stage driving section 54 are controlled by the control unit 60. Output signals of the imaging element 50, the photomultiplier tube 51, and the height-information detecting section 53 are input to the control unit 60.

Configuration of an Electric-Revolver Control Section 61

The control unit 60 includes an electric-revolver control section (a magnifying-mechanism control section) 61 that controls the electric revolver 28 in order to change the magnification of the observation optical system. The electric-revolver control section 61 rotates the electric revolver 28 to set a desired objective lens 27 as the objective lens 27 of the non-confocal observation optical system 30 and the confocal observation optical system 40. The user selects a desired objective lens 27 with operation of a switch, the keyboard 6, the mouse 7, or the like in advance out of a plurality of objective lenses 27 attached to the electric revolver 28. Then, the electric-revolver control section 61 rotates the electric revolver 28 to set the selected objective lens 27 as the objective lens 27 of the non-confocal observation optical system 30 and the confocal observation optical system 40. Thereafter, the electric-revolver control section 61 stops the electric revolver 28.

As shown in FIG. 5, the objective lenses 27A and 27B having different magnifications are attached to the electric revolver 28. Information concerning which objective lenses 27A and 27B are attached to which attachment holes 28a of the electric revolver 28 is stored in a storing section 73 included in the control unit 60. Therefore, the electric-revolver control section 61 can control the electric revolver 28 as explained above on the basis of the information stored in the storing section 73 and information concerning selection by the user. The information concerning which objective lenses 27A and 27B are attached to which attachment holes 28a of the electric revolver 28 may be input by the user from the terminal for operation 4. The objective lens 27 may be automatically recognized by a sensor of the electric revolver 28.

By controlling the electric revolver 28, the magnification of the non-confocal observation optical system 30 and the confocal observation optical system 40 can be changed. An objective lens (not shown in FIG. 5) formed by an electric zoom lens may be provided in addition to or instead of the electric revolver 28. The electric zoom lens is an electric magnifying mechanism. By operating the electric zoom lens, the magnification of the non-confocal observation optical system 30 and the confocal observation optical system 40 can be changed. In this case, a portion that controls the electric zoom lens functions as a magnifying-mechanism control section. The magnifying-mechanism control section controls the electric zoom lens on the basis of the information concerning selection by the user, whereby a desired magnification can be obtained.

The electric revolver 28 can be operated via a user interface displayed on the display section 5 or can be operated by a switch or the like provided in the observation unit 2. By adopting the electric revolver 28, the user does not need to turn a revolver with a hand. Therefore, dust and the like do not fall on the observation target SP when the revolver is turned.

Configuration of a Placement-Table Control Section 62

Figure 4:
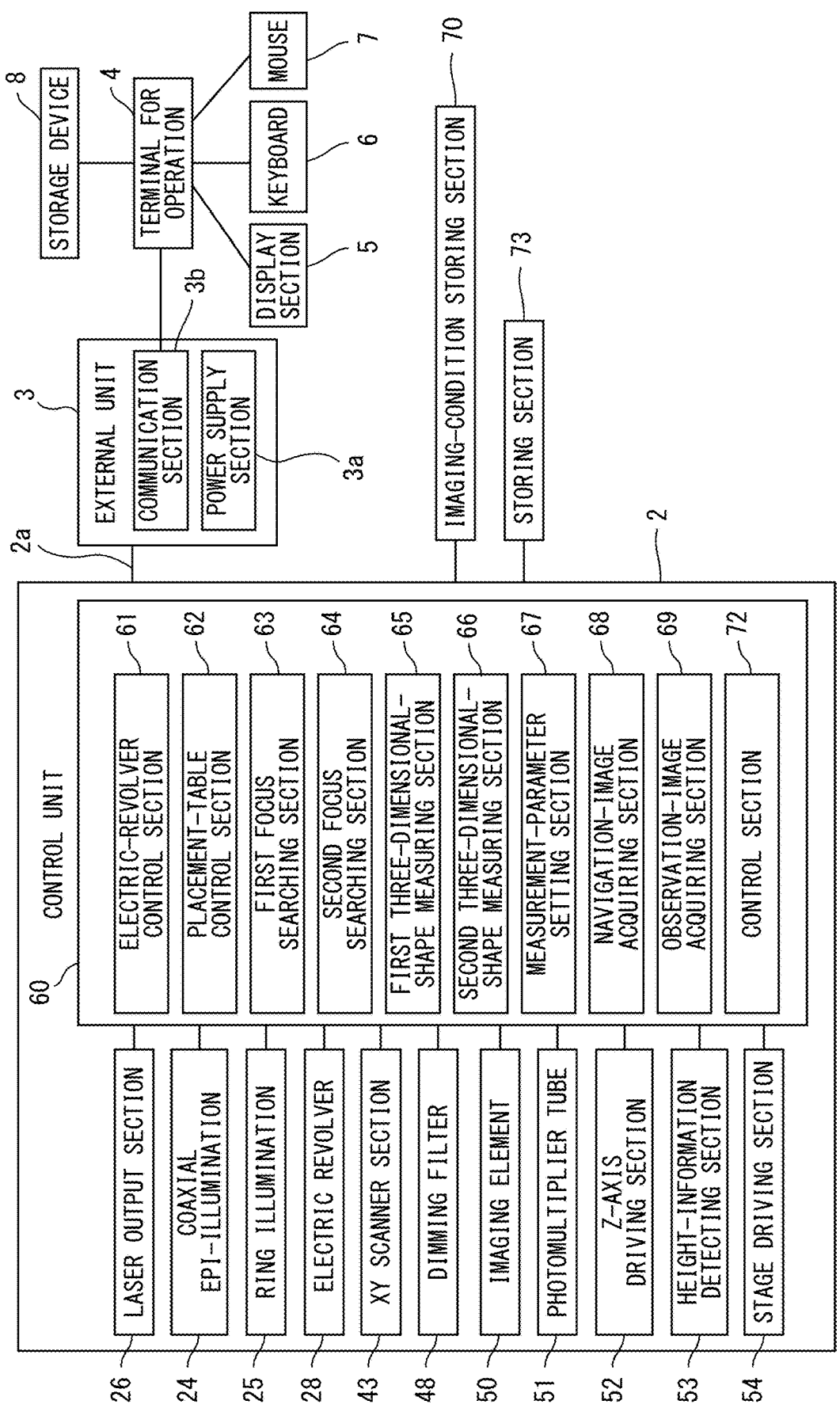
FIG. 4 is a block diagram of the magnifying observation apparatus.

As shown in FIG. 4, the control unit 60 includes a placement-table control section 62 that changes a horizontal position of the electric placement table 23. The placement-table control section 62 can change the horizontal position of the electric placement table 23 by controlling the stage driving section 54. The horizontal position of the electric placement table 23 can be designated by, for example, an X coordinate and a Y coordinate of the center of the electric placement table 23. The placement-table control section 62 changes the horizontal position of the electric placement table 23, for example, when a navigation image explained below is acquired, when the navigation image is acquired again, and when the navigation image is additionally acquired. The placement-table control section 62 changes the horizontal position of the electric placement table 23 not only in these cases. When the user designates an observation range and a position, the placement-table control section 62 changes the horizontal position of the electric placement table 23 such that the designated range can be observed.

Configuration of Focus Searching Sections

The control unit 60 includes a first focus searching section 63 that performs the focus search on the basis of the height information detected by the height-information detecting section 53 according to the relative distance changed by the Z-axis driving section 52 and the image acquired by the imaging element 50 and a second focus searching section 64 that performs the focus search on the basis of the height information detected by the height-information detecting section 53 according to the relative distance changed by the Z-axis driving section 52 and the signal acquired by the photomultiplier tube 51. The relative distance is a distance obtained on the basis of the height information detected by the height-information detecting section 53. The relative distance can be set to the distance between the distal end face of the objective lens 27 and the upper surface of the electric placement table 23. However, the relative distance is not limited to this distance. The relative distance can be set to a separation distance in the up-down direction between a predetermined part of the objective lens 27 and a predetermined part of the electric placement table 23.

The first focus searching section 63 illuminates the observation target SP with at least one of the coaxial epi-illumination 24 and the ring illumination 25 and executes the focus search on the basis of the image acquired by the imaging element 50. Specifically, the first focus searching section 63 focuses on the observation target SP on the basis of the image acquired by the imaging element 50 while controlling the Z-axis driving section 52 to change the relative distance between objective lens 27 and the electric placement table 23. A relative distance obtained on the basis of height information detected by the height-information detecting section 53 when the observation target SP is focused is stored in the storing section 73. This relative distance is a focus position (a focusing position) acquired by the first focus searching section 63.

The second focus searching section 64 illuminates the observation target SP with the laser output section 26 and executes the focus search on the basis of the signal acquired by the photomultiplier tube 51. Specifically, the second focus searching section 64 focuses on the observation target SP on the basis of the signal acquired by the photomultiplier tube 51 while controlling the Z-axis driving section 52 and changing the relative distance between the objective lens 27 and the electric placement table 23. At this time, as explained above, the second focus searching section 64 can determine that the observation target SP is focused when a light receiving amount in the photomultiplier tube 51 is the largest. Details of this determination procedure are explained below. A relative distance obtained on the basis of the height information detected by the height-information detecting section 53 when the observation target SP is focused is stored in the storing section 73. This relative distance is a focus position (a focusing position) acquired by the second focus searching section 64.

Configuration of a Three-Dimensional-Shape Measuring Section

The control unit 60 includes a first three-dimensional-shape measuring section 65 that measures a three-dimensional shape of the observation target SP on the basis of the focus position searched by the first focus searching section 63 and a second three-dimensional-shape measuring section 66 that measures a three-dimensional shape of the observation target SP on the basis of the focus position searched by the second focus searching section 64. The three-dimensional shape of the observation target SP can be called surface shape or texture of the observation target SP as well.

The first three-dimensional-shape measuring section 65 acquires, making use of the principle of the focus stacking, an image with which a three-dimensional shape of the observation surface of the observation target SP can be grasped. The image acquired by the first three-dimensional-shape measuring section 65 can be called depth combined image as well. The depth combined image is an image obtained by, when a level difference of a measurement target portion of the observation target SP exceeds a depth of field of the objective lens 27, extracting only focused portions (pixels) out of images separately captured by the imaging element 50 with a height direction varied and combining the portions. Depth combination processing only has to be performed to generate the depth combined image. The depth combination processing is processing for, while moving the objective lens 27 in the Z-axis direction (the height direction) with the Z-axis driving section 52, capturing a plurality of still images with the imaging element 50 and combining focused regions to form an image focused in a screen entire region. In this case, several ten to several hundred still images are used according to a changing pitch or the like for changing a range in the Z-axis direction and a position in the Z-axis direction.

The imaging element 50 can acquire color information. Therefore, the first three-dimensional-shape measuring section 65 can acquire a color image indicating the observation target SP.

The second three-dimensional-shape measuring section 66 acquires, making use of the principle of the laser confocus, an image with which a three-dimensional shape of the observation surface of the observation target SP can be grasped. The second three-dimensional-shape measuring section 66 generates confocal image data as explained below. The confocal image data is generated for each of unit regions on the observation target SP. The unit regions are decided according to the magnification of the objective lens 27.

First, in a state in which the position in the Z direction of the observation target SP is fixed, the laser beam L2 is scanned in the X direction at the end portion in the Y direction in the unit region by the XY scanner section 43. When the scanning in the X direction ends, the laser beam L2 is moved in the Y direction by a fixed interval by the XY scanner section 43. The laser beam L2 is scanned in the X direction in this state. The scanning in the X direction and the movement in the Y direction of the laser beam L2 in the unit region are repeated, whereby the scanning in the X direction and the Y direction in the unit region ends. Subsequently, the objective lens 27 is moved in the Z-axis direction by the Z-axis driving section 52. Consequently, the position in the Z direction of the objective lens 27 changes to a state different from the last time. In this state, the scanning in the X direction and the Y direction in the unit region is performed. Thereafter, the position in the Z direction of the objective lens 27 is moved at a predetermined changing pitch explained below. The scanning in the X direction and the Y direction in the unit region is performed. This processing is repeated.

The number of pixels in the X direction of the confocal image data is determined by scanning speed and a sampling cycle in the X direction of the laser beam L2 by the XY scanner section 43. The number of samplings in scanning in the X direction performed once (one scanning line) is the number of pixels in the X direction. The number of pixels in the Y direction is determined by a displacement amount in the Y direction of the laser beam L2 by the XY scanner section 43 at every end of the scanning in the X direction. The number of scanning lines in the Y direction is the number of pixels in the Y direction.

When the scanning in the X direction and the Y direction in the unit region ends, the placement-table control section 62 controls the stage driving section 54 to move the electric placement table 23 in the X direction or the Y direction and performs the scanning in the X direction and the Y direction in another unit region in the same manner. The placement-table control section 62 repeats this processing to perform the scanning in the X direction and the Y direction in a plurality of unit regions. Obtained confocal image data of the unit regions can be coupled into one confocal image data.

Figure 7:
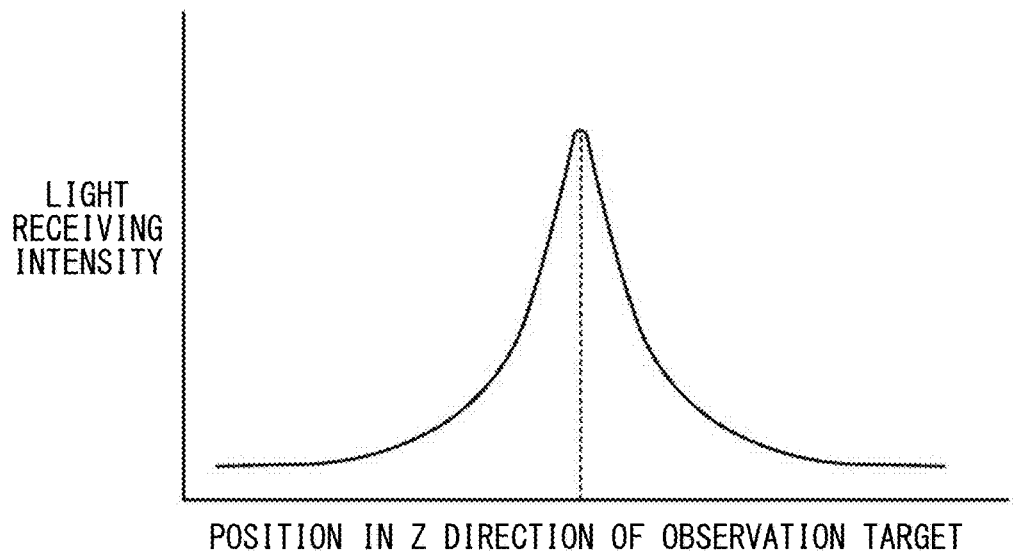
FIG. 7 is a diagram showing a relation between a position in a Z direction of an observation target and light receiving intensity in one pixel.

FIG. 7 is a diagram showing a relation between a position in the Z direction of the observation target SP and light receiving intensity (a light receiving amount) of the photomultiplier tube 51 in one pixel. As explained above, in the confocal observation optical system 40, when the observation surface of the observation target SP is present in the focus position of the objective lens 27, the laser beam L2 reflected on the observation surface of the observation target SP is condensed in the pinhole formed in the pinhole plate 47. Consequently, most of the laser beam L2 reflected on the observation surface of the observation target SP passes through the pinhole formed in the pinhole plate 47 and is made incident on the photomultiplier tube 51. Therefore, the light receiving intensity of the photomultiplier tube 51 is maximized. Accordingly, a voltage value of a light reception signal output from the photomultiplier tube 51 is maximized.

On the other hand, when the observation surface of the observation target SP is present in a position deviating from the focus position of the objective lens 27, the laser beam L2 reflected on the observation surface of the observation target SP is condensed in front of or behind the pinhole formed in the pinhole plate 47. Therefore, the voltage value of the light reception signal output from the photomultiplier tube 51 greatly decreases.

In this way, a steep peak appears in a light receiving intensity distribution of the photomultiplier tube 51 in a state in which the observation surface of the observation target SP is present in the focus position of the objective lens 27. A light receiving intensity distribution in the Z direction can be obtained for each of pixels from the confocal image data of the unit regions. Consequently, a peak position (a Z coordinate) and peak light receiving intensity of the light receiving intensity distribution can be obtained for each of the pixels.

Data indicating peak positions in the Z direction concerning the pixels can be called height image data (three-dimensional shape data). An image displayed on the basis of the height image data can be called height image. The height image is an image with which a three-dimensional shape of the observation surface of the observation target SP can be grasped.

That is, in the principle of the laser confocus, it is determined that a peak position of a light receiving amount by the photomultiplier tube 51 at the time when the relative distance is changed for each of the pixels is a focus position making use of the fact that the light receiving amount by the photomultiplier tube 51 is the largest during focusing and the light receiving amount by the photomultiplier tube 51 steeply decreases further away from a focused state with a selective light blocking section such as a pinhole.

On the other hand, in the principle of the focus stacking, a focus value indicating a degree of focusing is calculated for each of the pixels from the image acquired by the imaging element 50 on the basis of contrast, a high spatial frequency component, and the like. It is determined that a peak position of the focus value at the time when the relative distance is changed for each of the pixels is a focus position.

"Unfocused" means that there is no luminance difference between adjacent pixels (a luminance ratio is close to 1). Conversely, "focused" is a state in which the luminance difference (a luminance ratio) between the adjacent pixels is large compared with an unfocused state.

That is, the principle of the focus stacking and the principle of the laser confocus are different only in a method of focus determination and are the same in that "a height image (a three-dimensional shape image) in which relative distances at which images best focused at points of the observation surface are captured at points of the observation surface are heights of the points" is obtained and "images best focused at the points of the observation surface are combined and a depth combined image focused at the points" are obtained.

Measuring Procedure

Figure 8:
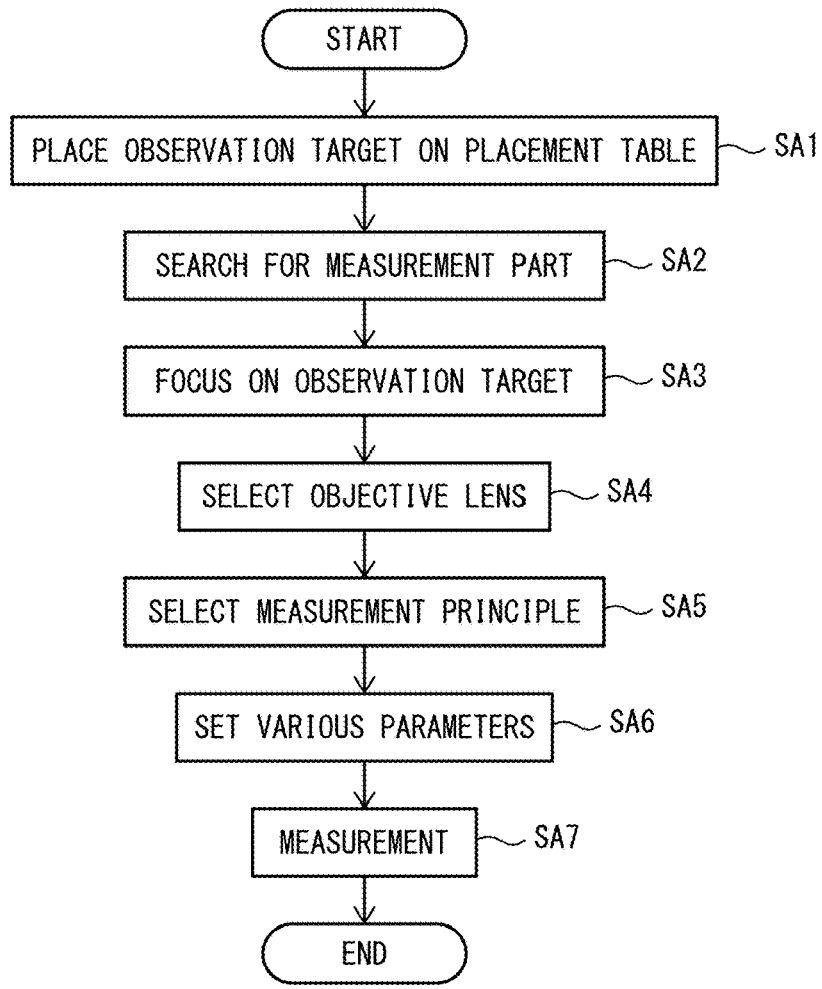
FIG. 8 is a flowchart for explaining a procedure during measurement.

FIG. 8 is a flowchart for explaining a procedure for performing measurement and observation of the observation target SP using the magnifying observation apparatus 1. After the magnifying observation apparatus 1 is started, in step SA1, the observation target SP is placed on the electric placement table 23. Thereafter, in step SA2, a measurement part (an observation part) of the observation target SP is searched. In step SA3, the measurement part of the observation target SP is focused. This can be performed by the autofocus mechanism explained above.

After the focusing, in step SA4, the objective lens 27 is selected. When the objective lens 27 is selected, the electric revolver 28 rotates to enable observation by the selected objective lens 27. Subsequently, in step SA5, a measurement principle is selected. The measurement principle is the focus stacking and the laser confocus. One of the focus stacking and the laser confocus is selected. In step SA6, various parameters are set. In step SA7, measurement of the measurement part of the observation target SP is performed.

In the steps, user interfaces are displayed on the display section 5 according to necessity. The user interfaces displayed on the display section 5 are explained in detail below.

Configuration of a UI Generating Section 72a

As shown in FIG. 4, the control unit 60 includes a control section 72. As shown in FIG. 6, the control section 72 includes a UI generating section 72a. The UI generating section 72a is a portion that generates a user interface displayed on the display section 5. Data of the user interface generated by the UI generating section 72a is sent to the terminal for operation 4 and displayed on the display section 5. Design of the user interface explained below is an example. Display forms of regions, buttons, menus, and the like can be changed to other forms having the same functions. Display positions of the regions, the buttons, the menus, and the like are not limited to positions shown in the drawings and can be optionally set.

Figure 9:
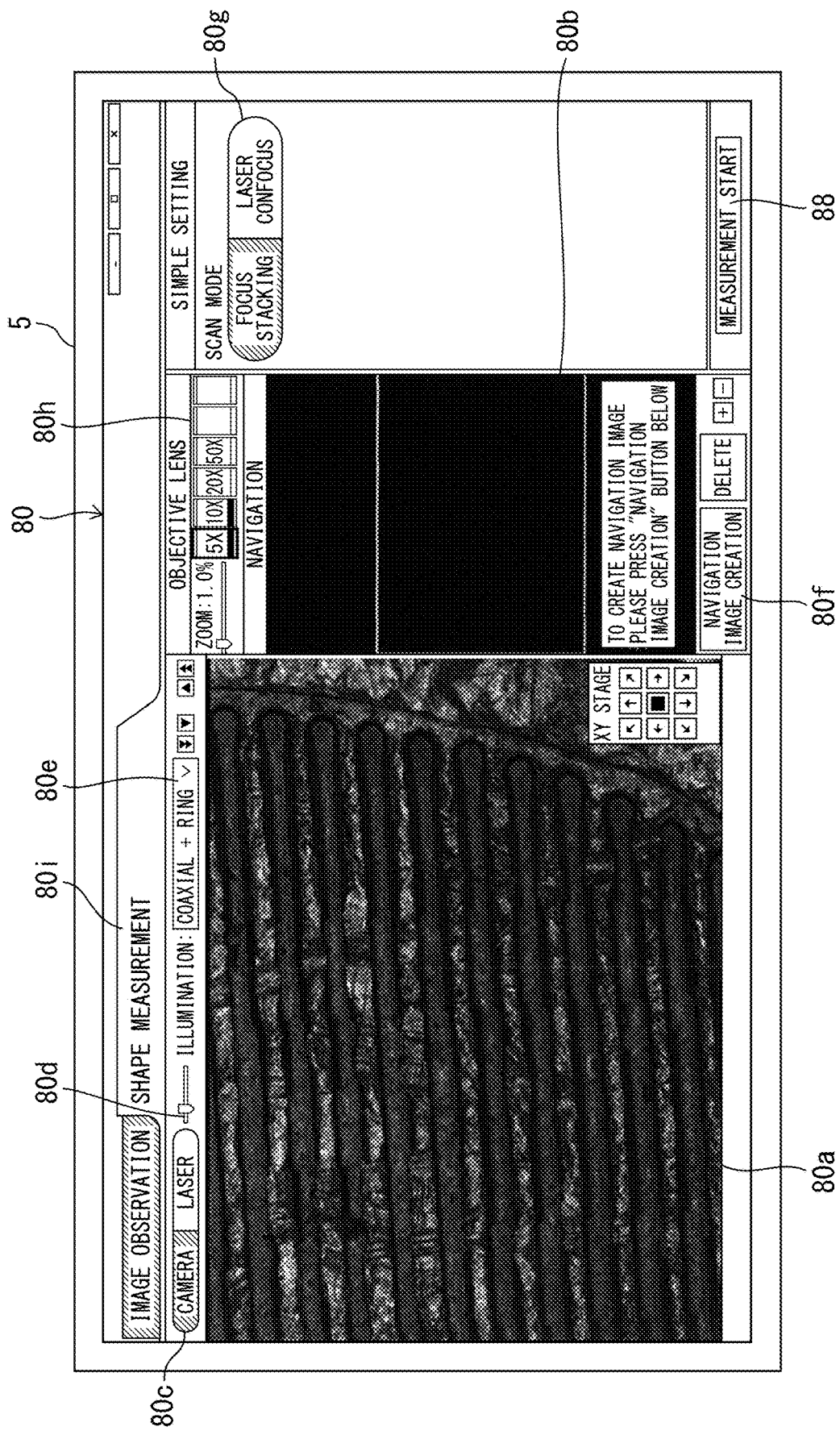
FIG. 9 is a diagram showing a user interface displayed on a display section immediately after startup.

The UI generating section 72a generates a post-startup user interface 80 displayed on the display section 5 after the startup of the magnifying observation apparatus 1 (see FIG. 9). In the post-startup user interface 80, a live image display region 80a for displaying a live image indicating a temporal change of the observation target SP and a navigation image display region 80b for displaying the navigation image for observation range setting are provided side by side in the left-right direction. In this embodiment, the live image display region 80a is large compared with the navigation image display region 80b. The live image is an image displayed while an image of the observation target SP sequentially acquired by the imaging element 50 is sequentially updated.

In the live image display region 80a, images of the observation target SP placed on the electric placement table 23 are displayed as a moving image substantially on a real-time basis. One of a first live image indicating a temporal change of the observation target SP acquired by the imaging element 50 via the non-confocal observation optical system 30 and a second live image indicating a temporal change of the observation target SP acquired by the photomultiplier tube 51 via the confocal observation optical system 40 can be selected and displayed. The live image can be called a live view as well. By causing the display section 5 to display the live image, the user is capable of viewing the live image and confirming a change result substantially on a real-time basis when the user perform various setting changes. Therefore, convenience can be improved.

A first live image acquired by the imaging element 50 via the non-confocal observation optical system 30 and a second live image acquired by the photomultiplier tube 51 via the confocal observation optical system 40 are explained in detail.

The first live image acquired by the imaging element 50 via the non-confocal observation optical system 30 is a so-called normal microscopic image before depth combination. Therefore, in the first live image, although an unfocused and blurred region is wide, a color and a rough exterior can be confirmed. The first live image is generally a familiar image and is sufficient as an image for reference for setting various parameters. For a user unaccustomed to the second live image acquired by the photomultiplier tube 51 via the confocal observation optical system 40, it is sometimes more intuitive and desirable to determine an observation position of the observation target SP and set various parameters while referring to the normal microscopic image (the first live image) even when an image with which a three-dimensional shape of the observation surface of the observation target SP can be grasped by the second three-dimensional-shape measuring section 66 is acquired.

On the other hand, the second live image acquired by the photomultiplier tube 51 via the confocal observation optical system 40 is a confocal image before depth combination. Therefore, in the second live image, an unfocused region is reflected pitch-dark and it is hard to grasp an overall image of the observation target SP. Because the second live image shows only luminance information, a color cannot be confirmed. A practice is necessary to grasp which portion of the observation target SP is reflected. If an image with which a three-dimensional shape of the observation surface of the observation target SP can be grasped by the second three-dimensional-shape measuring section 66 is acquired, for a person familiar with the confocal image (the second live image), it is sometimes more intuitive and desirable to determine an observation position of the observation target SP and set parameters while referring to the second live image.

Figure 10:
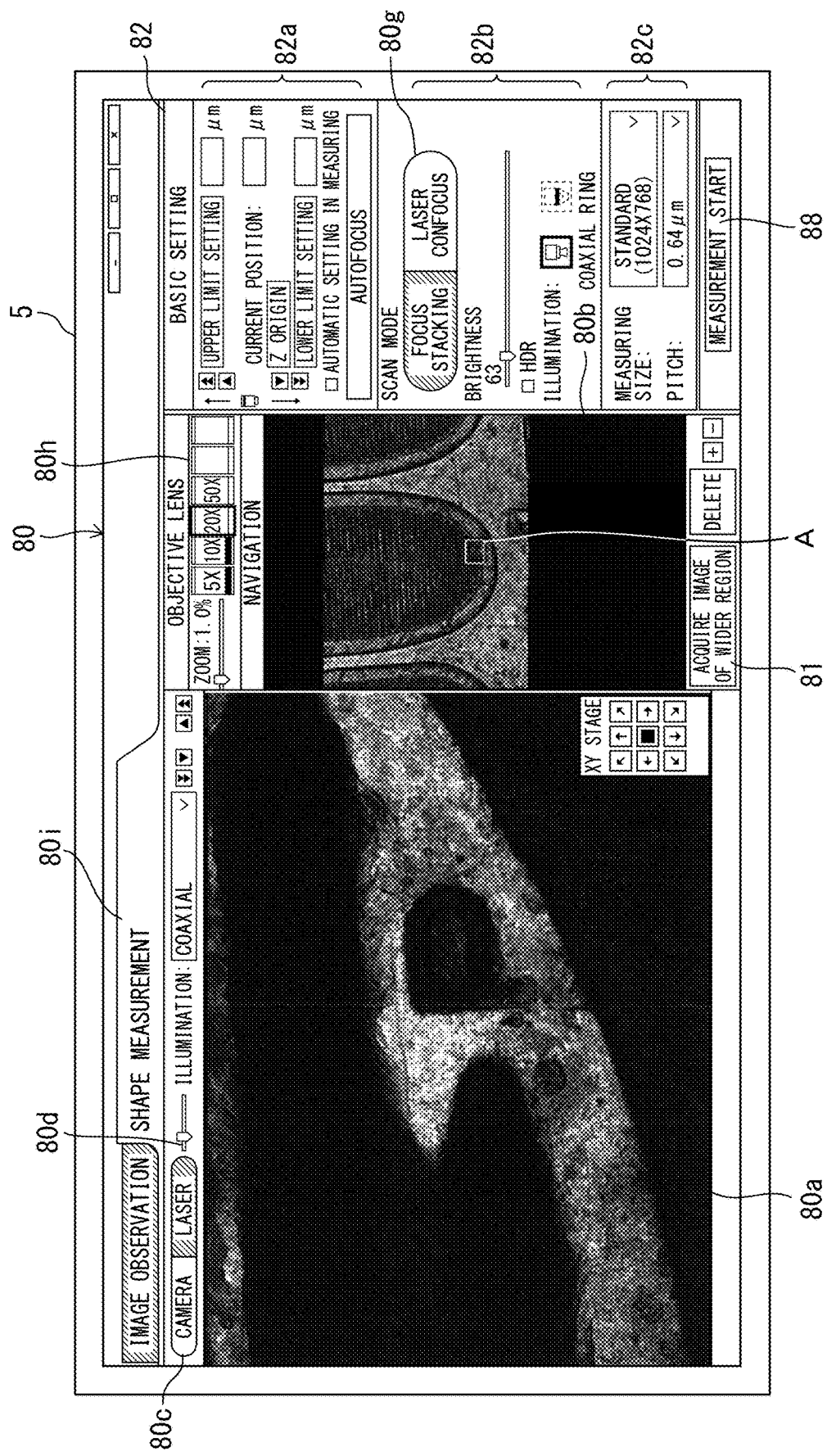
FIG. 10 is a diagram showing a user interface on which a live image acquired by a photomultiplier tube via a confocal observation optical system is displayed.

Above the live image display region 80a of the post-startup user interface 80, a live image selection button 80c including a "camera" button and a "laser" button is displayed on the left side of the post-startup user interface 80. When the live image selection button 80c is operated by the mouse 7 or the like and the "camera" button is pressed, the first live image acquired by the imaging element 50 via the non-confocal observation optical system 30 is displayed in the live image display region 80a. When the "laser" button is pressed, the second live image acquired by the photomultiplier tube 51 via the confocal observation optical system 40 is displayed in the live image display region 80*a* (see FIG. 10). That is, the control section 72 is configured to generate the live image display region 80*a* for selecting one of the first live image and the second live image and enabling the selected live image to be displayed and cause the display section 5 to display the live image. This is executed by the control unit 60 controlling the sections.

Above the live image display region 80*a* of the post-startup user interface 80, a brightness adjusting section 80*d* that adjusts the brightness of the displayed live image is provided. By operating the brightness adjusting section 80*d* with the mouse 7 or the like, the brightness of the live image displayed in the live image display region 80*a* can be adjusted.

Figure 11:
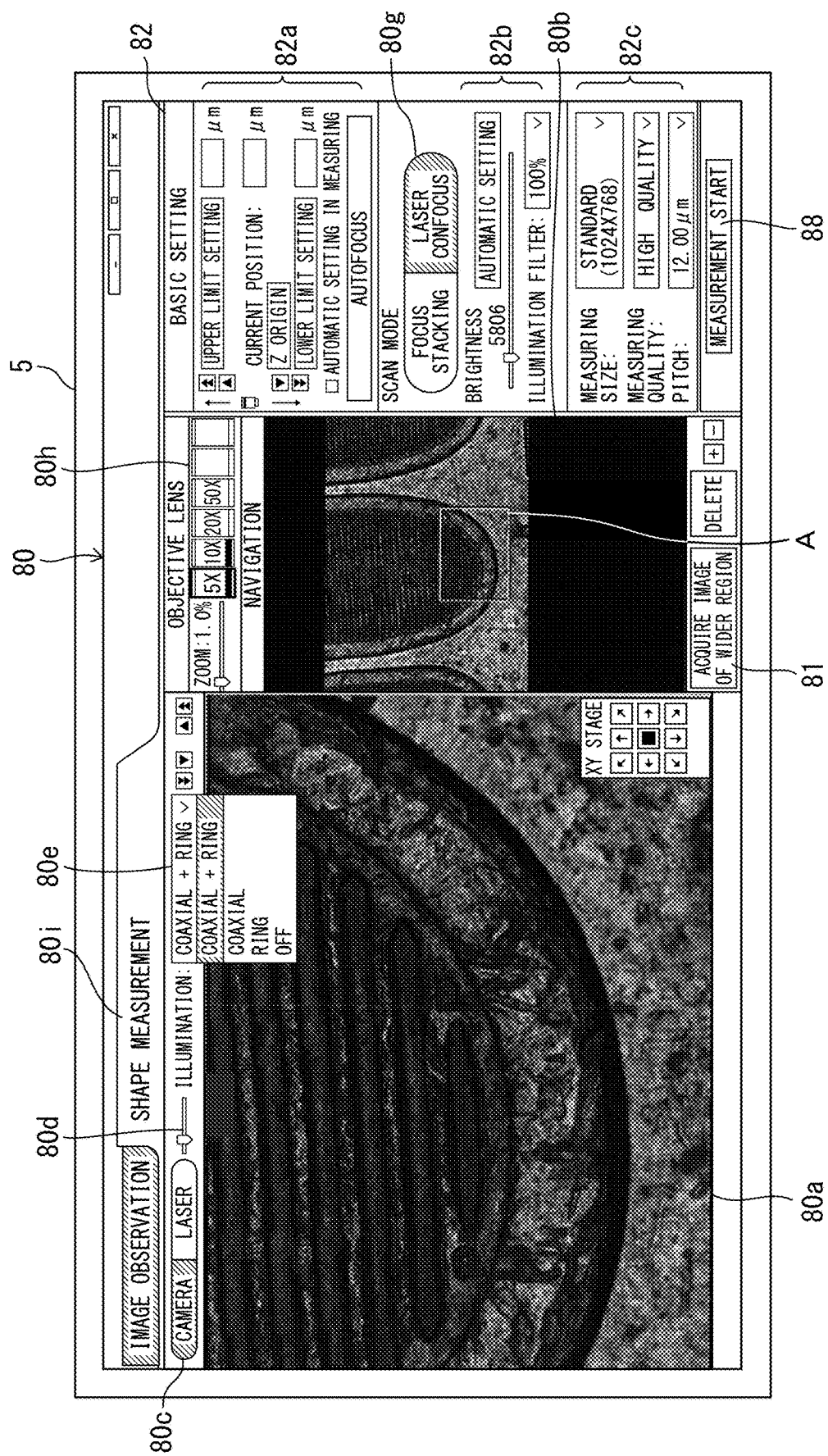
FIG. 11 is a diagram showing a user interface displayed during illumination selection.

Above the live image display region 80*a* of the post-startup user interface 80, an illumination selection button 80*e* for selecting illumination in performing imaging with the imaging element 50 via the non-confocal observation optical system 30 is provided. When the illumination selection button 80*e* is operated by the mouse 7 or the like, choices are displayed as shown in FIG. 11. The choices are four choices of "coaxial+ring", "coaxial", "ring", and "OFF". When the "coaxial+ring" is selected, an illumination control section 72*c* (shown in FIG. 6) included in the control section 72 lights both of the coaxial epi-illumination 24 and the ring illumination 25. When the "coaxial" is selected, the illumination control section 72*c* lights the coaxial epi-illumination 24 and extinguishes the ring illumination 25. When the "ring" is selected, the illumination control section 72*c* extinguishes the coaxial epi-illumination 24 and lights the ring illumination 25. When the "OFF" is selected, the illumination control section 72*c* extinguishes both of the coaxial epi-illumination 24 and the ring illumination 25.

Figure 12:
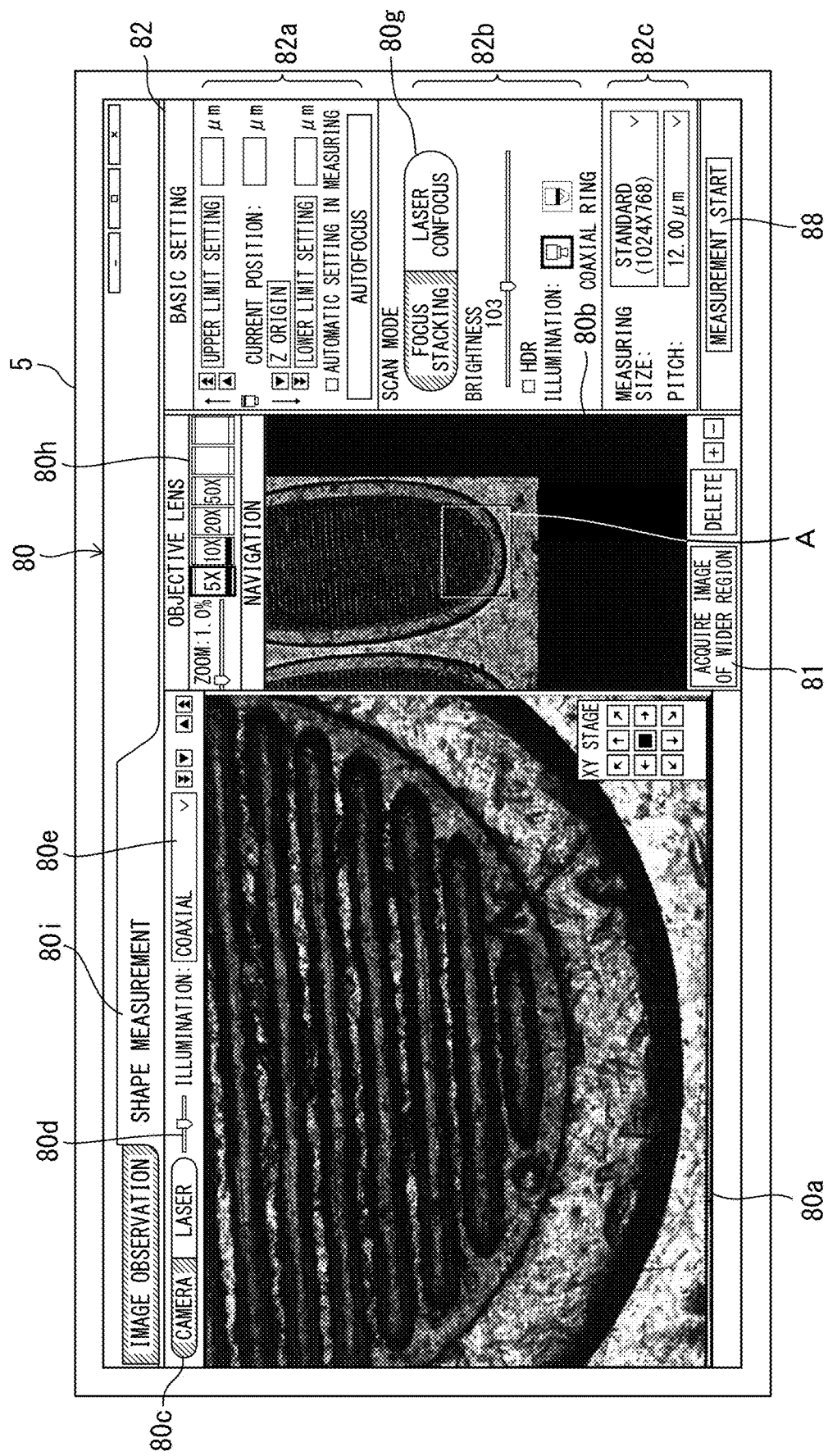
FIG. 12 is a diagram showing a user interface on which a live image captured by only coaxial epi-illumination is displayed.
Figure 13:
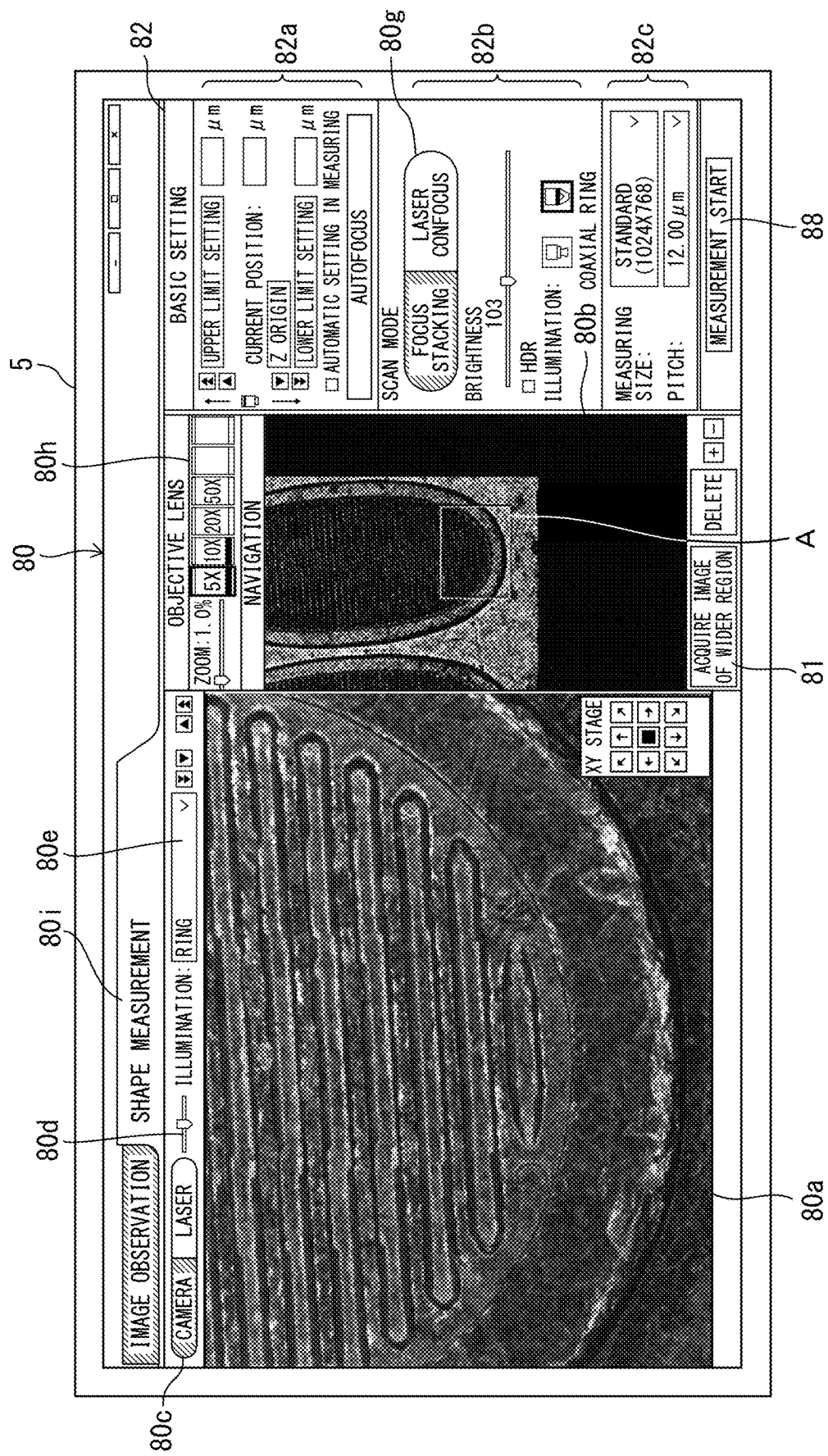
FIG. 13 is a diagram showing a user interface on which a live image captured by only ring illumination is displayed.
Figure 14:
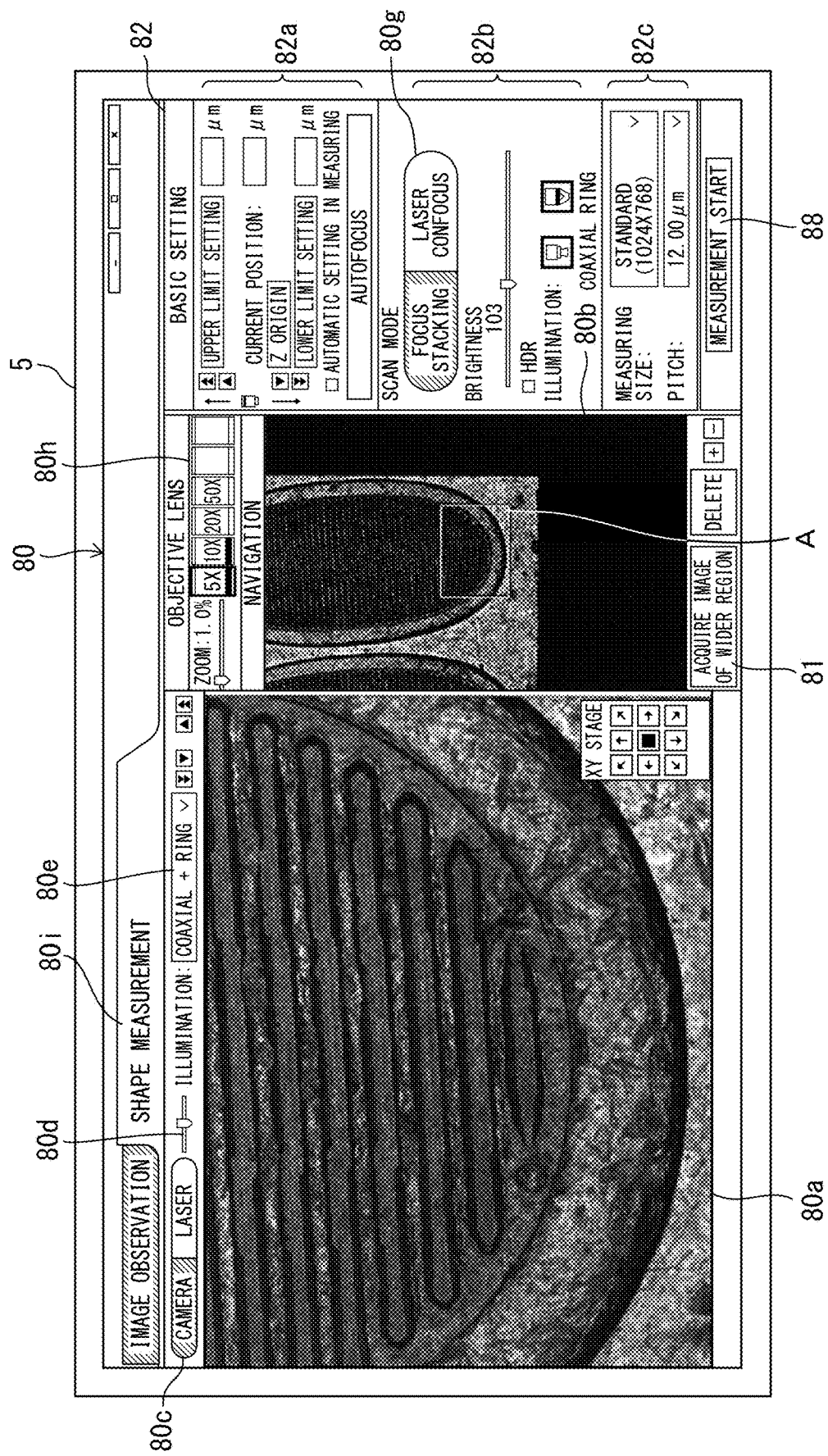
FIG. 14 is a diagram showing a user interface on which a live image captured by the coaxial epi-illumination and the ring illumination is displayed.

FIG. 12 shows a first live image captured using only the coaxial epi-illumination 24. FIG. 13 shows a first live image captured using only the ring illumination 25. FIG. 14 shows a first live image captured using both of the coaxial epi-illumination 24 and the ring illumination 25.

Figure 15:
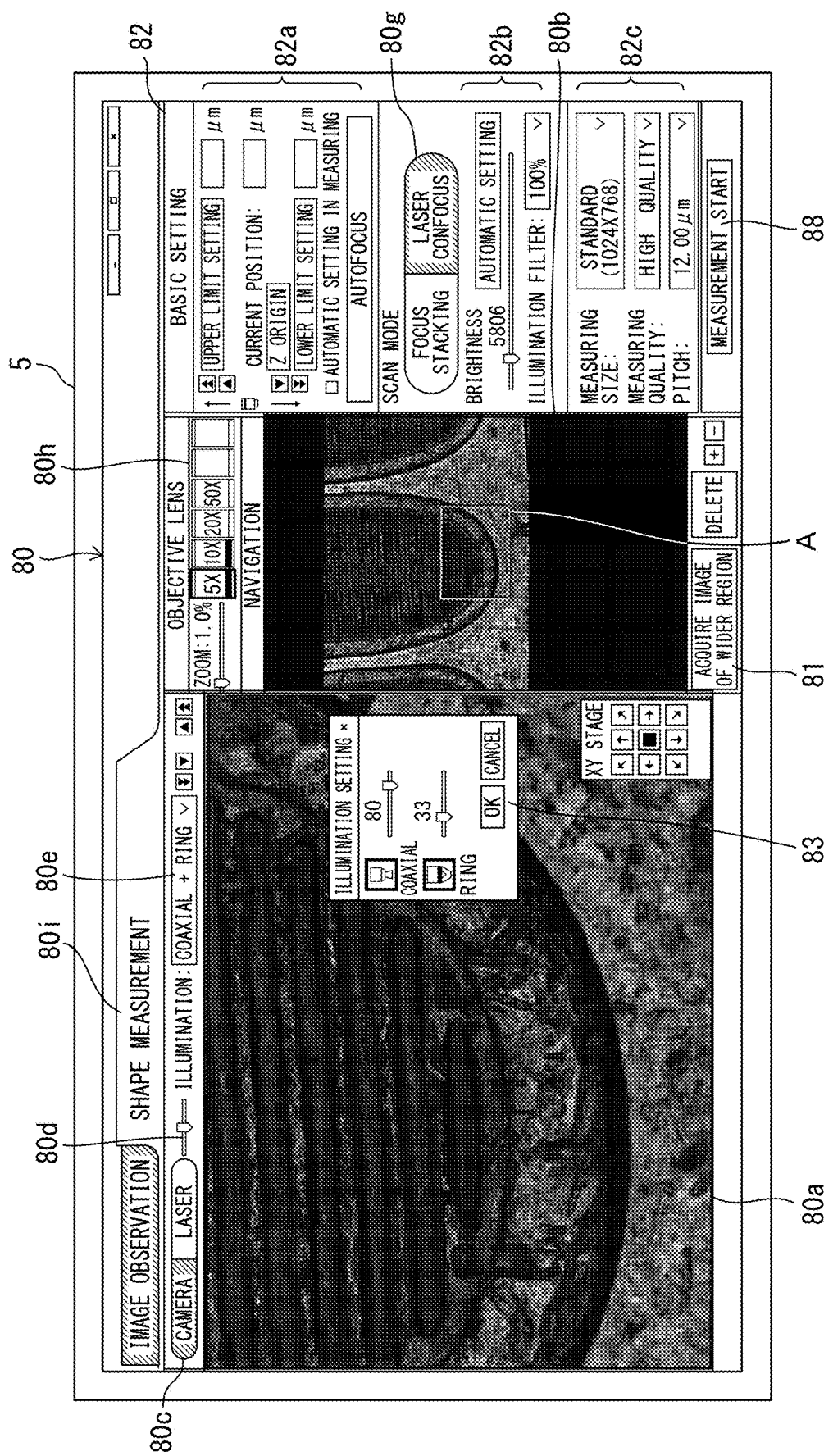
FIG. 15 is a diagram showing a user interface displayed during illumination light amount adjustment.

The illumination control section 72*c* is configured to be capable of separately adjusting a light amount of the coaxial epi-illumination 24 and a light amount of the ring illumination 25. For example, when the "coaxial+ring" is selected and the coaxial epi-illumination 24 and the ring illumination 25 are simultaneously illuminating the observation target SP, the illumination control section 72*c* is capable of adjusting the light amount of the coaxial epi-illumination 24 and the light amount of the ring illumination 25 independently from each other. That is, when the "coaxial+ring" is selected, as shown in FIG. 15, a light amount adjustment region 83 for adjusting the light amount of the coaxial epi-illumination 24 and the light amount of the ring illumination 25 independently from each other is displayed. The light amount adjustment region 83 can respectively change the light amount of the coaxial epi-illumination 24 and the light amount of the ring illumination 25 between 0 and 100. As a value is smaller, the light amount decreases. The light amount adjustment region 83 can be extinguished by operating an "OK" button or a "cancel" button displayed in the region. The illumination control section 72*c* controls the light amounts of the coaxial epi-illumination 24 and the ring illumination 25 on the basis of an adjustment result.

The user can manually adjust the control of the coaxial epi-illumination 24 and the ring illumination 25. However, the illumination control section 72*c* can be configured to automatically adjust the control of the coaxial epi-illumination 24 and the ring illumination 25. For example, the control section 72 analyzes a histogram of an image captured by the imaging element 50. The illumination control section 72*c* controls at least one of the coaxial epi-illumination 24 and the ring illumination 25 to reduce a light amount when the image is brighter than predetermined brightness and increase the light amount when the image is darker than the predetermined brightness. Similarly, the illumination control section 72*c* can also automatically set whether both of the coaxial epi-illumination 24 and the ring illumination 25 are lit or one of the coaxial epi-illumination 24 and the ring illumination 25 is lit.

A scan mode selection button 80*g* is provided on the right side of the post-startup user interface 80. In this embodiment, as a scan mode, there are a focus stacking mode (a first measurement mode) for grasping a three-dimensional shape of the observation surface of the observation target SP using the principle of the focus stacking and a laser confocus mode (a second measurement mode) for grasping a three-dimensional shape of the observation surface of the observation target SP using the principle of the laser confocus. By operating the scan mode selection button 80*g*, one of the focus stacking mode and the laser confocus mode can be selected. When the focus stacking mode is selected, an image with which a three-dimensional shape of the observation surface of the observation target SP can be grasped by the first three-dimensional-shape measuring section 65 is acquired. On the other hand, when the laser confocus mode is selected, an image with which a three-dimensional shape of the observation surface of the observation target SP can be grasped by the second three-dimensional-shape measuring section 66 is acquired.

An objective lens display region 80*h* is provided on the upper side of the navigation image display region 80*b* of the post-startup user interface 80. In the objective lens display region 80*h*, the objective lenses 27 currently attached to the electric revolver 28 are displayed as figures together with magnifications of the objective lenses 27. The user manually inputs types (including presence or absence of ring illumination) of the objective lenses 27 attached to the electric revolver 28, whereby the control unit 60 can store the types of the objective lenses 27 and display the types of the objective lenses 27 in the objective lens display region 80*h*. Presence or absence of the ring illumination 25 can also be displayed in the objective lens display region 80*h*. Note that the control unit 60 may be caused to store the types of the objective lenses 27 attached to the electric revolver 28 such that the types of the objective lenses 27 can be automatically recognized.

Figure 16:
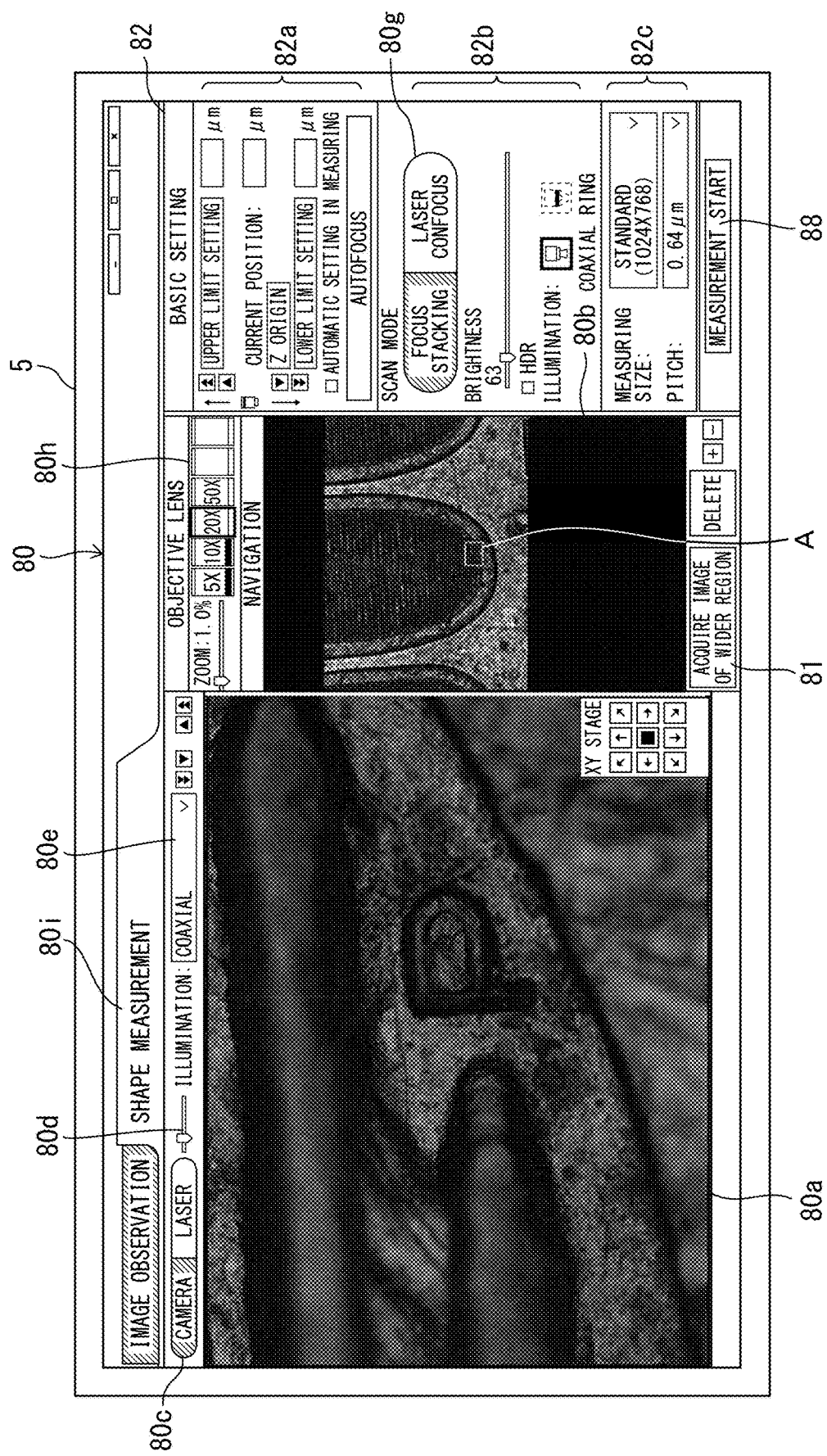
FIG. 16 is a diagram showing a user interface in which the magnification of an observation optical system is increased by a change of an objective lens.

When the user selects the objective lens 27 displayed in the objective lens display region 80*h*, the objective lens 27 is displayed in the objective lens display region 80*h* such that the selection of the objective lens 27 is seen. The electric revolver 28 is controlled by the electric-revolver control section 61 to rotate the electric revolver 28 to enable observation by the selected objective lens 27. FIG. 16 shows a user interface in which the objective lens 27 is changed to the objective lens 27 having high magnification.

Navigation Image Creation

Below the navigation image display region 80*b* of the post-startup user interface 80 shown in FIG. 9, a navigation image creation button 80*f* for creating the navigation image and displaying the navigation image in the navigation image display region 80*b* is provided. The display section 5 can display an acquired navigation image as explained below by displaying the post-startup user interface 80. The navigation image is an image for observation range setting for the user to set an observation range. In general, the navigation image is an image obtained by imaging a wider range than a visual field of the currently selected objective lens 27.

That is, the control unit 60 includes a navigation-image acquiring section 68 (shown in FIG. 4) that acquires the navigation image with the imaging element 50 or the photomultiplier tube 51 under first imaging conditions in a state in which light is irradiated on the observation target SP by the illumination for observation. When the navigation image creation button 80f shown in FIG. 9 is operated, the navigation-image acquiring section 68 starts creation of the navigation image. The first imaging conditions include the magnification of the observation optical system, illumination conditions of the illumination for observation, and exposure times of the imaging element 50 and the photomultiplier tube 51.

The magnification of the observation optical system can be associated with the magnification of the objective lens 27 selected by the rotation of the electric revolver 28. In the case of an electric zoom lens, the magnification of the observation optical system can be set to magnification at that time. The illumination conditions of the illumination for observation include illumination parameters of the coaxial epi-illumination 24 and the ring illumination 25. The illumination parameters include lighting of only the coaxial epi-illumination 24, lighting of only the ring illumination 25, lighting of the coaxial epi-illumination 24 and the ring illumination 25, extinction of the coaxial epi-illumination 24 and the ring illumination 25, and light amounts of the coaxial epi-illumination 24 and the ring illumination 25. The exposure times of the imaging element 50 and the photomultiplier tube 51 are adjusted to suitable exposure times by the control section 72. As shown in FIG. 4, the control unit 60 includes an imaging-condition storing section 70. The first imaging conditions are stored in the imaging-condition storing section 70.

After reading the first imaging conditions from the imaging-condition storing section 70, the navigation-image acquiring section 68 controls the sections to satisfy the first imaging conditions. At this time, the user can also change one or a plurality of imaging conditions among the imaging conditions.

Thereafter, the navigation-image acquiring section 68 images a first region of the observation target SP with the imaging element 50 via the non-confocal observation optical system 30. Subsequently, the navigation-image acquiring section 68 causes the placement-table control section 62 to control the stage driving section 54 and move the electric placement table 23 in the X direction or the Y direction. Thereafter, the navigation-image acquiring section 68 images a second region of the observation target SP with the imaging element 50 via the non-confocal observation optical system 30. Subsequently, the navigation-image acquiring section 68 moves the electric placement table 23 in the X direction or the Y direction and images a third region of the observation target SP with the imaging element 50 via the non-confocal observation optical system 30.

Figure 17:
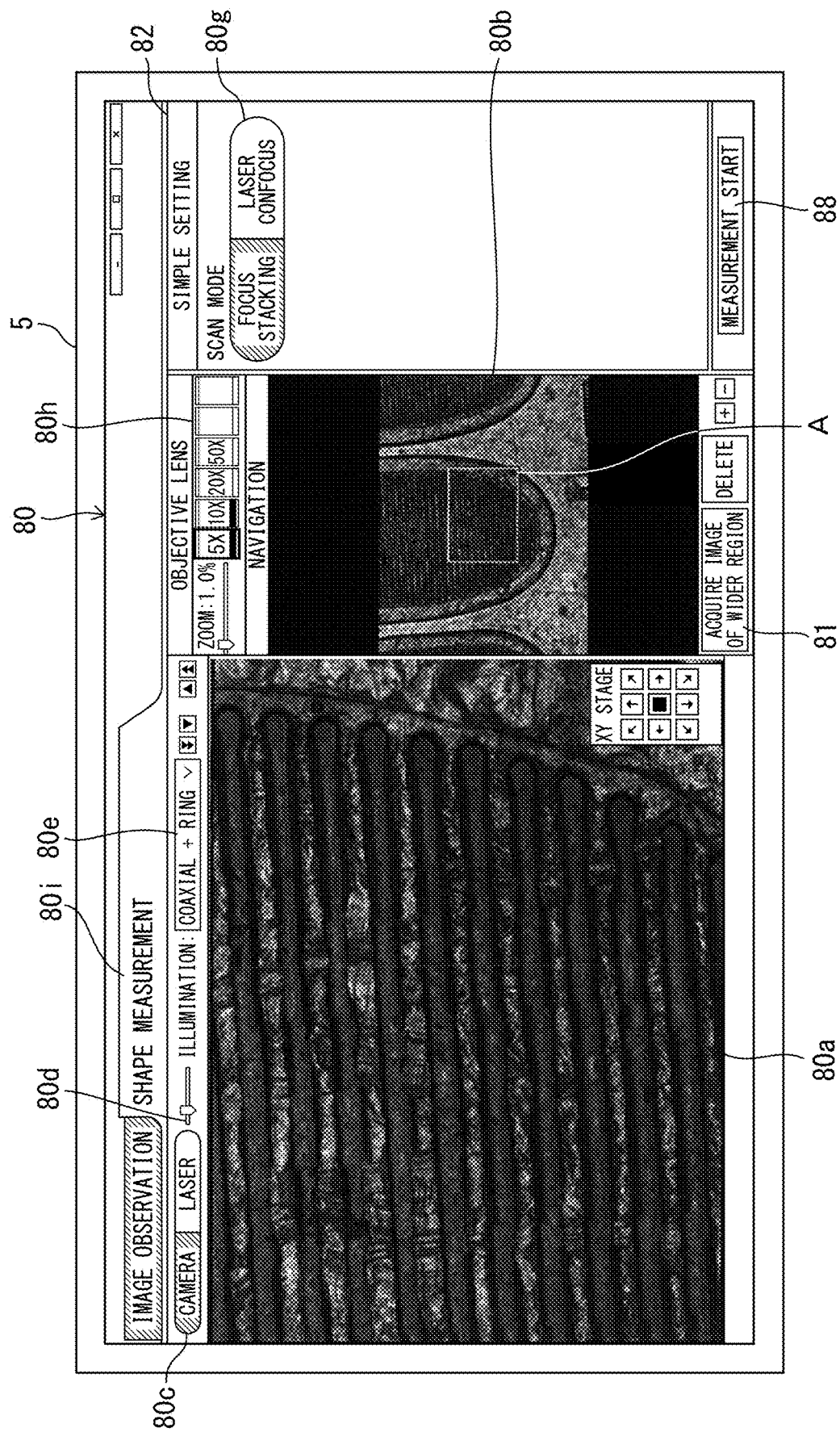
FIG. 17 is a diagram showing a user interface on which a navigation image is displayed.

In this way, the navigation-image acquiring section 68 images a plurality of regions of the observation target SP without a break and displays a captured image in the navigation image display region 80b as shown in FIG. 17. The navigation-image acquiring section 68 may display a plurality of captured images in the navigation image display region 80b in the order of the imaging or may simultaneously display the plurality of captured images in the navigation image display region 80b. When the plurality of captured images are displayed in the navigation image display region 80b in the order of the imaging, there are, for example, a method of displaying the images to be arranged side by side in the lateral direction (the X direction) or the longitudinal direction (the Y direction) and a method of displaying the images to be arranged in a swirl shape. The plurality of captured images are coupled by a well-known method in the past not to form gaps and not to be redundantly displayed.

In the navigation image display region 80b, a frame A indicating an observation position and/or an observation visual field observed by the user is displayed. The size of the frame A is changed by changing the objective lens 27. For example, the visual field narrows when the magnification of the objective lens 27 increases. Therefore, the frame A decreases in size (see FIG. 16).

The navigation image may be acquired by imaging a plurality of regions of the observation target SP with the photomultiplier tube 51 via the confocal observation optical system 40.

Addition of Regions of the Navigation Image

When the navigation image is displayed in the navigation image display region 80b, as shown in FIG. 17, the navigation image creation button 80f disappears. An addition designation button 81 is displayed in a portion where the navigation image creation button 80f has been displayed.

For example, in general, the navigation image is created using the objective lens 27 having a wide visual field and low magnification. Thereafter, the objective lens 27 is switched to the objective lens 27 having high magnification to observe the observation target SP. However, when the objective lenses 27 are used in this way, the user sometimes moves the electric placement table 23 in the X and Y directions and attempts to observe a range different from a range that has been observed. Then, the observation range sometimes deviates from a range of the created existing navigation image. In this case, the user cannot see which portion of the observation target SP the user is observing. Therefore, the user desires to additionally acquire the navigation image. When the user operates the addition designation button 81 at this time, the navigation-image acquiring section 68 executes additional acquisition of the navigation image. The user's operation of the addition designation button 81 with the mouse 7 or the like means designation of addition of a region to the navigation image already displayed in the navigation image display region 80b (the existing navigation image). The navigation-image acquiring section 68 can detect the designation of addition of a region.

When detecting that the designation of addition of a region to the existing navigation image is performed by the user, the navigation-image acquiring section 68 controls, on the basis of the designation of addition, the placement-table control section 62 according to a region to be added (referred to as additional region a well). When the present imaging conditions are different from the first imaging conditions stored in the imaging-condition storing section 70, the navigation-image acquiring section 68 changes the imaging conditions to the first imaging conditions, acquires, with the imaging element 50 or the photomultiplier tube 51, the region to be added, and causes the display section 5 to display the image of the acquired region to be added and the navigation image. Which region is to be added can be determined on the basis of the position of the frame A.

A direction of addition of the image of the region to be added to the navigation image can be set on the basis of designation of a position on the display section 5 on which the navigation image is displayed. For example, when the user designates a position above the navigation image with the mouse 7 or the like on the display section 5, the direction of addition of the image of the region to be added is "upward". The navigation-image acquiring section 68 images a region above the existing navigation image in the observation target SP and adds an image above the existing navigation image (see FIG. 18). The user can designate the position with the mouse 7 or the like to, for example, below, the right of, the left of, obliquely above, and obliquely below the navigation image on the display section 5. The position is added in the designated direction.

Figure 19:
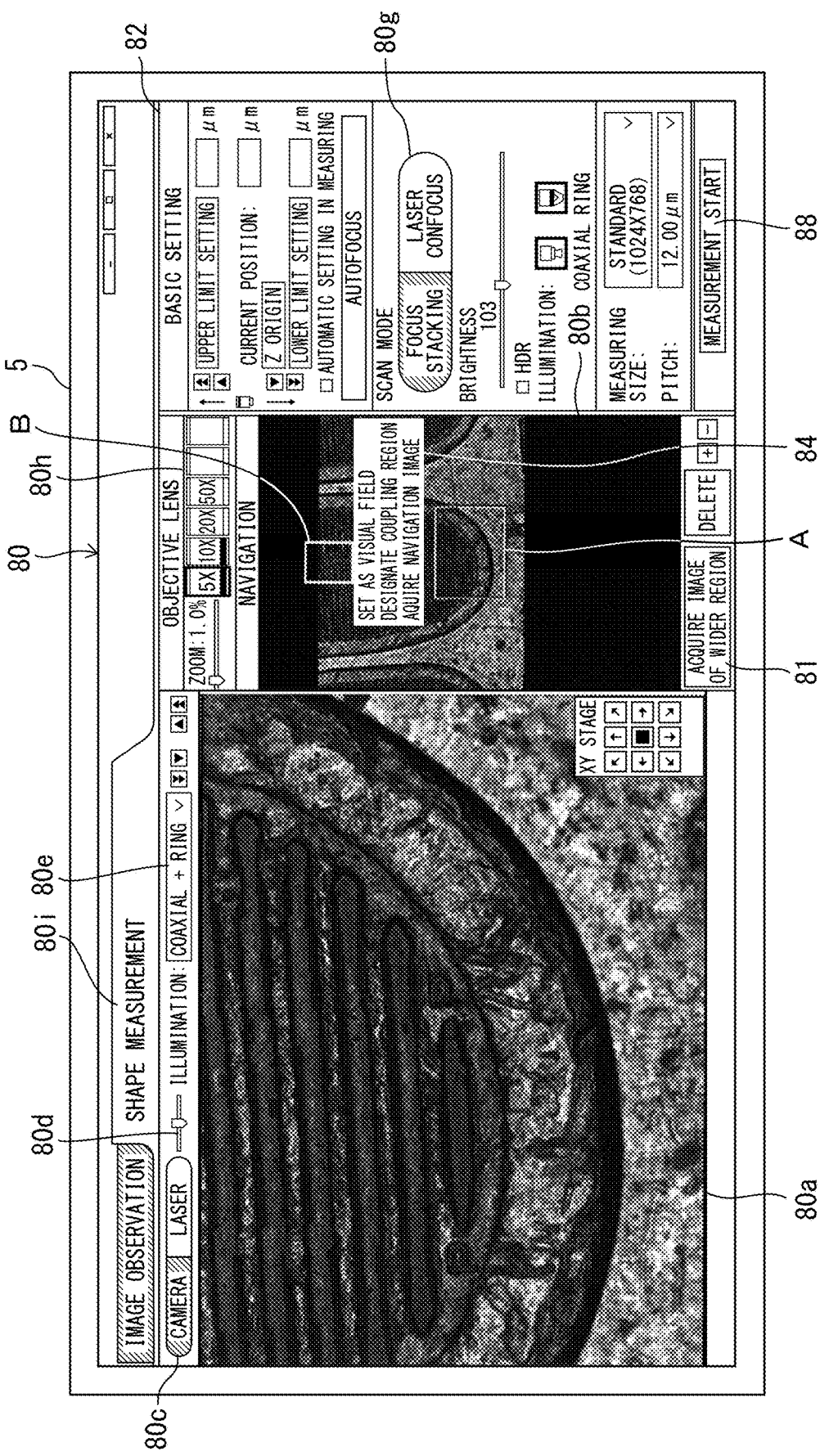
FIG. 19 is a diagram equivalent to FIG. 17 in which a menu in adding a region to the navigation image is displayed.

As shown in FIG. 19, when the user performs selection operation (e.g., click operation) by the mouse 7, a frame B is displayed in the navigation image display region 80*b*. When the user clicks a right button of the mouse 7 in this state, a menu 84 is displayed in the navigation image display region 80*b*. In the menu 84, three choices of "set the range surrounded by the frame B as an observation visual field", "perform coupling of an additional region in the range surrounded by the frame B", and "acquire the navigation image in the range surrounded by the frame B" are displayed.

When the user selects the "set the range surrounded by the frame B as an observation visual field" of the menu 84, the navigation-image acquiring section 68 causes the placement-table control section 62 to control the stage driving section 54 such that the observation visual field becomes the range surrounded by the frame B. The navigation-image acquiring section 68 moves the electric placement table 23 in the X direction or the Y direction. Consequently, the range surrounded by the frame B substantially coincides with the visual field of the objective lens 27 and becomes the observation visual field.

When the user selects the "perform coupling of an additional region in the range surrounded by the frame B" of the menu 84, if the range surrounded by the frame B is located outside the existing navigation image, to acquire a region to be added to a portion outside the existing navigation image, the navigation-image acquiring section 68 moves the electric placement table 23 in the X direction or the Y direction and perform imaging. The navigation-image acquiring section 68 causes the display section 5 to display an image of the region to be added and the navigation image acquired in this way.

When the user selects the "acquire the navigation image in the range surrounded by the frame B" of the menu 84, to acquire the navigation image in the range surrounded by the frame B, the navigation-image acquiring section 68 moves the electric placement table 23 in the X direction or the Y direction and performs imaging. The navigation-image acquiring section 68 causes the display section 5 to display the image of the region to be added and the navigation image acquired in this way. The frame B can be dragged by the operation of the mouse 7. Consequently, the position of the frame B can be changed. A position where the frame B is formed can be set to a position corresponding to a position of initial selecting operation by the mouse 7. The position where the frame B is formed can be changed according to the position of the initial selecting operation by the mouse 7.

An image of the additional region can be coupled only in one direction of the navigation image on the basis of designation of a position on the display section 5 on which the navigation image is displayed. For example, when the user designates a position above the navigation image on the display section 5 with the mouse 7 or the like, the image of the additional region can be coupled only in the upward direction of the existing navigation image. Consequently, the navigation image can be added to only a region desired by the user. A creation time of the additional region is short.

Note that the position designation by the mouse 7 or the like may be performed in any direction. When the position designation by the mouse 7 or the like is performed, the image of the additional region may be coupled to not only a specific direction but also the entire periphery of the existing navigation image.

A position designated by the user is sometimes far apart from the existing navigation image. In such a case, the image of the additional region sometimes separates from the existing navigation image. However, the navigation-image acquiring section 68 acquires a complementary image to be added between the image of the additional region and the existing navigation image and displays the complementary image in the navigation image display region 80*b* (the display section 5). That is, the navigation-image acquiring section 68 can display the existing navigation image, the image of the additional region, and the complementary image for complementing the existing navigation image and the image of the additional region.

The navigation-image acquiring section 68 can also be configured to acquire the navigation image with the imaging element 50. An observation-image acquiring section 69 can also be configured to acquire the observation image with the photomultiplier tube 51.

Configuration of a Measurement-Parameter Setting Section 67

Figure 20:
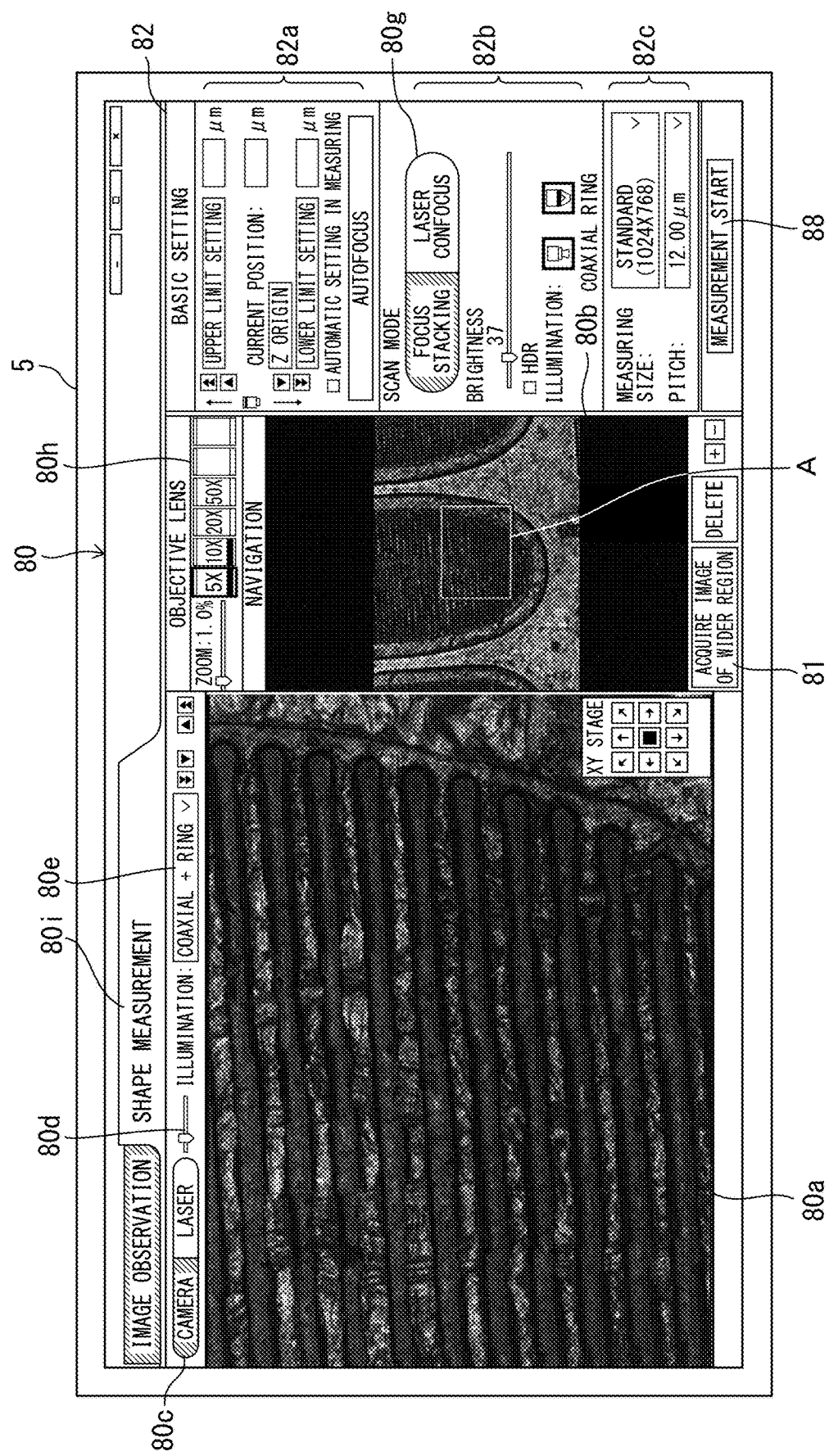
FIG. 20 is a diagram showing a user interface on which a basic measurement region is displayed.

Various buttons are provided in an upper part of the post-startup user interface 80. When the user operates a basic measurement button 80*i* among the buttons, as shown in FIG. 20, a basic measurement display region (a parameter display region) 82 is displayed on the right side of the post-startup user interface 80. The basic measurement display region 82 includes a first setting display region 82*a* for setting measurement parameters and common to the focus stacking mode and the laser confocus mode, a second setting display region 82*b* for setting illumination condition parameters and not common to the focus stacking mode and the laser confocus mode, and a third setting display region 82*c* common to the focus stacking mode and the laser confocus mode. The measurement parameters include a gain of the imaging element 50, measurement parameters concerning height, and illumination condition parameters. The first setting display region 82*a*, the second setting display region 82*b*, and the third setting display region 82*c* are provided side by side in the up-down direction. The user can distinguish the regions.

The measurement parameters concerning height include an upper limit value and a lower limit value of a separation distance between the objective lens 27 and the electric placement table 23 and a focus position (e.g., a focused Z coordinate). The measurement parameters concerning height can be obtained by the height-information detecting section 53 and can be stored in the storing section 73.

In the first setting display region 82*a*, regions where the upper limit value and the lower limit value of the separation distance between the objective lens 27 and the electric placement table 23 can be individually set and an autofocus button for performing autofocus are provided. The first setting display region 82*a* is a measurement parameter setting region concerning height.

In the second setting display region 82*b*, a brightness adjusting section that adjusts the brightness of a live image displayed in the live image display region 80*a* is provided. The brightness adjusting section of the second setting display region 82*b* can be associated with the brightness adjusting section 80*d* above the live image display region 80*a*.

The second setting display region 82b is different in the focus stacking mode and the laser confocus mode. The brightness adjusting section is provided in both the modes. On the other hand, in the focus stacking mode, an illumination selection button and a detail setting button are provided, and, in the laser confocus mode, the illumination selection button and the detail setting button are absent and a dimming filter selection menu is provided.

Like the illumination selection button 80e explained above, the illumination selection button is a button with which any one of "coaxial+ring", "coaxial", "ring", and "OFF" can be selected. Like the light amount adjustment region 83 explained above, the detail setting button is a button for adjusting a light amount of the coaxial epi-illumination 24 and a light amount of the ring illumination 25 independently from each other. The dimming filter selection menu is a menu for setting application and non-application of the dimming filter 48 and setting a dimming ratio when the dimming filter 48 is applied. The control unit 60 controls the dimming filter 48 to be set by the dimming filter selection menu. These are illumination condition parameters.

The third setting display region 82c is a region where a measurement size, measurement quality, and a measurement pitch in the Z direction can be set. A standard size of the measurement size is, for example, 1024×768 (pixels). In the third setting display region 82c, a measurement size larger than the standard size and a measurement size smaller than the standard size can be selected. Specifically, the measurement size can be displayed as a standard (e.g., 1024×768), high resolution (e.g., 2048×1536), 1/12 (e.g., 1024×64), one line (e.g., 1024×1), and the like. The measurement pitch in the Z direction is a changing pitch of a relative distance changed by the Z-axis driving section 52 during the focus search. The measurement pitch in the Z direction can be set in, for example, a plurality of stages. The measurement pitch in the Z direction is included in the measurement parameters concerning height. The measurement quality can be selected out of "high accuracy" with importance placed on accuracy, "high speed" with importance placed on speed, "superhigh speed" with higher speed, and the like.

Figure 18:
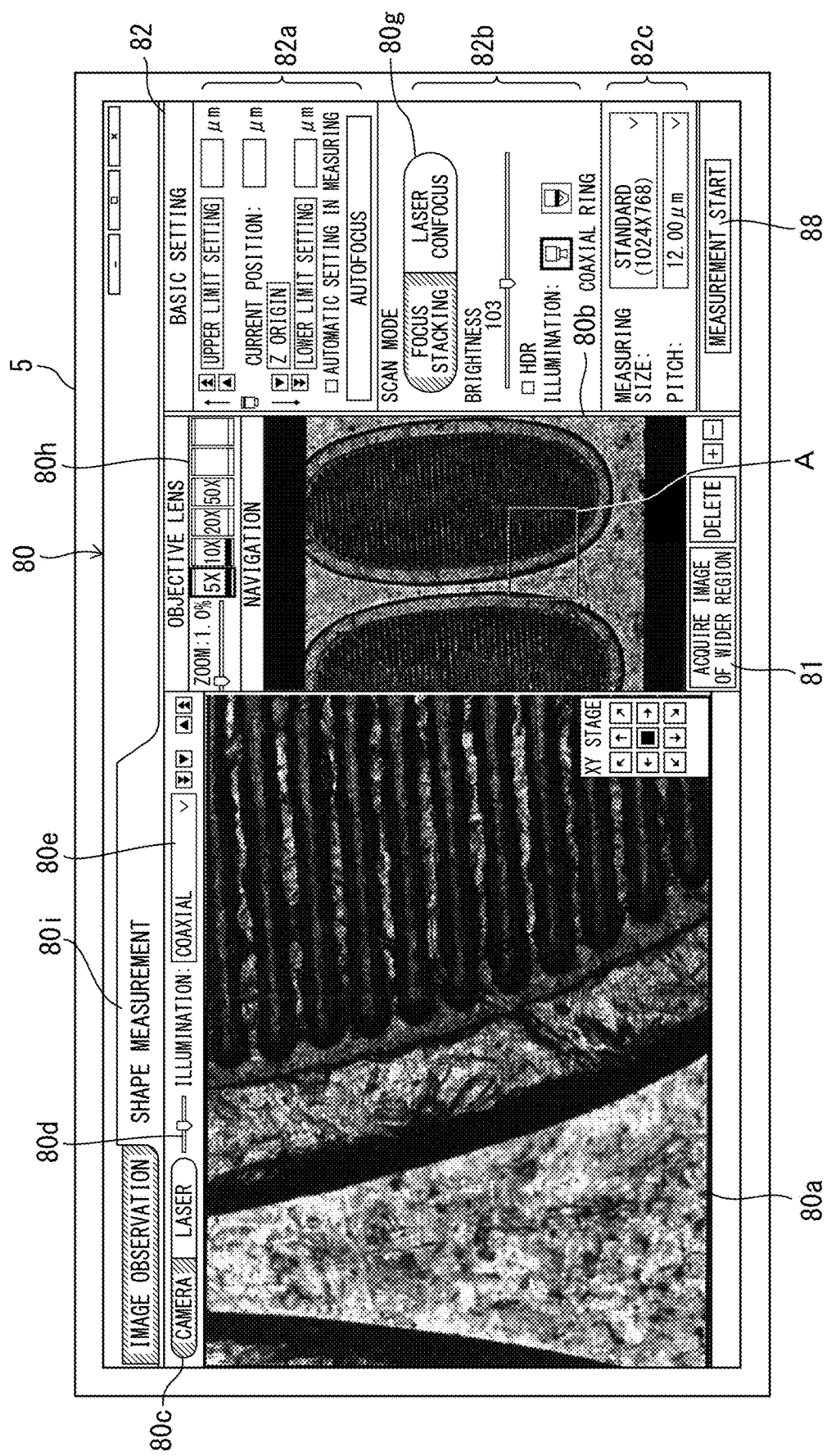
FIG. 18 is a diagram equivalent to FIG. 17 in which a region is added to the navigation image.

In FIGS. 18 to 20, a parameter setting region for the measurement modes by the first three-dimensional-shape measuring section 65 is displayed in the basic measurement display region 82. In FIG. 11, a parameter setting region for the measurement modes by the second three-dimensional-shape measuring section 66 is displayed in the basic measurement display region 82.

By operating the scan mode selection button 80g, the user can perform switching operation for switching which of the parameter setting region for the measurement modes by the first three-dimensional-shape measuring section 65 and the parameter setting region for the measurement modes by the second three-dimensional-shape measuring section 66 is displayed in the basic measurement display region 82. When the user selects the focus stacking mode with the scan mode selection button 80g, the parameter setting region for the measurement modes (a parameter setting region for the focus stacking mode) by the first three-dimensional-shape measuring section 65 is displayed in the basic measurement display region 82. On the other hand, when the user selects the laser confocus mode with the scan mode selection button 80g, the parameter setting region for the measurement modes (a parameter setting region for the laser confocus mode) by the second three-dimensional-shape measuring section 66 is displayed in the basic measurement display region 82.

In the parameter setting region for the focus stacking mode and the parameter setting region for the laser confocus mode, display items of the first setting display region 82a and the third setting display region 82c are common. However, display items of the second setting display region 82b are not common.

As shown in FIG. 4, the control unit 60 includes a measurement-parameter setting section 67 capable of setting measurement parameters of the measurement modes of the focus stacking mode and the laser confocus mode. The measurement-parameter setting section 67 is configured to be capable of setting a plurality of parameters including measurement parameters concerning height and illumination condition parameters.

The measurement-parameter setting section 67 is configured to be capable of setting illumination condition parameters for the laser confocus mode with respect to a light source for the confocal observation optical system 40 and illumination condition parameters for the focus stacking mode with respect to an illumination for observation (the coaxial epi-illumination 24 and the ring illumination 25) for the non-confocal observation optical system 30. The illumination condition parameters for the focus stacking mode and the illumination condition parameters for the laser confocus mode can be retained independently from each other and stored in the storing section 73.

The illumination condition parameter for the focus stacking mode include illumination condition parameters of illumination by the coaxial epi-illumination 24 and illumination condition parameters of illumination by the ring illumination 25. The illumination condition parameters for the laser confocus mode include a dimming ratio of dimming by the dimming filter 48.

The measurement-parameter setting section 67 is configured to be capable of setting, in a plurality of stages, each of a changing pitch of the relative distance changed by the Z-axis driving section 52 during the focus search by the first focus searching section 63 and a changing pitch of the relative distance by the Z-axis driving section 52 during the focus search by the second focus searching section 64. The plurality of stages are, for example, a rather wide pitch, an intermediate pitch, a rather narrow pitch, and the like. The plurality of stages may be two stages or may be four or more stages.

When one measurement mode of the focus stacking mode and the laser confocus mode is switched to the other measurement mode, a changing pitch corresponding to one changing pitch set by the measurement-parameter setting section 67 during the one measurement mode is applied to the other measurement mode. That is, when the changing pitch during the focus search by the first focus searching section 63 corresponding to the focus stacking mode is set to the "rather wide pitch", thereafter, when the focus stacking mode is switched to the laser confocus mode, the changing pitch during the focus search by the second focus searching section 64 is automatically set to the "rather wide pitch". The same applies to the opposite case. If the "intermediate pitch" is selected in the one measurement mode, the changing pitch is automatically set to the "intermediate pitch" in the other measurement mode as well. If the "rather narrow pitch" is selected in the one measurement mode, the changing pitch is automatically set to the "rather narrow pitch" in the other measurement mode as well. Note that the automatic application of the changing pitch can be cancelled.

When the one measurement mode of the focus stacking mode and the laser confocus mode is switched to the other measurement mode, measurement parameters set by the measurement-parameter setting section 67 during the one measurement mode are taken over as measurement parameters of the other measurement mode. Specifically, measurement parameters concerning height set in the focus stacking mode are taken over to the laser confocus mode. This is because the measurement parameters concerning height hardly needs to be changed in the non-confocal observation optical system 30 and the confocal observation optical system 40 and observation is easily performed when the measurement parameters concerning height are set the same in the non-confocal observation optical system 30 and the confocal observation optical system 40. Therefore, the measurement parameters concerning height set in the laser confocus mode are taken over to the focus stacking mode.

However, the illumination parameters are not taken over from the focus stacking mode to the laser confocus mode and from the laser confocus mode to the focus stacking mode. This is because the light sources are completely different in the non-confocal observation optical system 30 and the confocal observation optical system 40 and, therefore, there is no advantage in taking over the illumination parameters. Note that the illumination parameters may be taken over in the same manner as the measurement parameters concerning height.

The control section 72 is configured to store a difference between a focus position of the non-confocal observation optical system 30 and a focus position of the confocal observation optical system 40 and, when the one measurement mode of the focus stacking mode and the laser confocus mode is switched to the other measurement mode, calculate an upper limit value and a lower limit value of the separation distance between the objective lens 27 and the electric placement table 23 considering the difference between the focus positions.

That is, in the magnifying observation apparatus 1, the light source of the non-confocal observation optical system 30 is close to natural light and includes wavelength regions of R, G, and B. On the other hand, the light source of the confocal observation optical system 40 is a single-color laser beam and has a short wavelength. The magnifying observation apparatus 1 is capable of performing measurement in nanometer order. A difference in a focal length due to a difference in a wavelength of observation light is too large to be neglected. Therefore, a difference due to the difference in the wavelength of the observation light occurs between the focus position (a position where a focus value is the largest) of the non-confocal observation optical system 30 and the focus position (a position where a light receiving amount of the photomultiplier tube 51 is the largest) of the confocal observation optical system 40. The control section 72 stores the difference. When the focus stacking mode is switched to the laser confocus mode or the laser confocus mode is switched to the focus stacking mode, the control section 72 recalculates an upper limit value and a lower limit value of the separation distance between the objective lens 27 and the electric placement table 23 considering the difference between the focus positions.

Display Control for a Live Image and a Parameter Setting Region

When the parameter setting region for the focus stacking mode is displayed in the basic measurement display region 82, the control section 72 displays, in the live image display region 80*a*, a first live image acquired by the imaging element 50 via the non-confocal observation optical system 30. When the parameter setting region for the laser confocus mode is displayed in the basic measurement display region 82, the control section 72 displays, in the live image display region 80*a*, a second live image acquired by the photomultiplier tube 51 via the confocal observation optical system 40.

The control section 72 is configured to switch a live image, which is displayed in the live image display region 80*a*, in association with switching of the parameter setting region for the focus stacking mode and the parameter setting region for the laser confocus mode displayed in the basic measurement display region 82. Specifically, the control section 72 is configured to be capable of displaying the second live image in the liver image display region 80*a* when the parameter setting region for laser confocus mode is displayed in the basic measurement display region 82 and displaying the first live image in the live image display region when the parameter setting region for the focus stacking mode is displayed in the basic measurement display region 82.

When displaying the first live image in the live image display region 80*a*, the control section 72 displays an illumination condition parameter setting region for the focus stacking mode (the second setting display region 82*b* shown in FIG. 20) in the basic measurement display region 82. On the other hand, when displaying the second live image in the live image display region 80*a*, the control section 72 displays an illumination condition parameter setting region for the laser confocus mode (the second setting display region 82*b* shown in FIG. 11) in the parameter display region. The first live image and the second live image displayed in the live image display region 80*a* can be images showing the same region of the observation target SP. However, the first live image and the second live image may be different.

After the first live image is displayed in the live image display region 80*a*, the control section 72 can also display the parameter setting region for the focus stacking mode in the basic measurement display region 82. On the other hand, after the second live image is displayed in the live image display region 80*a*, the control section 72 can also display the parameter setting region for the laser confocus mode in the basic measurement display region 82.

When the first live image is displayed in the live image display region 80*a*, the control section 72 can also display the parameter setting region for the laser confocus mode in the basic measurement display region 82. When the second live image is displayed in the live image display region 80*a*, the control section 72 can also display the parameter setting region for the focus stacking mode in the basic measurement display region 82.

Note that, in the case of a user accustomed to measurement performed using the magnifying observation apparatus 1, for example, it is desirable to set a basic measurement mode and associate the live image with the parameter setting region as explained above. However, in the case of a user unaccustomed to the measurement performed using the magnifying observation apparatus 1, for example, a simple mode may be provided to make it possible to always display the first live image (the normal microscopic image) irrespective of which three-dimensional-shape measuring section is selected, that is, display the first live image not in association with the parameter setting region. The simple mode is provided because it is not easily intuitively seen for a person unaccustomed to measurement that the second live image becomes dark when not focused because the principle of the laser confocus is used. The user can perform switching of the basic measurement mode and the simple mode.

Configuration of the Observation-Image Acquiring Section 69

The control unit 60 includes the observation-image acquiring section 69 that determines an observation position and/or an observation visual field on the basis of designation of a position on the display section 5 on which the navigation image is displayed, controls the placement-table control section 62 and/or the electric-revolver control section 61 according to the determined observation position and/or the determined observation visual field, and acquires an observation image with the imaging element 50. When a pointer of the mouse 7 is placed on any point on the navigation image on the display section 5 and range selection by the mouse 7 is performed, the frame A displayed in the navigation image display region 80b shown in FIG. 20 and the like can be displayed in the navigation image display region 80b. A method of designating a position where the frame A is formed is not particularly limited. However, the designation of the position is desirably performed by the mouse 7. The designation of the position is designation of an observation position. Designation of a size of the frame A can also be performed by the mouse 7. The designation of the size of the frame A is designation of a range of an observation visual field. Only the designation of the observation position may be performed. Only the designation of the range of the observation visual field may be performed. In this way, the observation position and/or the observation visual field can be determined by the operation of the mouse 7.

The stage driving section 54 is controlled by the placement-table control section 62 to move the electric placement table 23 in the X direction or the Y direction such that the visual field range present in the determined observation position is placed in the visual field of the objective lens 27. The electric-revolver control section 61 is controlled to rotate the electric revolver 28 to change the objective lens 27 such that the visual field range present in the determined observation position is placed in the visual field of the objective lens 27.

The observation-image acquiring section 69 can control only one of the placement-table control section 62 and the electric-revolver control section 61 without controlling both of the placement-table control section 62 and the electric-revolver control section 61 and acquire an observation image with the imaging element 50. For example, the observation-image acquiring section 69 can determine an observation position and/or an observation visual field on the basis of designation of a position on the display section 5 on which the navigation image is displayed, control the placement-table control section 62 according to the determined observation position and/or the determined observation visual field, and acquire an observation image with the imaging element 50 or the photomultiplier tube 51.

The observation-image acquiring section 69 is configured to be capable of determining, on the basis of the designation of the position on the display section 5 on which the navigation image is displayed, maximum magnification of the observation optical system to include the observation visual field. When the observation position and/or the observation visual field is determined, the observation-image acquiring section 69 can grasp the size of the observation visual field. The observation-image acquiring section 69 calculates magnification covering the entire observation visual field and determines the magnification as maximum magnification of the observation optical system. The observation-image acquiring section 69 compares the determined maximum, magnification and the present magnification of the observation optical system and, when the determined maximum magnification and the present magnification of the observation optical system are different, informs the user that the determined maximum magnification and the present magnification of the observation optical system are different. Examples of informing means include a method of display on the display section 5 and a method by voice. However, the informing means may be any method. The informing means only has to be able to inform that the determined maximum magnification covering the entire observation visual field and the present magnification of the observation optical system are different.

The observation-image acquiring section 69 controls the electric-revolver control section 61 to achieve the determined maximum magnification. The electric-revolver control section 61 rotates the electric revolver 28 to enable observation by the objective lens 27 that realizes the same magnification as the determined maximum magnification. When the objective lens 27 that realizes the same magnification as the determined maximum magnification is absent, the objective lens 27 that realizes magnification close to the determined maximum magnification only has to be used.

After the magnification of the observation optical system is changed to the maximum magnification, the observation-image acquiring section 69 operates the autofocus mechanism. Consequently, after replacement of the objective lens 27, the objective lens 27 can be automatically focused.

Note that, in the example explained above, the observation-image acquiring section 69 is configured to cause the display section 5 to display the non-confocal image acquired by the imaging element 50 and receive the instruction for the observation range by the user on the displayed non-confocal image. However, the observation-image acquiring section 69 may be configured to cause the display section 5 to display the confocal image acquired by the photomultiplier tube 51 and receive the instruction for the observation range by the user on the displayed confocal image.

Figure 21:
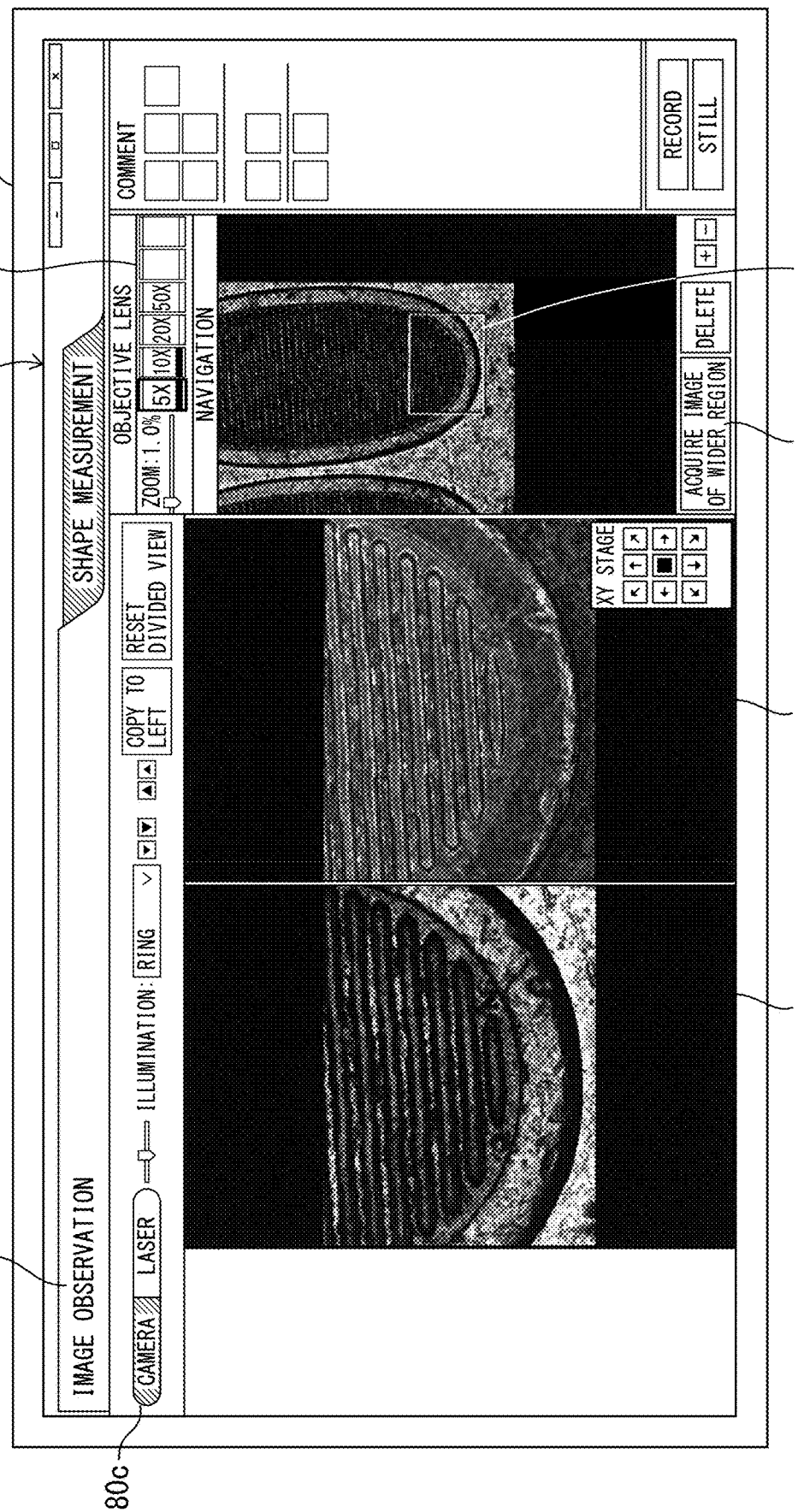
FIG. 21 is a diagram showing a divided and displayed user interface.

As shown in FIG. 21, the observation-image acquiring section 69 can also select an image observation tab 80k of the post-startup user interface 80 and display two image display regions 87a and 87b. For example, the observation-image acquiring section 69 can display, in one image display region 87a, an image obtained when the observation target SP is illuminated by the coaxial epi-illumination 24 and display, in the other image display region 87b, an image obtained when the observation target SP is illuminated by the ring illumination 25.

Three-Dimensional Shape Measurement Result

Figure 22:
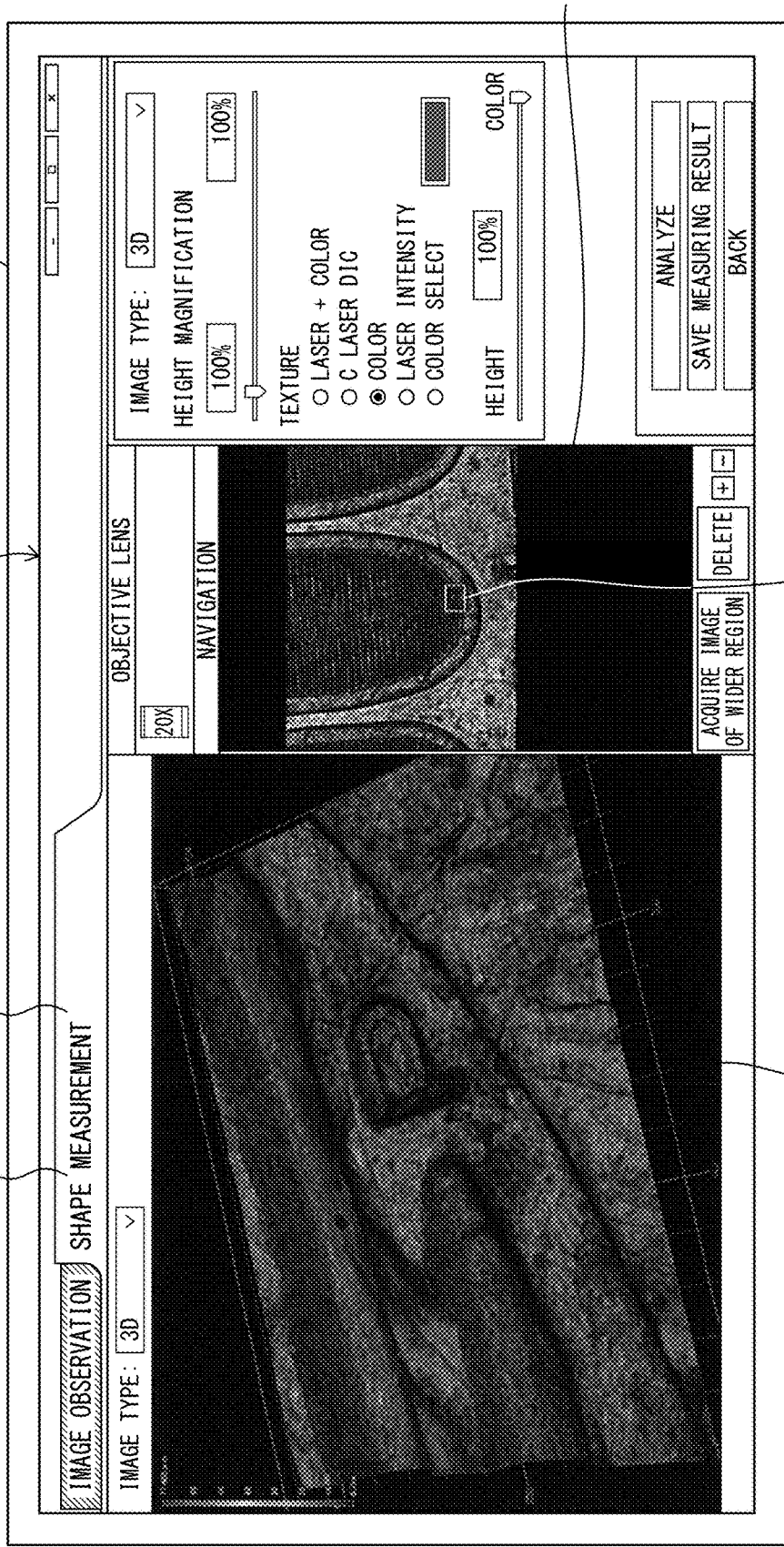
FIG. 22 is a diagram showing a user interface on which a measurement result by a focus stacking mode is displayed.
Figure 23:
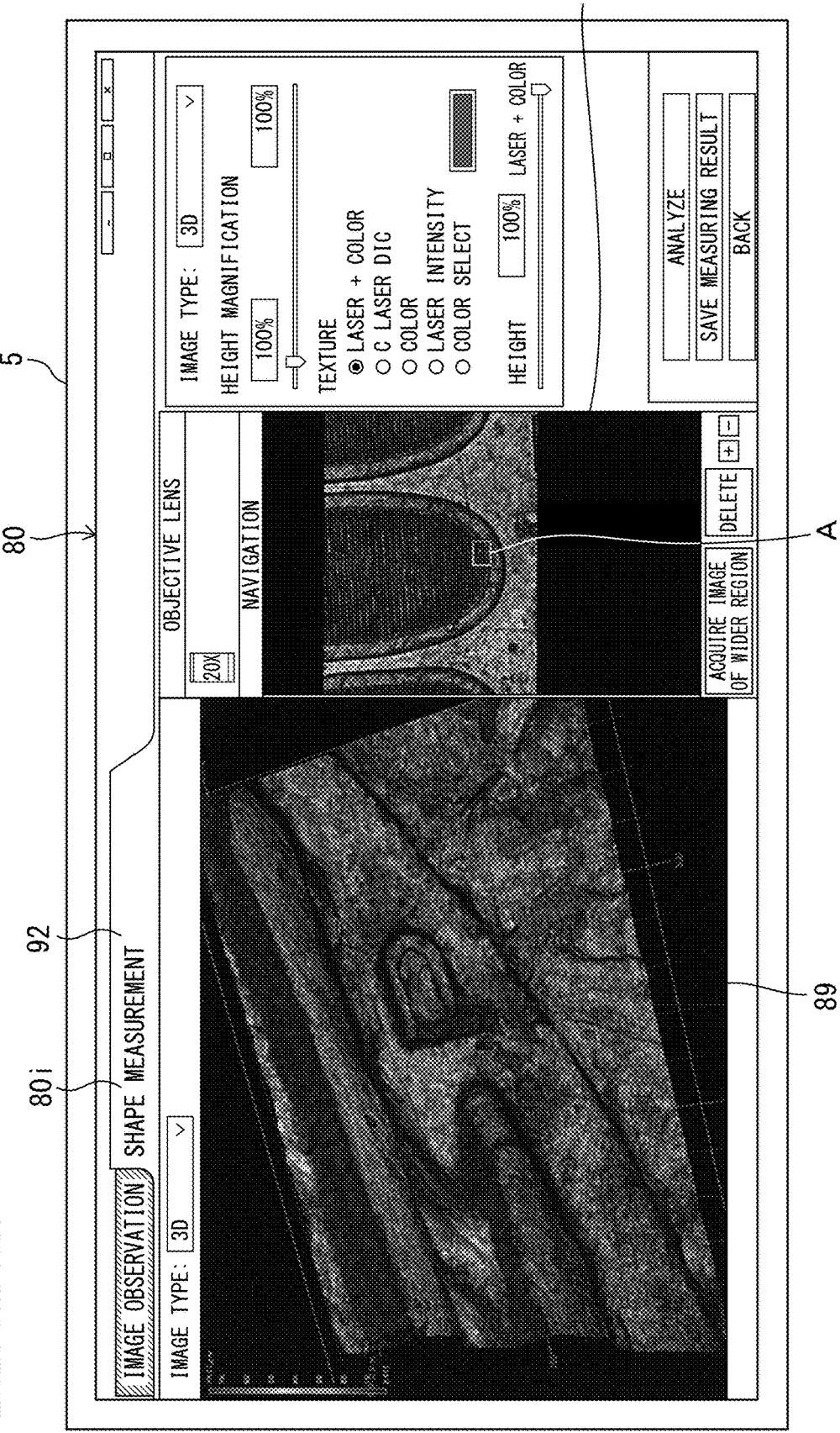
FIG. 23 is a diagram showing a user interface on which a measurement result by a laser confocus mode is displayed.

FIG. 22 is a diagram showing a user interface on which a three-dimensional shape measurement result by the focus stacking mode is displayed. FIG. 23 is a diagram showing a user interface on which a three-dimensional shape measurement result by the laser confocus mode is displayed.

A measurement start button 88 is provided on the lower right of the user interface 80 shown in FIG. 20 and the like. When the user operates the measurement start button 88 after selecting a scan mode with a scan mode selection button 80g using the mouse 7 or the like, three-dimensional shape measurement is started in the selected scan mode. When the focus stacking mode is selected, an image with which a three-dimensional shape of the observation surface of the observation target SP can be acquired by the first three-dimensional-shape measuring section 65 is acquired. As shown in FIG. 22, the image is displayed in the measurement result display region 89. When the laser confocus mode is selected, an image with which a three-dimensional shape of the observation surface of the observation target SP can be grasped by the second three-dimensional-shape measuring section 66 is acquired. As shown in FIG. 23, the image is displayed in the measurement result display region 89. The measurement result display region 89 is the live image display region 80a. However, because display content is different, a name and a sign are changed.

The image displayed in the measurement result display region 89 can be changed to an image viewed from a different visual point. For example, the image can be changed to an image obtained by viewing the observation target SP from right above or an image obtained by obliquely viewing the observation target SP. The illustrated image is the image obtained by obliquely viewing the observation target SP. The image displayed in the measurement result display region 89 can also be changed to the color image explained above. Further, the image displayed in the measurement result display region 89 can also be changed to an image in which a color is changed according to height. For example, a high part is colored in red and a low part is colored in blue.

Figure 24:
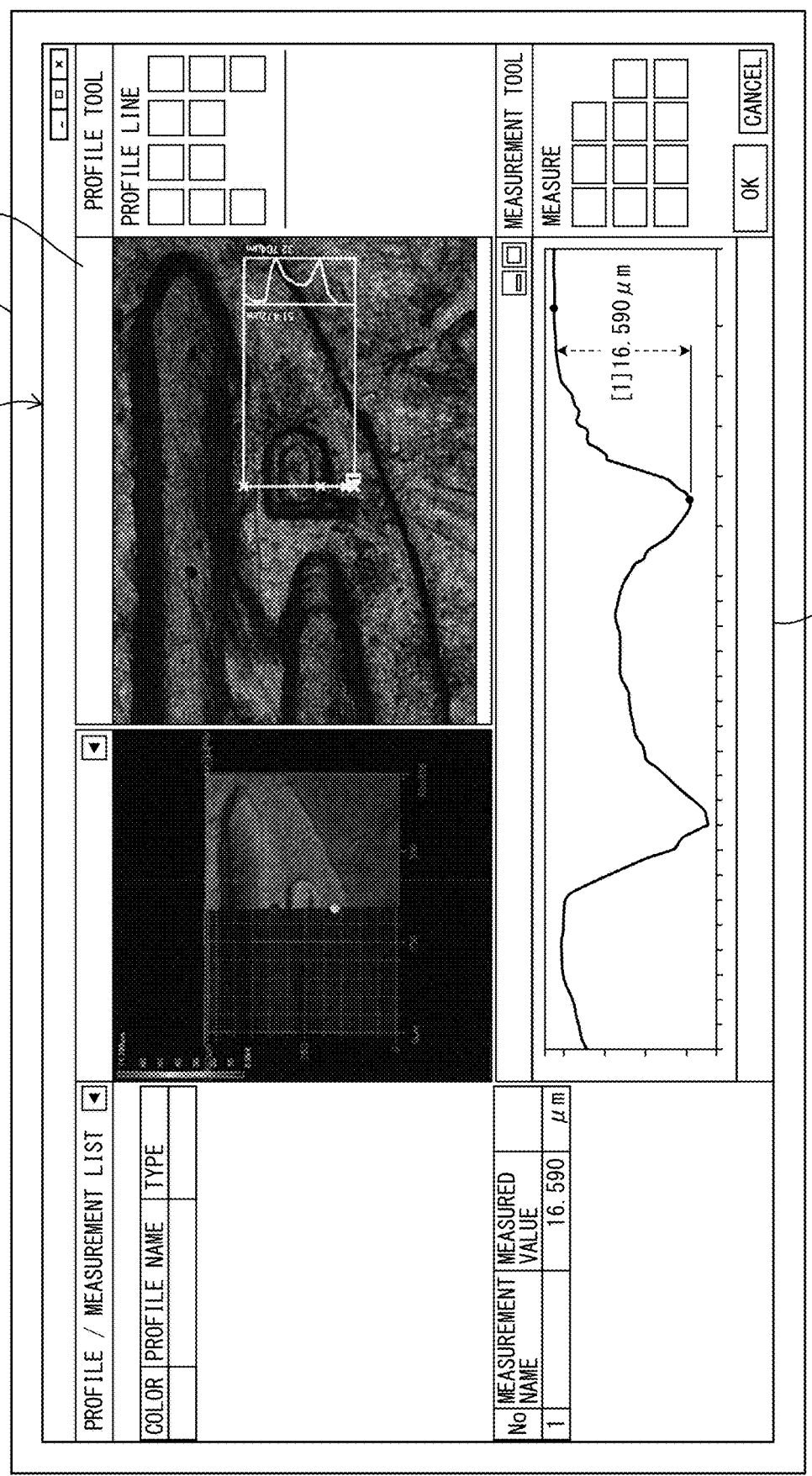
FIG. 24 is a diagram showing a user interface on which a profile measurement region is displayed.

FIG. 24 is a diagram showing the user interface 80 on which a profile measurement screen 90 is displayed. After measurement of a three-dimensional shape of the observation surface of the observation target SP is completed, when a measurement button 92 shown in FIGS. 22 and 23 is operated, a profile measurement region 90 shown in FIG. 24 is displayed. When, for example, any two points are designated in the profile measurement region 90, a profile between two points is magnified and displayed in a measurement result display region 91. Note that this is an example of measurement of a profile.

Configuration of an Image Generating Section 72b

As shown in FIG. 6, the control section 72 includes an image generating section 72b. The image generating section 72b generates a combined image obtained by combining the color image acquired by the first three-dimensional-shape measuring section 65 and the three-dimensional shape data acquired by the second three-dimensional-shape measuring section 66. The generated combined image is displayed on the display section 5. The combined image generated by the image generating section 72b and the color image acquired by the first three-dimensional-shape measuring section 65 can be simultaneously displayed on the display section 5.

As a method of combining colors, a method explained below can also be adopted. For example, the electric placement table 23 is disposed at an upper limit height set in advance. Height information of pixels is obtained in the laser confocus mode while the electric placement table 23 is moved downward. Thereafter, when the electric placement table 23 reaches a lower limit height set in advance, imaging is performed with the imaging element 50 a plurality of times while the electric placement table 23 is moved upward. A color of the pixels at a focusing time and the height information acquired in the laser confocus mode can be combined to generate a color image.

The first focus searching section 63 is configured to illuminate the observation target SP with the coaxial epi-illumination 24 or the ring illumination 25 and perform a focus search on the basis of an image acquired by the imaging element 50. When the image generating section 72b generates a combined image, the first focus searching section 63 desirably illuminates the observation target SP with the coaxial epi-illumination 24 and performs the focus search on the basis of the image acquired by the imaging element 50. This is because, when the luminance information acquired in the laser confocus mode and the color information acquired by the imaging element 50 are combined, the coaxial epi-illumination 24 substantially the same as an irradiating direction of the laser beam in the laser confocus mode is more desirable as an illuminating section.

That is, when an image is acquired by the imaging element 50 using the coaxial epi-illumination 24, even if unevenness is present on the observation surface of the observation target SP, a shadow due to the unevenness is less easily formed. The acquired image is an image without a cubic effect. On the other hand, in the principle of the laser confocus, because an amount of reflected light from an inclined surface decreases, as a result, the acquired image is an image in which the contour of the unevenness is emphasized. When these images are combined, an image suitable for observation is obtained. This is because, when an image including color information is acquired by the imaging element 50 using the coaxial epi-illumination 24, unnecessary shadow information is absent in the image and, even if the image is combined with an image including shadow information acquired in the principle of the laser confocus, a combined image does not hinder the shadow information (luminance information) acquired in the principle of the laser confocus. Therefore, a color image obtained after the combination has a satisfactory appearance.

On the other hand, when an image is acquired by the imaging element 50 using the ring illumination 25, when unevenness is present on the observation surface of the observation target SP, a shadow due to the unevenness is easily obtained. This is advantageous for contrast calculation. This means that the focus search is easily performed. This is also advantageous for obtaining a color image having a feeling of unevenness (a cubic effect). As a result, the color image has a satisfactory appearance. However, when the image is combined with the luminance information acquired by the principle of the laser confocus, because ways of forming a shadow are different in the first place, an image unsuitable for observation is obtained. The image is not considered an image having a satisfactory appearance as a color image.

Concerning the observation target SP having no luminance difference (a luminance ratio close to 1) even at the focusing time, the principle of the focus stacking is not suitable. However, even if a color of the surface of the observation target SP is the same, if a shadow due to unevenness is formed, an obtained image has a luminance difference (a luminance ratio is larger than 1). Therefore, focus stacking can be performed. In the case of the observation target SP having unevenness, a shadow easily appears in an acquired image according to an irradiation angle of light by the ring illumination 25. The focus stacking is sometimes easily performed. In this case, because the focus search is easily performed, in the case of a color image, an image having a shadow and a cubic effect is obtained. As a result, the color image has a satisfactory appearance.

Configuration of a Reliability-Index Calculating Section 72d

As shown in FIG. 6, the control section 72 includes a reliability-index calculating section 72d. The reliability-index calculating section 72d calculates a first reliability index indicating reliability of the focus search by the first focus searching section 63 or a second reliability index indicating reliability of the focus search by the second focus searching means 64. The reliability-index calculating section 72d is configured to calculate the first reliability index and the second reliability index for each of the pixels. In this embodiment, the reliability-index calculating section 72d calculates both of the first reliability index and the second reliability index. However, the reliability-index calculating section 72d may calculate only one of the first reliability index and the second reliability index.

The first reliability index is, for example, a contrast value acquired by the imaging element 50. As the contrast value is higher, the first reliability index is set higher. The second reliability index is, for example, a pixel value acquired by the photomultiplier tube 51. As the pixel value is higher, the second reliability index is set higher.

The reliability-index calculating section 72d can also calculate a reliability index of a focus search result of the observation target SP illuminated by the coaxial epi-illumination 24 and a reliability index of a focus search result of the observation target SP illuminated by the ring illumination 25.

Configuration of a Replacement Determining Section 72e

The control section 72 includes a replacement determining section (replacement determining means) 72e that performs, on the basis of the first reliability index and the second reliability index, determination of replacement of first three-dimensional shape data acquired by the first three-dimensional-shape measuring section 65 and second three-dimensional shape data acquired by the second three-dimensional-shape measuring section 66.

The replacement determining section 72e is configured to automatically perform replacement of the first three-dimensional shape data and the second three-dimensional shape data. That is, the replacement determining section 72e acquires first reliability indexes of pixels, which form the first three-dimensional shape data, in association with the positions of the pixels and acquires second reliability indexes of pixels, which form the second three-dimensional shape data, in association with the positions of the pixels. The replacement determining section 72e compares reliability indexes of a specific pixel of the first three-dimensional shape data and a pixel of the second three-dimensional shape data present in the same position as the pixel. That is, the replacement determining section 72e compares the first reliability index and the second reliability index of the pixels present in the same position.

As a result of the comparison, if the first reliability index is higher, the replacement determining section 72e validates the pixel forming the first three-dimensional shape data and invalidates the pixel forming the second three-dimensional shape data. If the second reliability index is higher, the replacement determining section 72e validates the pixel forming the second three-dimensional shape data and invalidates the pixel forming the first three-dimensional shape data. By performing this processing concerning all the pixels, three-dimensional shape data having high reliability can be configured.

The first three-dimensional shape data and the second three-dimensional shape data include the height information as explained above. The first three-dimensional shape data and the second three-dimensional shape data may include color information.

The replacement determining section 72e can also be configured to receive an instruction concerning whether replacement of the first three-dimensional shape data and the second three-dimensional shape data is performed. For example, the user can perform operation with the mouse 7 or the like to instruct the replacement determining section 72e to perform the replacement of the first three-dimensional shape data and the second three-dimensional shape data and instruct the replacement determining section 72e not to perform the replacement of the first three-dimensional shape data and the second three-dimensional shape data. When the replacement of the first three-dimensional shape data and the second three-dimensional shape data is not performed, the first three-dimensional shape data or the second three-dimensional shape data is used as it is.

The replacement determining section 72e is configured to receive an instruction for prioritizing one of the first three-dimensional shape data and the second three-dimensional shape data over the other. For example, the user can perform operation with the mouse 7 or the like to instruct the replacement determining section 72e to use the first three-dimensional shape data more preferentially than the second three-dimensional shape data and instruct the replacement determining section 72e to use the second three-dimensional shape data more preferentially than the first three-dimensional shape data. In this case, the replacement determining section 72e may be able to set priority.

The replacement determining section 72e acquires, on the basis of the first reliability index and the second reliability index, information used in determining whether the replacement of the first three-dimensional shape data and the second three-dimensional shape data is performed. The replacement determining section 72e can be configured to inform the user of this information. Examples of informing means include a method of display on the display section 5 and a method by voice. However, the informing means may be any method. The informing means only has to be able to inform the information used in determining whether the replacement of the first three-dimensional shape data and the second three-dimensional shape data is performed. Specific examples of this information include numerical values and graphs of the first reliability indexes and the second reliability indexes.

The control section 72 can generate a plurality of three-dimensional images formed by the first three-dimensional shape data and/or the second three-dimensional shape data and indicating different regions of the observation target SP and couple the plurality of three-dimensional images to form one three-dimensional image. That is, the control section 72 can generate a three-dimensional image of the first region of the observation target SP by acquiring the first three-dimensional shape data and the second three-dimensional shape data of the first region. The three-dimensional image may be formed by only the first three-dimensional shape data, may be formed by only the second three-dimensional shape data, or may be formed by the first three-dimensional shape data and the second three-dimensional shape data.

Thereafter, the placement-table control section 62 controls the stage driving section 54 to change a horizontal position of the electric placement table 23. The control section 72 can acquire the first three-dimensional shape data and the second three-dimensional shape data of the second region of the observation target SP and generate a three-dimensional image of the second region. In this way, a plurality of three-dimensional images can be generated. By coupling the generated plurality of three-dimensional images, one three-dimensional image indicating a three-dimensional shape in a wide range of the observation target SP can be formed.

Control of the Focus Searching Sections Based on Reliability Indexes

The reliability-index calculating section 72d of the control section 72 is configured to be capable of calculating, with the method explained above, a reliability index of a focus search result of the observation target SP illuminated by the coaxial epi-illumination 24 and a reliability index of a focus search result of the observation target SP illuminated by the ring illumination 25. Specifically, the reliability-index calculating section 72d is configured to calculate a reliability index of a focus search result at the time when lights of the coaxial epi-illumination 24 and the ring illumination 25 are irradiated on the observation target SP at a first ratio, determine whether the calculated reliability index satisfies a predetermined reference, and, when determining that the calculated reliability index does not satisfy the predetermined reference, irradiate the lights of the coaxial epi-illumination 24 and the ring illumination 25 on the observation target SP at a second ratio different from the first ratio and perform the focus search. The "predetermined reference" can be set on the basis of whether a measurement result of a three-dimensional shape is appropriately obtained according to a focus search result. A focus search result from which the measurement result of the three-dimensional shape can be appropriately obtained is the predetermined reference.

In this embodiment, as explained above, a light amount of the coaxial epi-illumination 24 and a light amount of the ring illumination 25 can be adjusted independently from each other. The first ratio and the second ratio can be represented by, for example, percentages. The coaxial epi-illumination 24 and the ring illumination 25 can be optionally set between 0% and 100%. The coaxial epi-illumination 24 can be set to 0% and the ring illumination 25 can be set to 100% (illumination of only the ring illumination 25). The coaxial epi-illumination 24 can be set to 100% and the ring illumination 25 can be set to 0% (illumination of only the coaxial epi-illumination 24).

When determining that the reliability index of the focus search result at the time when the lights of the coaxial epi-illumination 24 and the ring illumination 25 are irradiated on the observation target SP at the first ratio satisfies the predetermined reference, the control section 72 irradiates the observation target SP at the first ratio and measures a three-dimensional shape of the observation target SP. The control section 72 can optionally change the first ratio.

The control section 72 compares a reliability index of a focus search result of the observation target SP illuminated by the coaxial epi-illumination 24 and a reliability index of a focus search result of the observation target SP illuminated by the ring illumination 25 and, when the reliability index of the focus search result of the observation target SP illuminated by the coaxial epi-illumination 24 is lower than the reliability index of the focus search result of the observation target SP illuminated by the ring illumination 25, illuminates the observation target SP with the ring illumination 25 and performs the focus search with the first focus searching section 63 on the basis of the image acquired by the imaging element 50.

The control section 72 can also be configured to calculate a reliability index of a focus search result at the time when the lights of the coaxial epi-illumination 24 and the ring illumination 25 are irradiated on the observation target SP at the first ratio, determine whether the calculated reliability index satisfies the predetermined reference, and, when determining that the reliability index does not satisfy the predetermined reference, execute high dynamic range combination (HDR) processing for expanding a dynamic range of a captured image while maintaining the first ratio. When the HDR processing is performed, a ratio of the illumination may be changed from the first ratio.

The HDR processing is processing for, while changing an exposure time and the like, performing imaging a plurality of times to acquire a plurality of imaging data and thereafter combining the imaging data into an image having a wide dynamic range. This processing itself can be the same processing as the HDR processing in the past. The focus search cannot be performed concerning a portion where halation (white void) or black solid occurs in an image acquired under a single exposure condition. However, the occurrence of the halation or the black solid can be prevented by performing the HDR processing. Therefore, the focus search can be more accurately performed.

Without performing the HDR processing, a light amount of at least one of the coaxial epi-illumination 24 and the ring illumination 25 may be changed or an exposure time may be changed.

The control section 72 is configured to calculate a reliability index of a focus search result at the time when light of the coaxial epi-illumination 24 is irradiated on the observation target SP and a reliability index of a focus search result at the time when light of the ring illumination 25 is irradiated on the observation target SP, determine whether both the reliability indexes satisfy a predetermined reference, and, when determining that both the reliability indexes do not satisfy the predetermined reference, measure a three-dimensional shape of the observation target SP with the second three-dimensional-shape measuring section 66.

The control section 72 can also be configured to switch illumination for illuminating the observation target SP to illumination having a high reliability index on the basis of a reliability index of a focus search result of the observation target SP illuminated by the coaxial epi-illumination 24 and a reliability index of a focus search result of the observation target SP illuminated by the ring illumination 25.

Configuration of a Collision Estimating Section 72*f*

When the electric revolver 28 is provided and the objective lens 27 having a long working distance (hereinafter referred to as WD) is switched to the objective lens 27 having a short WD, there is a risk that the distal end portion of the objective lens 27 collides with the observation target SP. On the other hand, when the user rotates a revolver with a hand, in general, the user rotates the revolver while simultaneously viewing the objective lens 27 and the observation target SP. Therefore, the user can stop the rotation of the revolver immediately before the objective lens 27 and the observation target SP collide. The problem explained above is considered to not occur. Therefore, the problem explained above is a problem peculiar to the electric revolver 28.

As measures against this problem, in this embodiment, as shown in FIG. 6, a collision estimating section 72*f* is provided in the control section 72. When the electric revolver 28 starts to rotate, the collision estimating section 72*f* estimates, on the basis of a position and height information of the observation target SP acquired by the first three-dimensional-shape measuring section 65 or the second three-dimensional-shape measuring section 66, collision of the objective lens 27 and the observation target SP after the electric revolver 28 rotates.

The collision estimating section 72*f* can acquire a position and height information of the observation target SP acquired by the first three-dimensional-shape measuring section 65 or the second three-dimensional-shape measuring section 66. The collision estimating section 72*f* is configured to, after acquiring the position and the height information of the observation target SP, when the electric revolver 28 is about to be rotated, before the rotation is started, estimate collision of the objective lens 27 and the observation target SP after the electric revolver 28 rotates. The collision with the observation target SP occurs mainly at the distal end portion of the objective lens 27. Therefore, information concerning the distal end portion of the objective lens 27 is obtained beforehand and stored in the storing section 73. Examples of the information concerning the distal end portion of the objective lens 27 include, besides the WD, a confocal distance and the length and the outer diameter of the objective lens 27. The confocal distance is a distance from an attachment surface of the objective lens 27 to the observation surface of the observation target SP. When the electric revolver 28 is about to be rotated before the position and the height information of the observation target SP are acquired, before the rotation is started, the collision estimating section 72*f* only has to acquire the position and the height information of the observation target SP and estimate collision.

The collision estimating section 72*f* can grasp, on the basis of the information concerning the distal end portion of the objective lens 27, a position of the distal end portion of the objective lens 27 after the electric revolver 28 rotates. The collision estimating section 72*f* determines whether a part of the observation target SP is present in this position. When a part of the observation target SP is present in a place where the distal end portion of the objective lens 27 is located, the collision estimating section 72*f* estimates that the objective lens 27 and the observation target SP collide. On the other hand, when a part of the observation target SP is absent in the place where the distal end portion of the objective lens 27 is located, the collision estimating section 72*f* estimates that the objective lens 27 and the observation target SP do not collide.

The navigation-image acquiring section 68 can be configured to control the electric revolver 28 with the electric-revolver control section 61 to set the magnification of the non-confocal observation optical system 30 to first magnification and acquire the navigation image with the imaging element 50. The first magnification can be optionally set.

When the electric revolver 28 starts to rotate to set the magnification of the non-confocal observation optical system 30 to magnification higher than the first magnification, the collision estimating section 72*f* can estimate collision of the objective lens 27 and the observation target SP on the basis of the position and the height information of the observation target SP acquired by the first three-dimensional-shape measuring section 65 or the second three-dimensional-shape estimating section 66. That is, the objective lens 27 having high magnification tends to have a short WD compared with the objective lens 27 having low magnification. In this case, the estimation of collision of the objective lens 27 and the observation target SP based on the position and the height information of the observation target SP is particularly effective.

The navigation-image acquiring section 68 can also be configured to control the electric revolver 28 with the electric-revolver control section 61 to set the magnification of the confocal observation optical system 40 to the first magnification and acquire the navigation image with the photomultiplier tube 51.

When the electric revolver 28 starts to rotate to set the magnification of the confocal observation optical system 40 to magnification higher than the first magnification, the collision estimating section 72*f* can estimate collision of the objective lens 27 and the observation target SP on the basis of the position and the height information of the observation target SP acquired by the first three-dimensional-shape measuring section 65 or the second three-dimensional-shape estimating section 66.

The first focus searching section 63, the second focus searching section 64, the first three-dimensional-shape measuring section 65, and the second three-dimensional-shape measuring section 66 can be configured to operate according to simple height measurement conditions for measuring a position and height information of the observation target SP used by the collision estimating section 72*f*. For example, the objective lens 27 having magnification covering an observation visual field determined on the basis of designation of a position on the display section 5 on which the navigation image is displayed may be set as the objective lens 27 in the simple height measurement conditions. The simple height measurement conditions are measurement conditions more simply set than during observation.

When the electric revolver 28 starts rotation such that the objective lens 27 having a shorter working distance than the objective lens 27 under the simple height measurement conditions becomes the objective lens 27 for observation, the collision estimating section 72*f* estimates collision of the objective lens 27 having the shorter working distance and the observation target SP on the basis of the position and the height information of the observation target SP acquired according to the simple height measurement conditions.

The collision estimating section 72*f* can also be configured to, when the electric revolver 28 starts rotation such that the objective lens 27 having higher magnification than the objective lens 27 under the simple height measurement conditions becomes the objective lens 27 for observation, estimate collision of the objective lens 27 having the higher magnification and the observation target SP.

The collision estimating section 72*f* can be configured to, when it is estimated that the objective lens 27 and the observation target SP collide, inform the user of the estimation of the collision. Examples of informing means include a method of display on the display section 5 and a method by voice. However, the informing means may be any method.

After the estimation of the collision is informed, the user may be able to cancel the rotation of the electric revolver 28. A rotation cancel button of the electric revolve 28 is provided in the user interface to enable the user to operate the rotation cancel button. After the estimation of the collision is informed, the collision estimating section 72*f* may present the objective lens 27 with low collision possibility to the user and enable the user to select the objective lens 27. The collision estimating section 72*f* may be able to present usable magnification of the objective lens 27 to the user in advance.

The Z-axis driving section 52 can change, before rotation of the electric revolver 28, the relative distance between the objective lens 27 and the electric placement table 23 to be longer than the present distance. Thereafter, after the relative distance between the objective lens 27 and the electric placement table 23 is changed to be longer by the Z-axis driving section 52, the placement-table control section 62 can change the horizontal position of the electric placement table 23 according to the observation position and/or the observation visual field determined on the basis of the designation of the position on the display section 5. After the horizontal position of the electric placement table 23 is changed, the collision estimating section 72*f* can estimate collision of the objective lens 27 and the observation target SP.

The control section 72 can set, on the basis of the height information of the observation target SP used by the collision estimating section 72*f*, an upper limit value and a lower limit value of the separation distance between the objective lens 27 and the electric placement table 23.

The autofocus mechanism can be configured to automatically focus on the observation target SP in a process for reducing, with the Z-axis driving section 52, the relative distance between the objective lens 27 and the Z-axis driving section 52.

The first three-dimensional-shape measuring section 65 and the second three-dimensional-shape measuring section 66 can be configured to measure a three-dimensional shape of the observation target SP when the navigation-image acquiring section 68 acquires the navigation image.

Operation Specific Example 1

Figure 25:
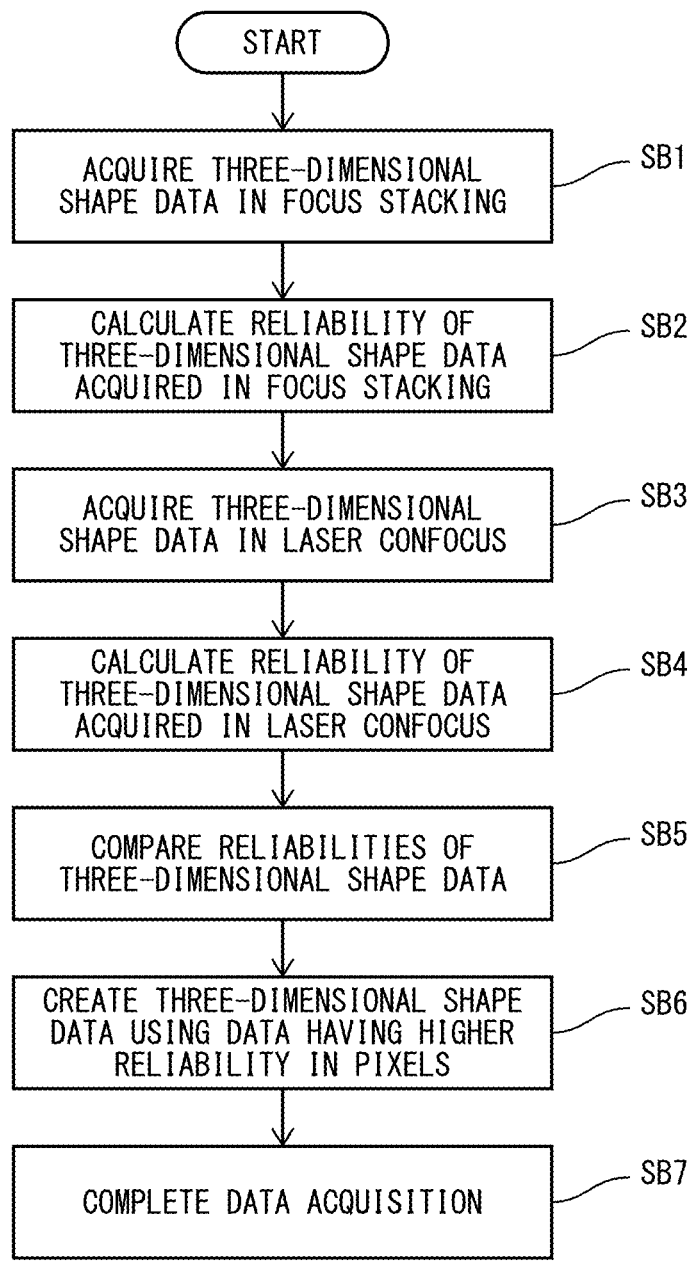
FIG. 25 is a flowchart for explaining a procedure in performing measurement in the focus stacking mode and the laser confocus mode without requesting confirmation by a user.

FIG. 25 is a flowchart for explaining a procedure in performing measurement in the focus stacking mode and the laser confocus mode without requesting confirmation by the user. In step SB1, three-dimensional shape measurement data is acquired in the focus stacking mode. In step SB2, the reliability-index calculating section 72*d* calculates reliability of the three-dimensional shape measurement data acquired in step SB1. The reliability can be obtained on the basis of a reliability index. As the reliability index is higher, the reliability is higher. The reliability and the reliability index may be the same.

In step SB3, three-dimensional shape measurement data is acquired in the laser confocus mode. In step SB4, the reliability-index calculating section 72*d* calculates reliability of the three-dimensional shape measurement data acquired in step SB3. In step SB5, the reliability-index calculating section 72*d* compares the reliability of the three-dimensional shape measurement data calculated in step SB2 and the reliability of the three-dimensional shape measurement data calculated in step SB4. In step SB6, three-dimensional shape measurement data is created using data having higher reliability in pixels. The replacement determining section 72*e* determines whether the reliability is high. Thereafter, the processing proceeds to step SB7. Note that steps SB1 and SB2 and steps SB3 and SB4 can be interchanged. In this case, measurement can be performed in the laser confocus mode first. Step SB2 and step SB4 can be performed in parallel.

Operation Specific Example 2

Figure 26:
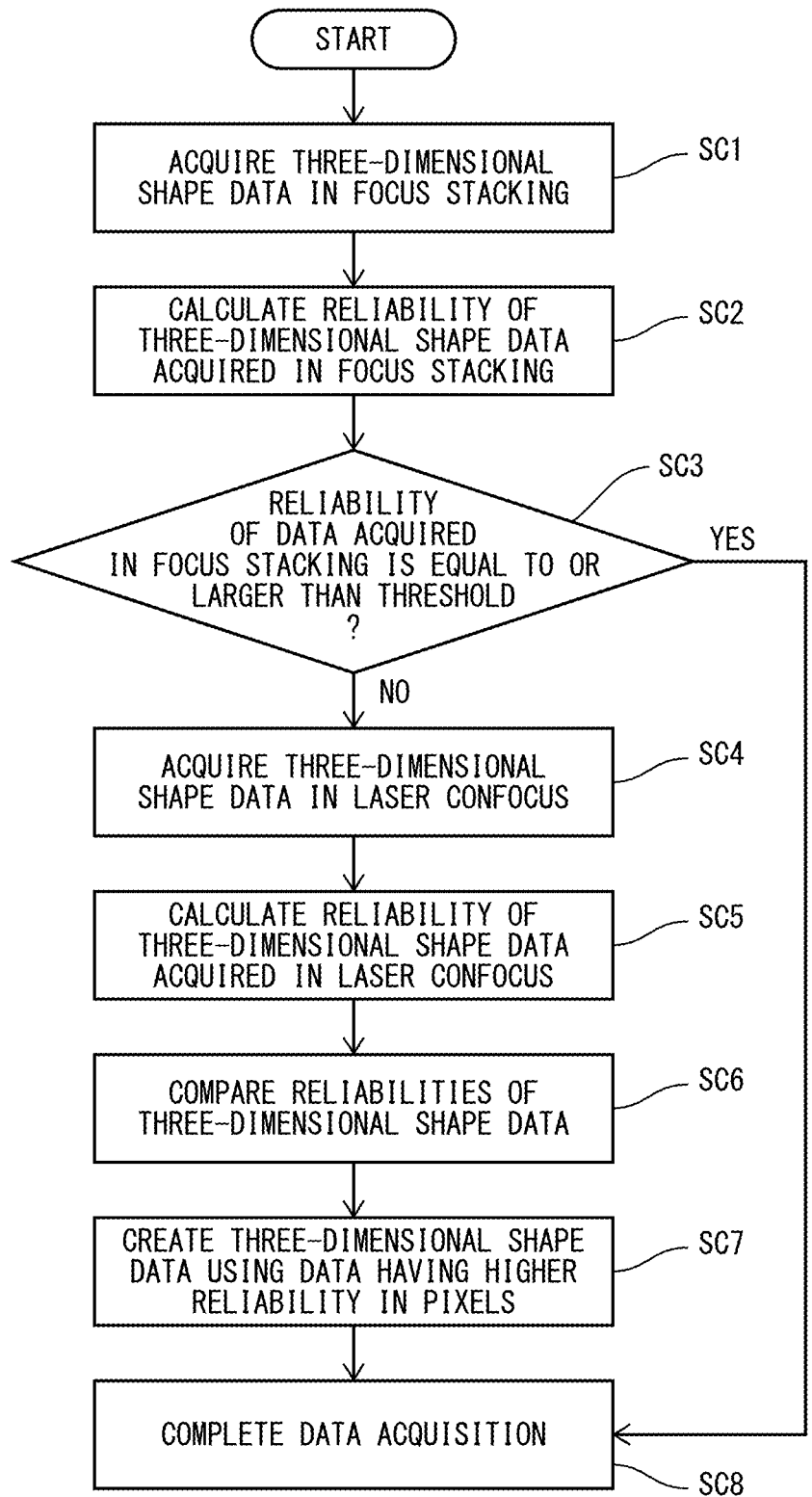
FIG. 26 is a flowchart for explaining a procedure in performing measurement in the focus stacking mode and the laser confocus mode according to reliability of a measurement result.

FIG. 26 is a flowchart for explaining a procedure in performing measurement in the focus stacking mode and the laser confocus mode according to reliability of a measurement result. In step SC1, three-dimensional shape measurement data is acquired in the focus stacking mode. In step SC2, the reliability-index calculating section 72*d* calculates reliability of the three-dimensional shape measurement data acquired in step SC1. In step SC3, the reliability-index calculating section 72*d* determines whether the reliability of the three-dimensional shape measurement data calculated in step SC2 is equal to or larger than a threshold. If it is determined NO in step SC3 and the reliability of the three-dimensional shape measurement data is smaller than the threshold, the processing proceeds to step SC4. On the other hand, if it is determined YES in step SC3 and the reliability of the three-dimensional shape measurement data is equal to or larger than the threshold, the processing proceeds to step SC8. The three-dimensional shape measurement data acquired in the focus stacking mode is used.

When it is determined NO in step SC3 and the processing proceeds to step SC4, in step SC4, three-dimensional shape measurement data is acquired in the laser confocus mode. In step SC5, the reliability-index calculating section 72*d* calculates reliability of the three-dimensional shape measurement data acquired in step SC4. In step SC6, the reliability-index calculating section 72*d* compares the reliability of the three-dimensional shape measurement data calculated in step SC2 and the reliability of the three-dimensional shape measurement data calculated in step SC5. In step SC7, three-dimensional shape measurement data is created using data having higher reliability in pixels. The replacement determining section 72*e* determines whether the reliability is high. Thereafter, the processing proceeds to step SC8. Note that steps SC1 and SC2 and steps SC4 and SC5 can be interchanged. In this case, measurement can be performed in the laser confocus mode first.

Operation Specific Example 3

Figure 27:
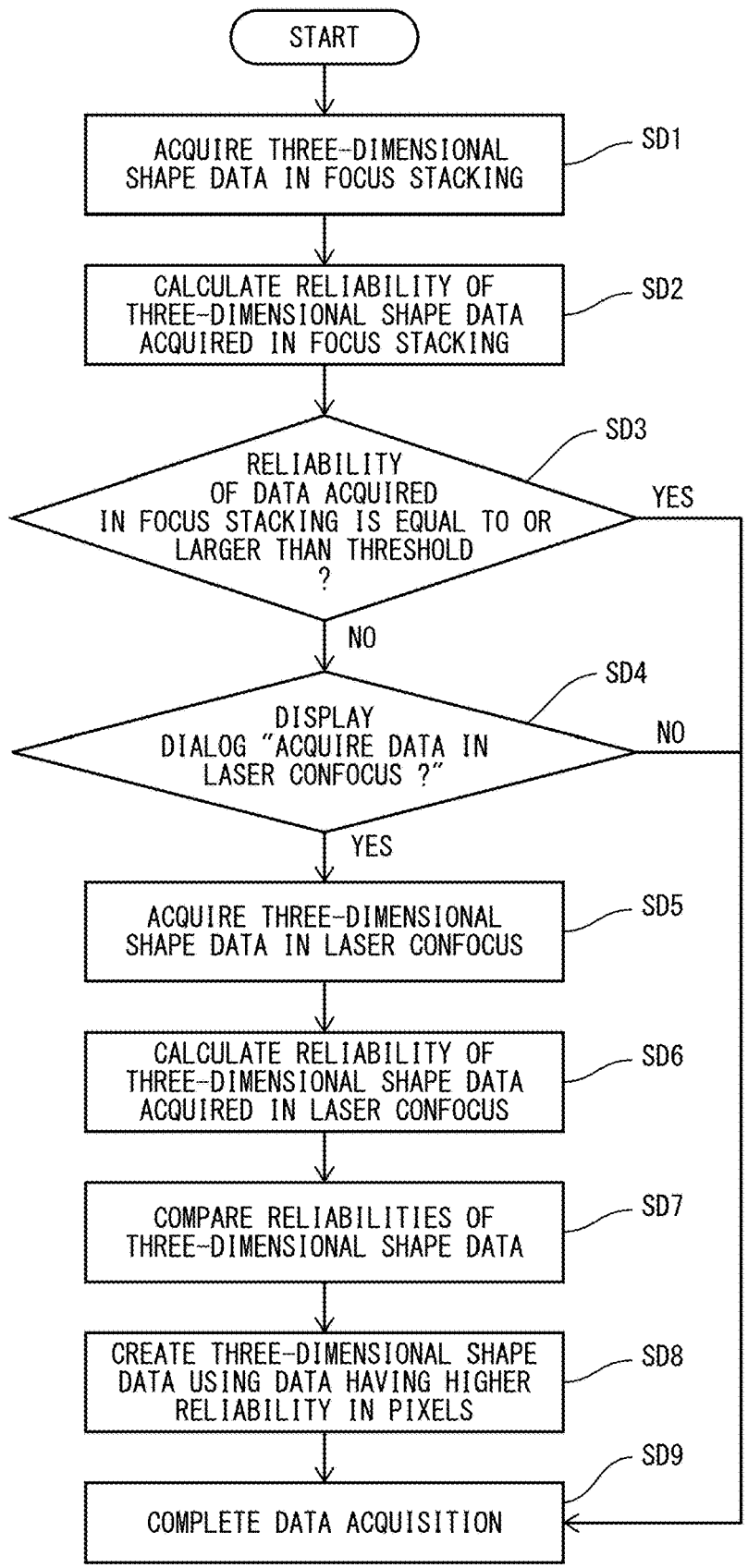
FIG. 27 is a flowchart for explaining a procedure in leaving determination concerning whether measurement is performed in the focus stacking mode and the laser confocus mode to the user.

FIG. 27 is a flowchart for explaining a procedure in leaving determination concerning whether measurement is performed in the focus stacking mode and the laser confocus mode to the user. In step SD1, three-dimensional shape measurement data is acquired in the focus stacking mode. In step SD2, the reliability-index calculating section 72*d* calculates reliability of the three-dimensional shape measurement data acquired in step SD1. In step SD3, the reliability-index calculating section 72*d* determines whether the reliability of the three-dimensional shape measurement data calculated in step SD2 is equal to or larger than a threshold. If it is determined NO in step SD3 and the reliability of the three-dimensional shape measurement data is smaller than the threshold, the processing proceeds to step SD4. On the other hand, if it is determined YES in step SD3 and the reliability of the three-dimensional shape measurement data is equal to or larger than the threshold, the processing proceeds to step SD9. The three-dimensional shape measurement data acquired in the focus stacking mode is used.

When it is determined NO in step SD3 and the processing proceeds to step SD4, a dialog "acquire data in laser confocus?" is displayed on the display section 5. The dialog is not limited to this and only has to be a dialog for asking the user whether measurement may be performed again in the laser confocus mode.

When the user inputs an answer as NO in step SD4, the processing proceeds to step SD9. The three-dimensional shape measurement data acquired in the focus stacking mode is used. When the user inputs an answer as YES in step SD4, the processing proceeds to step SD5. Three-dimensional shape measurement data is acquired in the laser confocus mode. In step SD6, the reliability-index calculating section 72*d* calculates reliability of the three-dimensional shape measurement data acquired in step SD5. In step SD7, the reliability-index calculating section 72*d* compares the reliability of the three-dimensional shape measurement data calculated in step SD2 and the reliability of the three-dimensional shape measurement data calculated in step SD6. In step SD7, three-dimensional shape measurement data is created using data having higher reliability in pixels. The replacement determining section 72*e* determines whether the reliability is high. Thereafter, the processing proceeds to step SD9. Note that steps SD1 and SD2 and steps SD5 and SD6 can be interchanged. In this case, measurement can be performed in the laser confocus mode first. When the measurement is performed in the laser confocus mode first, in step SD4, a dialog "acquire data in focus stacking?" only has to be displayed on the display section 5.

In the operation specific examples 1 to 3, the measurement in the laser confocus mode and the measurement in the focus stacking mode are performed concerning the entire range of the visual field of the objective lens 27. However, the measurement is not limited to this. For example, after the measurement in the focus stacking mode is performed concerning the entire range of the visual field of the objective lens 27, measurement can be performed again in the laser confocus mode for only pixels (regions) having low reliability. After the measurement in the laser confocus mode is performed concerning the entire range of the visual field of the objective lens 27, measurement can be performed again in the focus stacking mode for only pixels (regions) having low reliability.

Operational Effects of the Embodiment

According to this embodiment, it is possible to realize a measuring method that makes use of the principle of the focus stacking and a measuring method that makes use of the principle of the laser confocus.

Measurement parameters of the measurement modes of the focus stacking measurement mode by the first three-dimensional-shape measuring section 65 and the laser confocal measurement mode by the second three-dimensional-shape measuring section 66 can be set by the measurement-parameter setting section 67. For example, when measurement parameters are set by the measurement-parameter setting section 67 during the focus stacking measurement mode and, thereafter, the focus stacking measurement mode is switched to the laser confocus measurement mode, the measurement parameters set during the focus stacking measurement mode are taken over as measurement parameters of the laser confocal measurement mode. The same applies when the laser confocal measurement mode is switched to the focus stacking measurement mode. Therefore, even if the measurement mode is frequently switched, a burden of operation on the user can be reduced.

The basic measurement display region 82 in which parameters can be displayed and the live image display region 80*a* are displayed on the display section 5. Therefore, the user can set parameters for the measurement modes while viewing a live image displayed in the live image display region 80*a*. At this time, measurement parameters can be set by displaying, in the basic measurement display region 82, one of the parameter setting region for the measurement modes by the first three-dimensional-shape measuring section 65 and the parameter setting region for the measurement modes by the second three-dimensional-shape measuring section 66. For example, when the user causes the first three-dimensional-shape measuring section 65 to display the parameter setting region for the measurement modes, a live image acquired by the imaging element via the non-confocal observation optical system 30 is displayed in the live image display region 80*a*. When the user causes the second three-dimensional-shape measuring section 66 to display the parameter setting region for the measurement modes, a live image acquired by the photomultiplier tube 51 via the confocal observation optical system 40 is displayed in the live image display region 80*a*. That is, because the displayed live image and the parameters displayed in the basic measurement display region 82 correspond to each other, usability for the user during setting can be improved.

As explained above, the configuration including both of the measuring method that makes use of the principle of the focus stacking and the measuring method that makes use of the principle of the confocus can be adopted. In the case of the measuring method that makes use of the principle of the focus stacking, a three-dimensional shape of the observation target SP can be measured in a state in which illumination is performed by one of the coaxial epi-illumination 24 and the ring illumination 25 or a state in which illumination is performed by both of the coaxial epi-illumination 24 and the ring illumination 25. Consequently, a three-dimensional shape can be measured not only in the mirror surface-like observation target SP but also a diffuser and an observation target having large unevenness.

The first reliability index indicating the reliability of the focus search by the first focus searching section 63 and the second reliability index indicating the reliability of the focus search by the second focus searching section 64 are calculated. Therefore, three-dimensional measurement data having high reliability is obtained.

When the user designates a position on the display section 5 on which the navigation image is displayed, an observation position and/or an observation visual field is determined on the basis of the designation of the position. The electric placement table 23 is moved and the magnification of the observation optical system is changed according to the determined observation position and/or the determined observation visual field. An observation image is acquired by the imaging element 50 or the photomultiplier tube 51.

Thereafter, when the observation range is on the outside of the navigation image according to, for example, a change of the observation range by the user, addition of a region to the navigation image is necessary. Therefore, designation of addition of a region is performed. Then, first, the navigation-image acquiring section 68 determines whether the present imaging conditions are different from the existing imaging conditions during navigation image acquisition. When the present imaging conditions are different from the existing imaging conditions, the navigation-image acquiring section 68 changes the imaging conditions to the existing imaging conditions during navigation image acquisition and acquires an additional region with the imaging element 50 or the photomultiplier tube 51. An image of the acquired additional region and the navigation image displayed so far are simultaneously displayed on the display section 5. Consequently, a new region is added to the navigation image. Imaging conditions of the added region are the same as the imaging conditions of the navigation image displayed so far. Therefore, a natural navigation image is obtained.

Collision of the objective lens 27 and the observation target SP after the electric revolver 28 rotates can be estimated on the basis of the position and the height information of the observation target SP acquired by the first three-dimensional-shape measuring section 65 and the second three-dimensional-shape measuring section 66. Therefore, when the objective lens 27 having a long WD is switched to the objective lens 27 having a short WD, a risk that the objective lens 27 collides with the observation target SP greatly decreases.

The embodiment explained above is only a simple illustration in every respect and should not be limitedly interpreted. Further, all modifications and changes belonging to the scope of equivalents of the claims are within the scope of the present invention.

As explained above, the present invention can be applied to a magnifying observation apparatus, a digital microscope, and the like.

What is claimed is:

1. A magnifying observation apparatus that provides a magnified image of an observation target, the magnifying observation apparatus comprising:
   a placement table for placing the observation target;
   a non-confocal observation optical system including an objective lens;
   a confocal observation optical system including the objective lens;

a light source which generates a first light for illuminating the observation target via the objective lens;
a scanner which directs the first light generated by the light source to the observation target to scan the observation target;
a coaxial epi-illumination which illuminates the observation target via the objective lens;
a ring illumination which illuminates the observation target from a periphery of an optical axis of a first objective lens, the ring illumination being disposed to surround a periphery of the first objective lens, and the ring illumination being not disposed to surround a periphery of a second objective lens;
a revolver having a first attachment hole and a second attachment hole, configured to change positions of attachment holes including the first attachment hole and the second attachment hole to select the objective lens from a plurality of objective lenses including the first objective lens attached to the first attachment hole and the second objective lens attached to the second attachment hole in accordance with selection information, a position of the ring illumination being changed in combination with the first objective lens by the revolver, and the second objective lens having a higher magnification than the first objective lens;
a vertical moving mechanism configured to change a relative distance between the objective lens and the placement table;
a height-information detector which detects a height information;
a first light receiver which images the observation target via the non-confocal observation optical system to acquire an image of the observation target;
a second light receiver which measures the observation target via the confocal observation optical system;
a first focus searching section configured to cause at least one of the coaxial epi-illumination and the ring illumination to illuminate the observation target and determine a focus position on the basis of the height information detected by the height-information detector according to the relative distance changed by the vertical moving mechanism and a focus value of an image including an observation target illuminated by the at least one of the coaxial epi-illumination and the ring illumination, the image acquired via the non-confocal observation optical system by the first light receiver,
wherein when the first objective lens is selected in a first measurement mode as the objective lens by the revolver, the first focus searching section causes the ring illumination to illuminate the observation target while the first light is off, and determine the focus position on the basis of the height information detected by the height-information detector according to the relative distance changed by the vertical moving mechanism and a focus value of an image including an observation target illuminated by the ring illumination, the image acquired via the non-confocal observation optical system including the first objective lens by the first light receiver;
a second focus searching section configured to cause the scanner to direct the first light generated by the light source on the observation target and determine a focus position on the basis of the height information detected by the height-information detector according to the relative distance changed by the vertical moving mechanism and a signal indicating the first light reflected from the observation target, the signal acquired via the confocal observation optical system by the second light receiver,
wherein when the second objective lens is selected in a second measurement mode as the objective lens by the revolver, the second focus searching section causes the scanner to direct the first light generated by the light source on the observation target while the ring illumination is off, and determine the focus position on the basis of the height information detected by the height-information detector according to the relative distance changed by the vertical moving mechanism and a signal indicating the first light reflected from the observation target, the signal acquired via the confocal observation optical system including the second objective lens by the second light receiver;
a first three-dimensional-shape measuring section configured to measure a three-dimensional shape of the observation target on the basis of the focus position determined by the first focus searching section in the first measurement mode; and
a second three-dimensional-shape measuring section configured to measure a three-dimensional shape of the observation target on the basis of the focus position determined by the second focus searching section in the second measurement mode.

2. The magnifying observation apparatus according to claim 1, wherein
the first three-dimensional-shape measuring section is configured to acquire a color image indicating the observation target,
the second three-dimensional-shape measuring section is configured to acquire three-dimensional shape data of the observation target, and
the magnifying observation apparatus further comprises:
a control section which generates a combined image obtained by combining the color image acquired by the first three-dimensional-shape measuring section and the three-dimensional shape data acquired by the second three-dimensional-shape measuring section; and
a display which displays the combined image generated by the control section.

3. The magnifying observation apparatus according to claim 2, wherein the first focus searching section is configured to, when the controller generates the combined image, illuminate the observation target with the coaxial epi-illumination and determine the focus position on the basis of the focus value of the image acquired by the first light receiver.

4. The magnifying observation apparatus according to claim 1, wherein the magnifying observation apparatus is configured to adjust a light amount of the coaxial epi-illumination and a light amount of the ring illumination respectively, and the coaxial epi-illumination and the ring illumination simultaneously illuminate the observation target according to the adjusted light amount of the coaxial epi-illumination and the adjusted light amount of the ring illumination.

5. The magnifying observation apparatus according to claim 1, wherein the magnifying observation apparatus is configured to calculate a reliability index associated with the determined focus position at a time when the coaxial epi-illumination and the ring illumination illuminates the observation target at a first ratio, determine whether the calculated reliability index satisfies a predetermined reference, and, the first focus searching section causes the coaxial epi-illumination and the ring illumination to illuminate the observation target at a second ratio different from the first ratio in response to determining that the reliability index does not satisfy the predetermined reference, and determines the focus position corresponding to the observation target illuminated at the second ratio by the coaxial epi-illumination and the ring illumination.

6. The magnifying observation apparatus according to claim 1, wherein the magnifying observation apparatus is configured to calculate a reliability index associated with the determined focus position at a time when the coaxial epi-illumination and the ring illumination illuminates the observation target at a first ratio, determine whether the calculated reliability index satisfies a predetermined reference, and the first three-dimensional-shape measuring section measures the three-dimensional shape of the observation target illuminated at the first ratio by the coaxial epi-illumination and the ring illumination in response to determining that the reliability index satisfies the predetermined reference.

7. The magnifying observation apparatus according to claim 1, wherein the magnifying observation apparatus is configured to compare a reliability index of the focus position associated with the observation target illuminated by the coaxial epi-illumination and a reliability index of the focus position associated with the observation target illuminated by the ring illumination and, when the reliability index of the focus position associated with the observation target illuminated by the coaxial epi-illumination is lower than the reliability index of the focus position associated with the observation target illuminated by the ring illumination, the first focus searching section causes the ring illumination to illuminate the observation target, and determines the focus position corresponding to the observation target illuminated by the ring illumination.

8. The magnifying observation apparatus according to claim 1, wherein the magnifying observation apparatus is configured to calculate a reliability index of the focus position associated with the observation target illuminated at a first ratio by the coaxial epi-illumination and the ring illumination, determine whether the calculated reliability index satisfies a predetermined reference, and execute HDR processing for expanding a dynamic range of a captured image while maintaining the first ratio in response to determining that the reliability index does not satisfy the predetermined reference.

9. The magnifying observation apparatus according to claim 1, wherein the magnifying observation apparatus is configured to calculate a reliability index of the focus position associated with the observation target illuminated by the coaxial epi-illumination and a reliability index of the focus position associated with the observation target illuminated by the ring illumination and, determine whether both the reliability indexes satisfy a predetermined reference, and the second three-dimensional-shape measuring section measures the three-dimensional shape of the observation target on the basis of the focus position determined by the second focus searching section in response to determining that both the reliability indexes do not satisfy the predetermined reference.

10. The magnifying observation apparatus according to claim 1, wherein the magnifying observation apparatus is configured to switch illumination for illuminating the observation target to illumination having a high reliability index on the basis of a reliability index of the focus position associated with the observation target illuminated by the coaxial epi-illumination and a reliability index of the focus position associated with the observation target illuminated by the ring illumination.

11. The magnifying observation apparatus according to claim 2, wherein the display simultaneously displays the combined image and the color image.

* * * * *